US012126980B2

(12) United States Patent
Li et al.

(10) Patent No.: US 12,126,980 B2
(45) Date of Patent: Oct. 22, 2024

(54) SPEAKER DEVICE

(71) Applicant: SHENZHEN SHOKZ CO., LTD., Guangdong (CN)

(72) Inventors: Chaowu Li, Shenzhen (CN); Yongjian Li, Shenzhen (CN); Yueqiang Wang, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

(21) Appl. No.: 18/349,990

(22) Filed: Jul. 11, 2023

(65) Prior Publication Data

US 2023/0353947 A1 Nov. 2, 2023

Related U.S. Application Data

(63) Continuation of application No. 17/305,243, filed on Jul. 1, 2021, now Pat. No. 11,716,574, which is a (Continued)

(30) Foreign Application Priority Data

Jan. 5, 2019 (CN) ........................ 201910009874.6

(51) Int. Cl.

*H04R 9/06* (2006.01)
*H04R 1/10* (2006.01)

(Continued)

(52) U.S. Cl.

CPC ............ *H04R 9/06* (2013.01); *H04R 1/1008* (2013.01); *H04R 1/1025* (2013.01); *H04R 1/105* (2013.01);

(Continued)

(58) Field of Classification Search

CPC ........ H04R 1/105; H04R 9/06; H04R 1/1008; H04R 1/1025; H04R 1/1041;

(Continued)

(56) References Cited

U.S. PATENT DOCUMENTS 3,906,170 A 9/1975 Guice
7,110,562 B1 * 9/2006 Feeley ................ H04R 25/607 381/328

(Continued)

FOREIGN PATENT DOCUMENTS

CN 107124682 A 9/2017
CN 107454492 A 12/2017

(Continued)

OTHER PUBLICATIONS

International Search Report in PCT/CN2019/102401 mailed on Nov. 25, 2019, 7 pages.

(Continued)

*Primary Examiner* — Gerald Gauthier
(74) *Attorney, Agent, or Firm* — METIS IP LLC

(57) ABSTRACT

The present disclosure relates to a speaker device. The speaker device may include a core housing, a circuit housing, an ear hook, and a housing sheath. The core housing may be configured to accommodate an earphone core. The circuit housing may be configured to accommodate a control circuit or a battery. The control circuit or the battery may be configured to drive the earphone core to vibrate to produce sound. The ear hook may be configured to connect the core housing and the circuit housing. The housing sheath may at least partially cover the circuit housing and the ear hook. The housing sheath may include waterproof material. The waterproof performance of the speaker device may be improved through sealed connections among various components of the speaker device in the present disclosure.

19 Claims, 17 Drawing Sheets

Related U.S. Application Data continuation of application No. PCT/CN2019/102401, filed on Aug. 24, 2019.

(51) Int. Cl.
*H04R 9/02* (2006.01)
*H04R 25/00* (2006.01)

(52) U.S. Cl.
CPC ............. *H04R 1/1091* (2013.01); *H04R 9/02* (2013.01); *H04R 9/025* (2013.01); *H04R 25/65* (2013.01); *H04R 25/658* (2013.01); *H04R 2225/021* (2013.01); *H04R 2400/11* (2013.01); *H04R 2460/13* (2013.01)

(58) Field of Classification Search
CPC .. H04R 1/1058; H04R 1/1075; H04R 1/1091; H04R 9/02; H04R 9/025; H04R 25/65; H04R 1/1066; H04R 1/26; H04R 25/658; H04R 2225/021; H04R 2400/11; H04R 2460/13; H02J 7/0044; H04W 52/0274
See application file for complete search history.

(56) References Cited

U.S. PATENT DOCUMENTS

| | | | | |
|---|---|---|---|---|
| 7,123,737 | B2 * | 10/2006 | Ham | H04R 1/105 381/381 |
| 9,438,984 | B1 * | 9/2016 | Ryann | H02J 7/0044 |
| 10,484,783 | B2 * | 11/2019 | Qian | H04R 1/1041 |
| 11,653,151 | B2 * | 5/2023 | Li | H04R 9/02 381/380 |
| 11,716,574 | B2 * | 8/2023 | Li | H04R 1/1025 381/380 |
| 2015/0063607 | A1 | 3/2015 | Li et al. | |
| 2017/0006387 | A1 | 1/2017 | Kah, Jr. | |
| 2017/0111728 | A1 | 4/2017 | Kim et al. | |
| 2017/0318369 | A1 | 11/2017 | Wang | |
| 2017/0318372 | A1 * | 11/2017 | Gerber | H04R 1/26 |
| 2018/0255388 | A1 * | 9/2018 | Hankey | H04W 52/0274 |
| 2018/0295437 | A1 * | 10/2018 | Chen | H04R 1/1066 |
| 2019/0082266 | A1 | 3/2019 | Qi et al. | |
| 2019/0289383 | A1 * | 9/2019 | Chawan | H04R 1/1058 |
| 2021/0067879 | A1 | 3/2021 | Li et al. | |
| 2021/0219043 | A1 * | 7/2021 | Li | H04R 1/1025 |
| 2021/0329359 | A1 * | 10/2021 | Li | H04R 25/658 |
| 2022/0256274 | A1 | 8/2022 | Li et al. | |
| 2023/0353947 | A1 * | 11/2023 | Li | H04R 1/1075 |

FOREIGN PATENT DOCUMENTS

| | | | |
|---|---|---|---|
| CN | 107484054 | A | 12/2017 |
| CN | 107493532 | A | 12/2017 |
| CN | 207039852 | U | 2/2018 |
| CN | 108391213 | A | 8/2018 |
| CN | 109547888 | A | 3/2019 |
| CN | 109660901 | A | 4/2019 |
| CN | 209184801 | U | 7/2019 |
| CN | 209267804 | U | 8/2019 |
| WO | 2012140921 | A1 | 10/2012 |

OTHER PUBLICATIONS

Written Opinion in PCT/CN2019/102401 mailed on Nov. 25, 2019, 8 pages.

* cited by examiner

SPEAKER DEVICE

CROSS-REFERENCE TO RELATED APPLICATION

This application is a Continuation of U.S. patent application Ser. No. 17/305,243, filed on Jul. 1, 2021, which is a Continuation of International Application No. PCT/CN2019/102401, filed on Aug. 24, 2019, which claims priority of Chinese Patent Application No. 201910009874.6, filed on Jan. 5, 2019, the contents of each of which are hereby incorporated by reference.

TECHNICAL FIELD

The present disclosure relates to a speaker device, and more specifically relates to a speaker device with waterproof function.

BACKGROUND

In general, people can hear the sound because the air transmits vibration to the eardrum through the external ear canal, and the vibration formed by the eardrum drives the human auditory nerve, thereby perceiving the vibration of the sound. At present, earphones are widely used in people's lives. For example, users can use earphones to play music, answer calls, etc. Earphones have become an important item in people's daily life. Generally, the earphone in the market may not satisfy user's requirement in some scenes, such as swimming, outdoor rainy days, etc. An earphone with waterproof function with relatively good sound quality is more popular. Therefore, it is desirable to provide a speaker device with waterproof function.

SUMMARY

According to an aspect of the present disclosure, a speaker device is provided. The speaker device may include a core housing, a circuit housing, an ear hook, and a housing sheath. The core housing may be configured to accommodate an earphone core. The circuit housing may be configured to accommodate a control circuit or a battery. The control circuit or the battery may be configured to drive the earphone core to vibrate to produce sound having at least two resonance peaks. The ear hook may be configured to connect the core housing and the circuit housing. The housing sheath may at least partially cover the circuit housing and the ear hook. The housing sheath may include waterproof material.

In some embodiments, the housing sheath may be a bag-like structure with an open end, such that the circuit housing enters into the housing sheath through the open end of the housing sheath.

In some embodiments, the open end of the housing sheath may include an annular flange protruding inwardly. The annular flange may abut against an end of the circuit housing away from the ear hook when the housing sheath covers a periphery of the circuit housing.

In some embodiments, a sealant may be applied to a joint region between the annular flange and the end of the circuit housing away from the ear hook to connect the housing sheath and the circuit housing in a sealed manner.

In some embodiments, the end of the circuit housing away from the ear hook may include a first annular table. The first annular table may be configured to clamp with the annular flange to position the housing sheath.

In some embodiments, the first annular table may include a positioning block that extends along a direction of the circuit housing away from the ear hook, and the annular flange of the housing sheath may include a positioning groove corresponding to the positioning block, the positioning groove being configured to accommodating at least a portion of the positioning block to position the housing sheath.

In some embodiments, the circuit housing may include two sub-housings that are fastened to each other, and the housing sheath may cover a joint seam of the two sub-housings.

In some embodiments, joint surfaces of the two sub-housings abutted with each other may include stepped structures that match each other.

In some embodiments, a plurality of mounting holes may be disposed on the circuit housing, a first glue tank may be recessed on an outer surface of the circuit housing, and the plurality of mounting holes may be disposed in the first glue tank. The speaker device may further include a plurality of conductive posts each of which is inserted into one mounting hole of the plurality of mounting holes. The housing sheath may further include one or more holes configured to expose the plurality of conductive posts, and a sealant may be applied in the first glue tank to seal the housing sheath and the circuit housing on a periphery of the plurality of mounting holes.

In some embodiments, the speaker device may further include an auxiliary film. The auxiliary film may include a board, a hollow region may be disposed on the board. The board may be disposed on an inner surface of the circuit housing. The plurality of mounting holes may be disposed inside the hollow region to form a second glue tank on the periphery of the plurality of conductive posts. And a sealant may be applied in the second glue tank to seal the plurality of mounting holes and the circuit housing.

In some embodiments, the core housing may include a socket. The ear hook may include an elastic metal wire and a plug end. The plug end may be disposed on an end of the elastic metal wire, and the plug end may be connected to the socket in a plug manner.

In some embodiments, a stopping block may be disposed on an inner side wall of the socket. The plug end may include an insertion unit. At least a portion of the insertion unit may be inserted into the socket and abutted against an outer surface of the stopping block. The plug end may include two elastic hooks disposed on a side of the insertion unit facing an inside of the core housing. The two elastic hooks may get close to each other under an action of an external force and the stopping block. And after passing the stopping block, the two elastic hooks may elastically return to be clamped on the inner surface of the stopping block to plug and fix the core housing and the plug end.

In some embodiments, at least a portion of the insertion unit may be inserted into the socket, the other portion of the insertion unit not inserted into the socket may have a stepped structure and form a second annular table, and the second annular table may be disposed apart from an outer end surface of the core housing. And the ear hook may further include a protective sleeve disposed on a periphery of the elastic metal wire and the plug end. The protective sleeve may extend to a side of the second annular table facing the outer end surface of the core housing, and the protective sleeve may elastically abut against the core housing when the core housing and the plug end are plugged and fixed.

In some embodiments, the protective sleeve may include an annular abutting surface and an annular protruding table.

The annular abutting surface may be formed on a side of the protective sleeve facing the outer end surface of the core housing, and the annular protruding table may be formed in the annular abutting surface and protruding relative to the annular abutting surface. The core housing may include a connecting slope configured to connect the outer end surface of the core housing and the inner side wall of the socket. The annular abutting surface and the annular protruding table may elastically abut against the outer end surface of the core housing and the connecting slope, respectively, when the core housing is fixed to the plug end.

In some embodiments, the earphone core may at least include a composite vibration device including a vibration board and a second vibration conductive plate, and the composite vibration device may generate the two resonance peaks.

In some embodiments, the earphone core may further include at least one voice coil and at least one magnetic circuit assembly. The voice coil may be physically connected to the vibration board, and the magnetic circuit assembly may be physically connected to the second vibration conductive plate.

In some embodiments, a stiffness coefficient of the vibration board may be larger than a stiffness coefficient of the second vibration conductive plate.

In some embodiments, the earphone core may further include a first vibration conductive plate. The first vibration conductive plate may be physically connected to the composite vibration device. The first vibration conductive plate may be physically connected to the core housing. The first vibration conductive plate may generate another resonance peak.

In some embodiments, the two resonance peaks may be within a frequency range perceivable by human ears.

In some embodiments, the core housing may further include at least one contact surface, and at least a portion of the contact surface may be in direct or indirect contact with a user. The contact surface may have a gradient structure such that the pressure is unevenly distributed on the contact surface.

In some embodiments, the gradient structure may include at least one convex portion or at least one concave portion.

In some embodiments, the gradient structure may be located at a center or an edge of the contact surface.

In some embodiments, the core housing may further include at least one contact surface, and at least a portion of the contact surface may be in direct or indirect contact with a user. The contact surface may at least include a first contact surface region and a second contact surface region. A protrusion degree of the second contact surface region may be higher than a protrusion degree of the first contact surface region.

In some embodiments, the first contact surface region may include a sound guiding hole guiding a sound wave inside the core housing to an outside of the core housing to superimpose with a leaked sound wave generated by the vibration of the core housing to reduce a sound leakage.

In some embodiments, the first contact surface region and the second contact surface region may be made of plastics including silica gel, rubber, or plastic.

In some embodiments, the speaker device may include a key module. The key module may be located on the core housing or the circuit housing, and may be configured to control the speaker device.

In some embodiments, the speaker device may include an indicator light. The indicator light may be located on the core housing or the circuit housing, and may be configured to display a state of the speaker device.

BRIEF DESCRIPTION OF THE DRAWINGS

The present disclosure is further illustrated in terms of exemplary embodiments. These exemplary embodiments are described in detail with reference to the drawings. These embodiments are not restrictive. In some embodiments, a same number may indicate a same structure, wherein.

DETAILED DESCRIPTION

Figure 1:
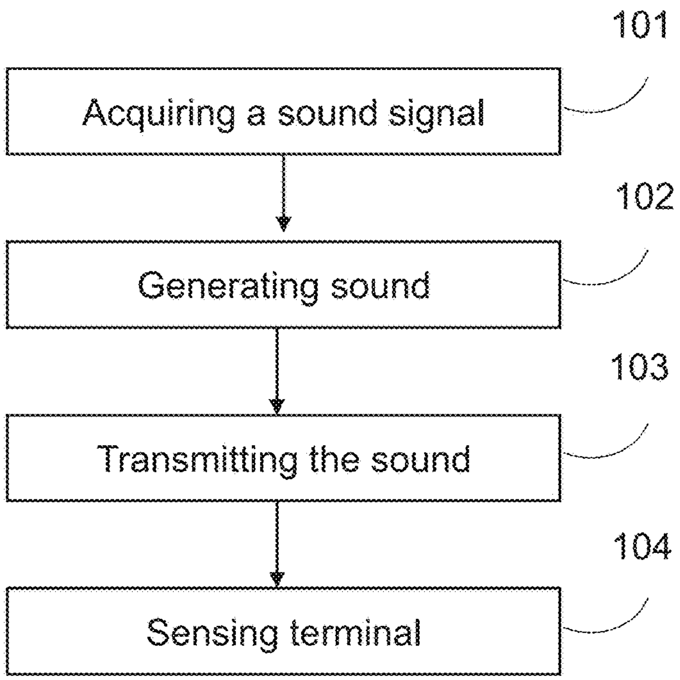
FIG. 1 is a flowchart illustrating an exemplary process for generating auditory sense through a speaker device according to some embodiments of the present disclosure.

In order to illustrate the technical solutions related to the embodiments of the present disclosure, brief introduction of the drawings referred to in the description of the embodiments is provided below. Obviously, drawings described below are merely some examples or embodiments of the present disclosure. Those skilled in the art, without further creative efforts, may apply the present disclosure to other similar scenarios according to these drawings. It should be understood that the exemplary embodiments are provided merely for better comprehension and application of the present disclosure by those skilled in the art, and not intended to limit the scope of the present disclosure. Unless obviously obtained from the context or the context illustrates otherwise, the same numeral in the drawings refers to the same structure or operation.

As used in the disclosure and the appended claims, the singular forms “a,” “an,” and “the” include plural referents unless the content clearly dictates otherwise. In general, the terms “comprise,” “comprises,” and/or “comprising,” “include,” “includes,” and/or “including,” merely prompt to include steps and elements that have been clearly identified, and these steps and elements do not constitute an exclusive listing. The methods or devices may also include other steps or elements. The term “based on” is “based at least in part on.” The term “one embodiment” means “at least one embodiment”; and the term “another embodiment” means “at least one additional embodiment”. Related definitions of other terms will be given in the description below. In the following, without loss of generality, the description of “player”, “speaker device”, “speaker”, or “headphone” will be used when describing the speaker related technologies in the present disclosure. This description is only a form of speaker application. For a person of ordinary skill in the art, “speaker device”, “speaker”, or “earphone” can also be replaced with other similar words, such as “player”, “hearing aid”, or the like. In fact, the various implementations in the present disclosure may be easily applied to other non-speaker-type hearing devices. For example, for those skilled in the art, after understanding the basic principles of the speaker device, multiple variations and modifications may be made in forms and details of the specific methods and steps for implementing the speaker device, in particular, an addition of ambient sound pickup and processing functions to the speaker device so as to enable the speaker device to function as a hearing aid, without departing from the principle. For example, a sound transmitter such as a microphone may pick up an ambient sound of the user/wearer, process the sound using a certain algorithm, and transmit the processed sound (or a generated electrical signal) to a user/wearer. That is, the speaker device may be modified and have the function of picking up ambient sound. The ambient sound may be processed and transmitted to the user/wearer through the speaker device, thereby implementing the function of a hearing aid. For example, the algorithm mentioned above may include a noise cancellation algorithm, an automatic gain control algorithm, an acoustic feedback suppression algorithm, a wide dynamic range compression algorithm, an active environment recognition algorithm, an active noise reduction algorithm, a directional processing algorithm, a tinnitus processing algorithm, a multi-channel wide dynamic range compression algorithm, an active howling suppression algorithm, a volume control algorithm, or the like, or any combination thereof.

FIG. 1 is a flowchart illustrating an exemplary process for generating auditory sense through a speaker device according to some embodiments of the present disclosure. The speaker device may transfer sound to an auditory system through bone conduction or air conduction by a built-in loudspeaker, thereby generating an auditory sense. As shown in FIG. 1, the process for generating the auditory sense through the speaker device may include operations 101-104.

In 101, the speaker device may acquire or generate a signal (also referred to as a “sound signal”) containing sound information. In some embodiments, the sound information may refer to a video file or an audio file with a specific data format. The sound information may refer to data or files that may be converted to be sound through specific approaches.

In some embodiments, the signal containing the sound information may be obtained from a storage unit of a speaker device itself. In some embodiments, the signal containing the sound information may be obtained from an information generation system, a storage system, or a transmission system other than the speaker device. The signal containing the sound information may be not limited to an electrical signal, and may also include other forms of signals other than the electrical signal, such as an optical signal, a magnetic signal, and a mechanical signal, or the like. In principle, as long as the signal includes information that may be configured to generate sounds by speaker device, the signal may be processed as the sound signal. In some embodiments, the sound signal may not be limited to one signal source, and it may come from a plurality of signal sources. The plurality of signal sources may be independent of or dependent on each other. In some embodiments, manners of generating or transmitting the sound signal may be wired or wireless and may be real-time or time-delayed. For example, the speaker device may receive an electrical signal containing sound information via a wired or wireless connection or may obtain data directly from a storage medium and generate a sound signal. Taking bone conduction technology as an example, components with sound collection function may be added to a bone conductive loudspeaker. The bone conductive loudspeaker may pick up sound from ambient environment and convert mechanical vibration of the sound into an electrical signal. Further, the electrical signal may be processed through an amplifier to meet special requirements. The wired connection may be realized by using including but not limited to metal cables, optical cables, or hybrid cables of metal and optical, such as coaxial cables, communication cables, flexible cables, spiral cables, non-metal sheathed cables, metal sheathed cables, multi-core cables, twisted pair cables, ribbon cables, shielded cables, telecommunications cables, double-stranded cables, parallel twin-core wires, and twisted pairs.

The examples described above are only used for convenience of description, and the wired connection may also be realized by using other types of transmission carriers, such as transmission carriers for electrical or optical signal.

The storage device or storage unit mentioned herein may include a direct attached storage, a network attached storage, a storage area network, and other storage systems. The storage device may include but is not limited to common types of storage devices such as a solid-state storage device (a solid-state drive, a solid-state hybrid hard drive, etc.), a mechanical hard drive, a USB flash drive, a memory stick, a storage card (e.g., CF, SD, etc.), and other drives (e.g., CD, DVD, HD DVD, Blu-ray, etc.), a random access memory (RAM), a read-only memory (ROM), etc. Among them, RAM includes but is not limited to: decimal counter, selection tube, delay line memory, Williams tube, dynamic random access memory (DRAM), static random access memory (SRAM), thyristor random access memory (T-RAM), and zero Capacitive random access memory (Z-RAM), etc. ROM also has but not limited to: magnetic bubble memory, magnetic button line memory, thin film memory, magnetic plating line memory, magnetic core memory, drum memory, optical disk drive, hard disk, Magnetic tape, early NVRAM (nonvolatile memory), phase change memory, magnetoresistive random access memory, ferroelectric random access memory, nonvolatile SRAM, flash memory, electronic erasable rewritable read-only memory, erasable Programmable read-only memory, programmable read-only memory, shielded heap read memory, floating connection gate random access memory, nano random access memory, racetrack memory, variable resistance memory, and programmable metallization unit, etc. The storage device/storage unit mentioned above are only used for illustration purposes. The storage medium used in the storage device/storage is not limited.

In 102, the speaker device may convert the signal containing sound information into vibrations to generate a sound. The speaker device may use a specific transducer to convert the signal into mechanical vibrations accompanying with energy conversion. The conversion process may include multiple types of energy coexistence and conversion. For example, the electrical signal may be directly converted into mechanical vibrations by the transducers to generate a sound. As another example, the sound information may be included in an optical signal, which may be converted into mechanical vibrations by a specific transducer. Other types of energy that may be coexisted and converted when the transducer works may include thermal energy, magnetic field energy, or the like. In some embodiments, an energy conversion manner of the transducer may include but is not limited to, a moving coil type, an electrostatic type, a piezoelectric type, a moving iron type, a pneumatic type, an electromagnetic type, or the like. A frequency response range and sound quality of the speaker device may be affected by the energy conversion manner and a property of each physical component of the transducer. For example, in a transducer with the moving coil type, a wound cylindrical coil is connected to a vibration plate, the coil driven by a signal current drives the vibration plate to vibrate in the magnetic field, and generate a sound. Factors, such as material expansion and contraction, folds deformation, size, shape, and fixed manner of the vibration plate, the magnetic density of the permanent magnet, etc., may have a large impact on the sound quality of the speaker device.

The term "sound quality" used herein may indicate the quality of sound, which refers to an audio fidelity after post-processing, transmission, or the like. In an audio device, the sound quality may include audio intensity and magnitude, audio frequency, audio overtone, or harmonic components, or the like. When the sound quality is evaluated, measuring manner and the evaluation criteria for objectively evaluating the sound quality may be used, other manners that combine different elements of sound and subjective feelings for evaluating various properties of the sound quality may also be used. Thus, the sound quality may be affected during the processes of generating the sound, transmitting the sound, and receiving the sound.

In 103, the sound is transmitted by a transmission system. In some embodiments, the transmission system refers to a substance that can deliver vibration signals containing sound information, such as the skull, bony labyrinth, inner ear lymph, and spiral organs of humans or/and animals with auditory systems. As another example, the transmission system also refers to a medium that may transmit sound (e.g., air and liquid). To illustrate the process of transmitting sound information by the transmission system, a bone conductive loudspeaker may be taken as an example. The bone conductive loudspeaker may directly transmit sound waves (vibration signals) converted from electrical signals to an auditory center through bones. In addition, the sound waves may be transmitted to the auditory center through air conduction. For the content of air conduction, please refer to the description elsewhere in the specification.

In 104, the sound information is transmitted to a sensing terminal. Specifically, the sound information is transmitted to the sensing terminal through the transmission system. In a working scenario, the speaker device picks up or generates a signal containing sound information, converts the sound information into a sound vibration by the transducer. The speaker device transmits the sound to the sensing terminal through the transmission system, and finally a user can hear the sound. Generally, the subject of the sensing terminal, the auditory system, the sensory organ, etc. described above may be a human or an animal with an auditory system. It should be noted that the following description of the speaker device used by a human does not constitute a restriction on the use scene of the speaker device, and similar descriptions may also be applied to other animals.

The above description of the general working process of the speaker device is merely a specific example, and should not be taken as the only feasible implementation solution. Obviously, for a person skilled in the art, after understanding the basic principle of the speaker device, it may be possible to make various modifications and alterations in the form and detail of the specific manner and steps of implementing the working process of the speaker device without departing from this principle, but these modifications and alterations are still within the scope described above.

Figure 2:
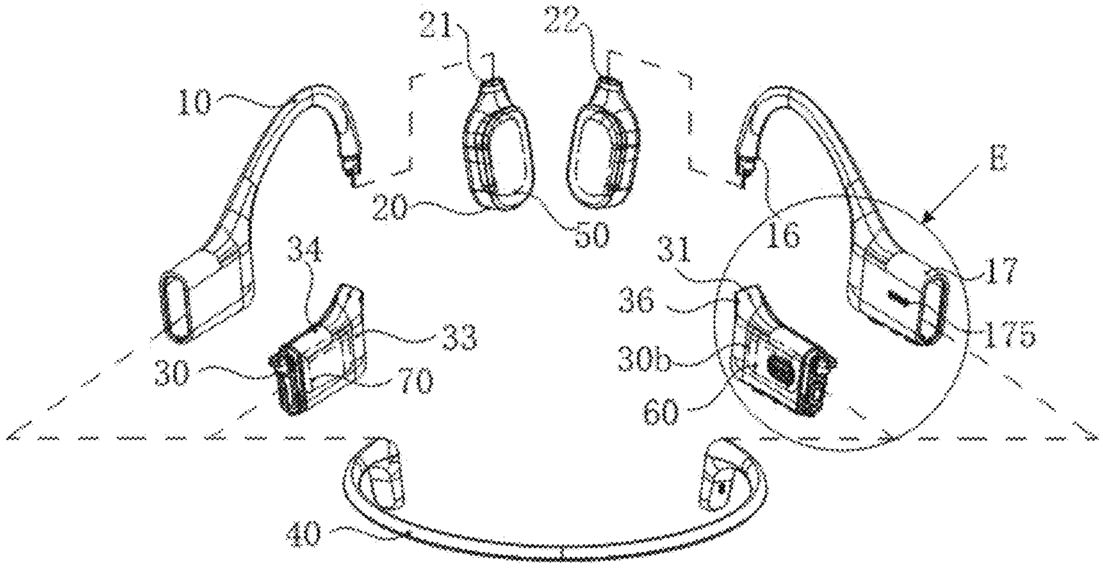
FIG. 2 is schematic diagram illustrating an exploded structure of an exemplary MP3 player according to some embodiments of the present disclosure.

In some embodiments, the speaker device may include, but not limited to, an earphone, an MP3 player, and a hearing aid. In the following specific embodiments of the present disclosure, an MP3 player is taken as an example to describe the speaker device in detail. FIG. 2 is a schematic diagram illustrating an explosion structure of an MP3 player according to some embodiments of the present disclosure. As shown in FIG. 2, an MP3 player may include an ear hook 10, a core housing 20, a circuit housing 30, a rear hook 40, an earphone core 50, a control circuit 60, and a battery 70. The core housing 20 and the circuit housing 30 are disposed at two ends of the ear hook 10 respectively, and the rear hook 40 is further disposed at an end of the circuit housing 30 away from the ear hook 10. The count of the core housings 20 is two, which are configured to accommodate two earphone cores 50 respectively. The count of the circuit housings 30 is also two, which are configured to accommodate the control circuit 60 and the battery 70 respectively. The two ends of the rear hook 40 are connected to the corresponding circuit housings 30 respectively.

Figure 3:
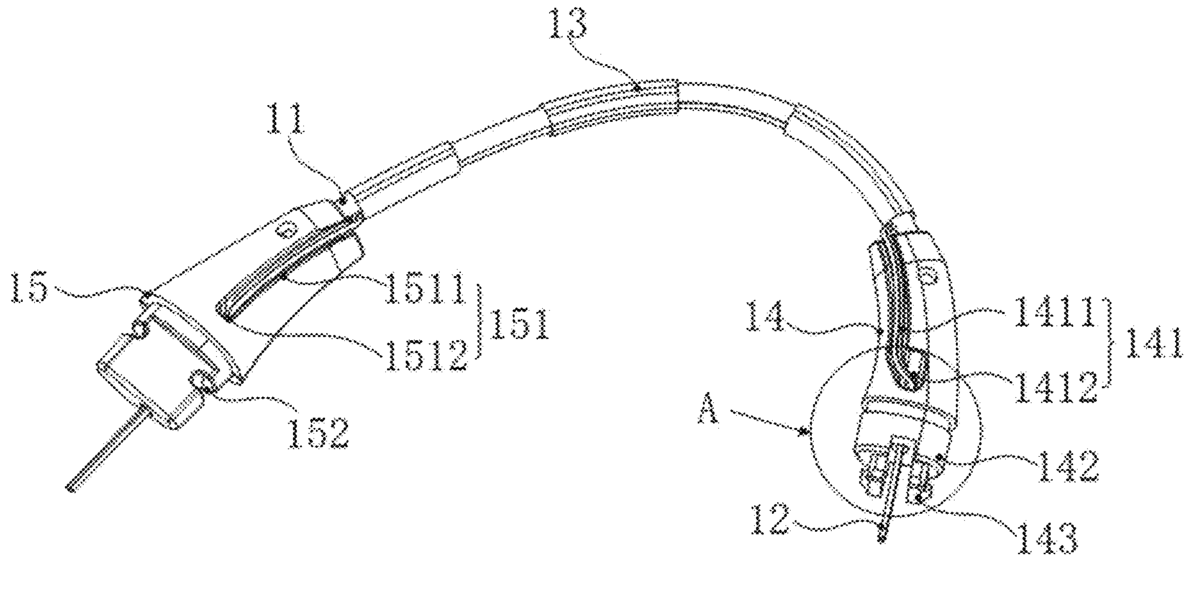
FIG. 3 is a schematic diagram illustrating a part of a structure of an ear hook of an MP3 player according to some embodiments of the present disclosure.
Figure 4:
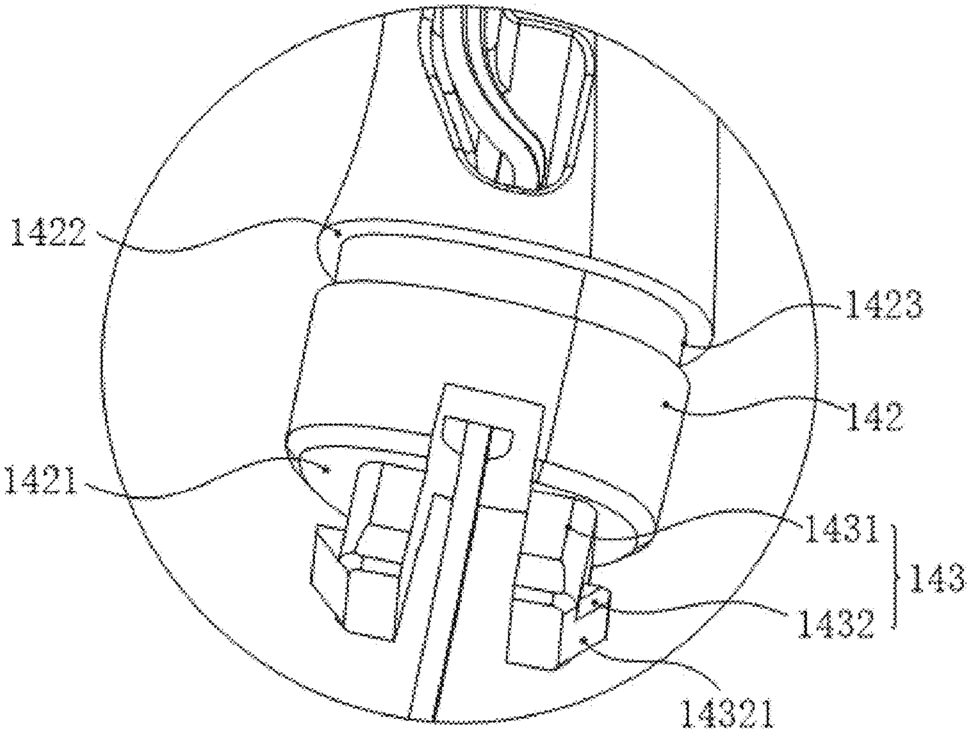
FIG. 4 is a schematic diagram illustrating a partial enlarged view of part A in FIG. 3.

FIG. 3 is a schematic diagram illustrating a partial structure of an ear hook of an MP3 player according to some embodiments of the present disclosure. FIG. 4 is a schematic diagram illustrating a partial enlarged view of part A in FIG. 3.

Referring to FIG. 2, FIG. 3, and FIG. 4, the ear hook 10 may include an elastic metal wire 11, a wire 12, a fixing sleeve 13, a plug end 14, and a plug end 15. The plug end 14 and the plug end 15 may be disposed at both ends of the elastic metal wire 11. In some embodiments, the ear hook 10 may further include a protective sleeve 16 and a housing sheath 17 integrally formed with the protective sleeve 16.

The protective sleeve 16 may be injection molded around a periphery of the elastic metal wire 11, the wire 12, the fixing sleeve 13, the plug end 14, and the plug end 15. Thus, the protective sleeve 16 may be fixedly connected with the elastic metal wire 11, the wire 12, the fixing sleeve 13, the plug end 14, and the plug end 15, respectively. There is no need to form the protective sleeve 16 separately by injection molding and then further wrap protective sleeve 16 around the periphery of the elastic metal wire 11, the plug end 14, and the plug end 15, thereby simplifying the manufacturing and assembly processes and improving the reliability and stability of the fixation of the protective sleeve 16.

In some embodiments, a first wiring channel 141 and a second wiring channel 151 may be disposed on the plug end 14 and the plug end 15, respectively. The first wiring 141 may include a first routing groove 1411 and a first routing hole 1412 connecting with the first routing groove 1411. The wire 12 at the plug end 14 may extend along the first wiring groove 1411 and the first wiring hole 1412 and be exposed on the outer end surface of the plug end 14 to further connect to other structures. Accordingly, the second wiring channel 151 may include a second wiring groove 1511 and a second wiring hole 1512 connecting with the second wiring groove 1511. The wire 12 at the plug end 15 may extend along the second wiring groove 1511 and the second wiring hole 1512 and be exposed on the outer end surface of the plug end 15 to further connect to other structures. In some embodiments, an end of the wire 12 of the ear hook 10 disposed outside the core housing 20 may pass through the second wiring channel 151 to connect the circuits outside the core housing 20, such as the control circuit 60, the battery 70, etc. included in the circuit housing 30. Another end of the wire 12 may be exposed to the outer end surface of the plug end 14 along the first wiring channel 141, and further enter the core housing 20 through the socket 22 along with the insertion unit 142.

Referring to FIG. 2, in some embodiments, when the protective sleeve 16 is formed, a housing sheath 17 disposed on the side close to the plug end 15 may be integrally formed with the protective sleeve 16. In some embodiments, the housing sheath 17 may be integrally formed with the protective sleeve 16 to form a whole structure. The circuit housing 30 may be connected to one end of the ear hook 10 by being fixedly connected to the plug end 15. The housing sheath 17 may be further wrapped around the periphery of the circuit housing 30 in a sleeved manner. In some embodiments, the protective sleeve 16 and the housing sheath 17 may include soft material with certain elasticity, such as silica gel, rubber, or the like, or any combination thereof. In some embodiments, the protective sleeve 16 and/or the housing sheath 17 may include waterproof material such that the MP3 player may have a waterproof function. Exemplary waterproof material may include, but not limited to, plastics (e.g., high-molecular polyethylene, blown nylon, engineering plastics, etc.), fiber (e.g., glass fiber), other single or composite materials, other organic and/or inorganic materials, or the like, or any combination thereof.

In some embodiments, the core housing 20 may be used to accommodate the earphone core 50 and may be plugged and fixed with the plug end 14. The count (or the number) of the earphone cores 50 and the core housings 20 may be two, which may be corresponding to the left ear and the right ear of the user, respectively. For example, during operation, the core housings 20 may be attached to the user's left ear and the right ear, respectively.

Referring to FIG. 2 and FIG. 3, in some embodiments, the core housing 20 and the plug end 14 may be connected in a plug manner, a clamping manner, etc., so as to fix the core housing 20 and the ear hook 10 together. That is, in this embodiment, the ear hook 10 and the core housing 20 may be formed separately, and the ear hook 10 and the core housing 20 may be assembled instead that the ear hook 10 and the core housing 20 may be integrally formed together. In this way, the ear hook 10 and the core housing 20 may be molded separately with corresponding molds instead of using a relatively large mold to integrally form the two, which may reduce the size of the molds and the difficulty of the manufacture of the molds and the molding process. In addition, since the ear hook 10 and the core housing 20 are processed using different molds, when the shape or structure of the ear hook 10 or the core housing 20 needs to be adjusted in the manufacturing process, it is sufficient to adjust the mold corresponding to the structure instead of adjusting the mold of another one, thereby reducing the production cost. In some embodiments, the ear hook 10 and the core housing 20 may be integrally formed according to different needs.

Figure 5:
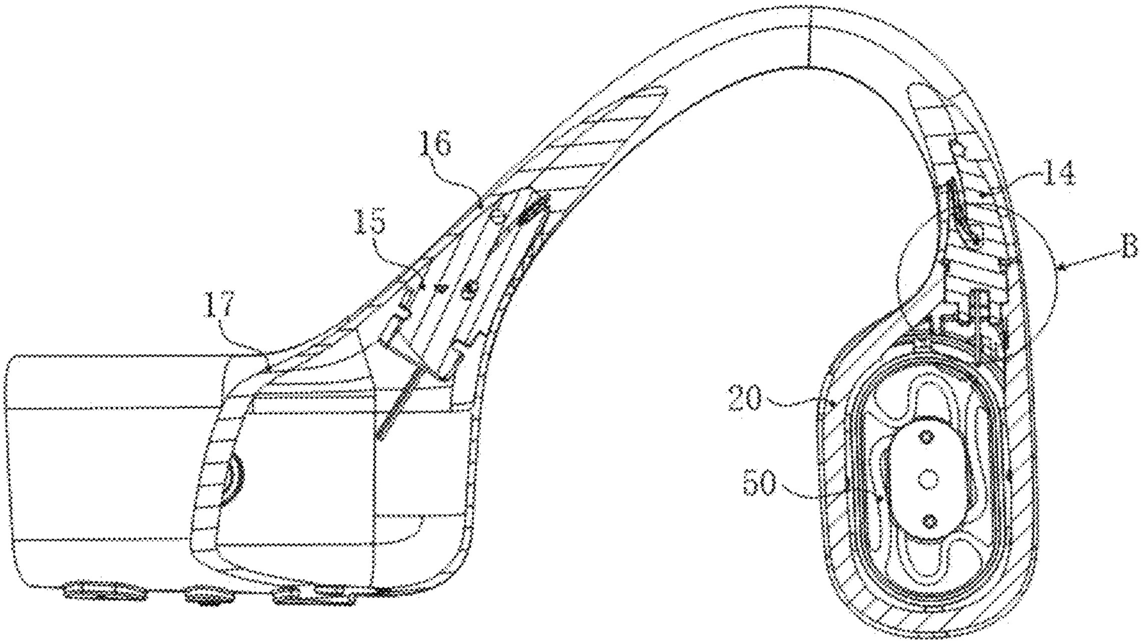
FIG. 5 is a schematic diagram illustrating a partial sectional view of an MP3 player according to some embodiments of the present disclosure.
Figure 6:
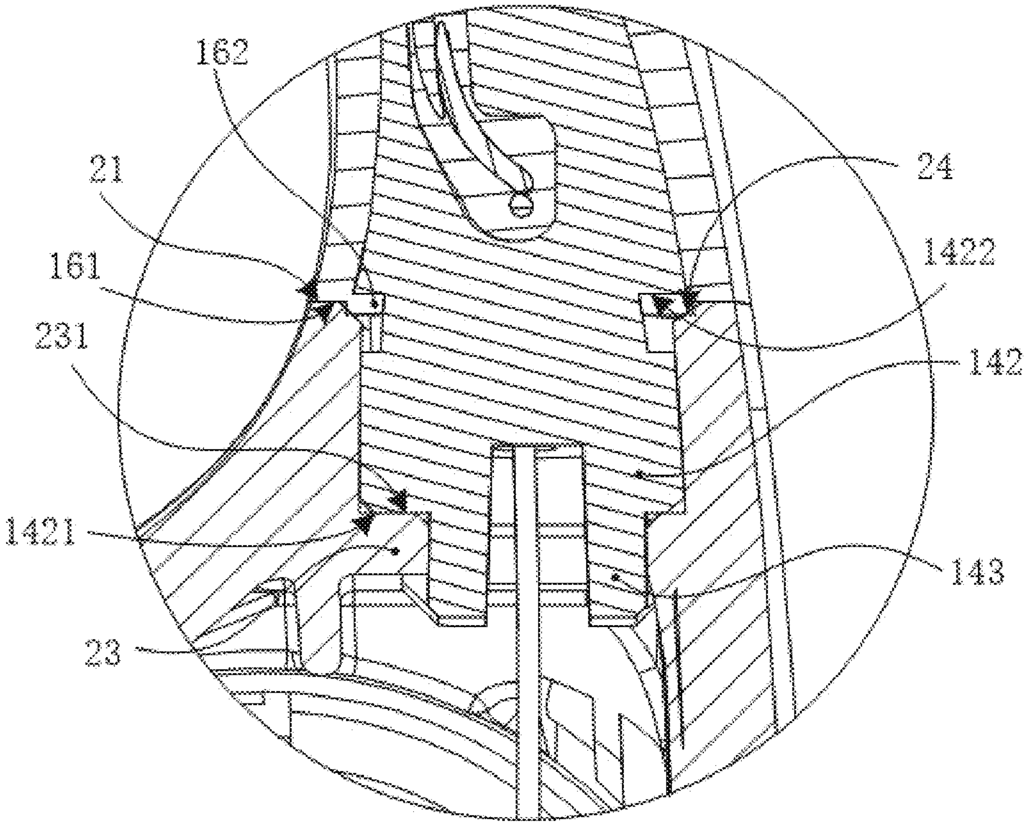
FIG. 6 is a schematic diagram illustrating a partial enlarged view of part B in FIG. 5.

FIG. 5 is a schematic diagram illustrating a partial sectional view of an MP3 player according to some embodiments of the present disclosure. FIG. 6 is a schematic diagram illustrating a partial enlarged view of part B in FIG. 5. Referring to FIG. 2, FIG. 5, and FIG. 6, in some embodiments, the core housing 20 may include a socket 22 communicating with an outer end surface 21 of the core housing 20, and a stopping block 23 may be disposed on an inner side wall of the socket 22. The outer end surface 21 of the core housing 20 refers to an end surface of the core housing 20 facing the ear hook 10. The socket 22 may be configured to provide an accommodating space for the plug end 14 of the ear hook 10, which may be inserted into the core housing 20, so as to realize the plug and fixation between the plug end 14 and the core housing 20. In some embodiments, the stopping block 23 may be formed by the inner side wall of the socket 22 protruding in a direction perpendicular to the inner side wall. In some embodiments, the stopping block 23 may include a plurality of block-shaped protrusions disposed at intervals. Alternatively, the stopping block 23 may be an annular protrusion extending along the inner side wall of the socket 22, which is not limited herein.

Referring to FIG. 2 and FIG. 6, in some embodiments, the plug end 14 may include an insertion unit 142 and two elastic hooks 143. Specifically, the insertion unit 142 may be at least partially inserted into the socket 22 and abut against an outer surface 231 of a stopping block 23. A shape of the outer side wall of the insertion unit 142 may match that of the inner side wall of the socket 22, so that the outer side wall of the insertion unit 142 may abut against the inner side wall of the socket 22 when the insertion unit 142 is at least partially inserted into the socket 22. The outer surface 231 of the stopping block 23 refers to a side of the stopping block 23 facing the ear hook 10. The insertion unit 142 may include an end surface 1421 facing the core housing 20. The end surface 1421 may match the outer surface 231 of the stopping block 23, so that the end surface 1421 of the insertion unit 142 may abut against the outer surface 231 of the stopping block 23 when the insertion unit 142 is at least partially inserted into the socket 22.

Referring to FIG. 2 and FIG. 4, in some embodiments, the two elastic hooks 143 may be disposed side by side and spaced apart symmetrically on the side of the insertion unit 142 facing an inside of the core housing 20 along the direction of insertion. Each elastic hook 143 may include a beam portion 1431 and a hook portion 1432. The beam portion 1431 may be connected to a side of the insertion unit 142 facing the core housing 20. The hook portion 1432 may be disposed on the beam portion 1431 away from the insertion unit 142 and extend perpendicular to the inserted direction. Further, each hook portion 1432 may include a side parallel to the inserted direction and a transitional slope 14321 away from the end surface 1421 of the insertion unit 142.

Referring to FIG. 2, FIG. 3, FIG. 4, and FIG. 6, during the mounting of the ear hook 10 and the core housing 20, the plug end 14 may gradually enter the core housing 20 from the socket 22. When the plug end 14 reaches a position of the stopping block 23, the two elastic hooks 143 may be blocked by the stopping block 23. Under the action of an external force, the stopping block 23 may gradually squeeze the transition slope 14321 of the hook portion 1432 to make the two elastic hooks 143 elastically deform and get close to each other. When the transition slope 14321 passes through the stopping block 23 and reaches the side of the stopping block 23 close to the inside of the core housing 20, the elastic hook 143 may elastically recover without blocking of the stopping block 23, and the elastic hook 143 may be clamped on an inner side of the stopping block 23 facing the core housing 20. The stopping block 23 may be clamped between the insertion unit 142 and the hook portion 1432 of the plug end 14, thereby realizing plug and fixation of the core housing 20 and the plug end 14.

In some embodiments, after the core housing 20 and the plug end 14 are plugged and fixed, the insertion unit 142 may be partially inserted into the socket 22. The exposed portion of the insertion unit 142 may have a stepped structure, so as to form an annular table 1422 (also referred to as "second annular table") spaced apart from the outer end surface 21 of the core housing 20. It should be noted that the exposed portion of the insertion unit 142 refers to the portion of the insertion unit 142 exposed to the core housing 20. Specifically, the exposed portion of the insertion unit 142 refers to the portion exposed to the core housing 20 and close to the outer end surface of the core housing 20.

In some embodiments, the annular table 1422 may be disposed opposite to the outer end surface 21 of the core housing 20. A space between the annular table 1422 and the outer end surface 21 may refer to a space along the direction of insertion and a space perpendicular to the direction of insertion. In some embodiments, the protective sleeve 16 may extend to the side of the annular table 1422 facing the outer end surface 21 of the core housing 20. When the socket 22 and the plug end 14 of the core housing 20 are plugged and fixed, the protective sleeve 16 may be at least partially filled in the space between the annular table 1422 and the outer end surface 21 of the core housing 20, and elastically abut against the core housing 20. Thus, it is difficult for external liquid to enter into the core housing 20 from a junction between the plug end 14 and the core housing 20, thereby realizing the sealing between the plug end 14 and the socket 22, protecting the earphone core 50, etc. inside the core housing 20, and improving the waterproof performance of the MP3 player.

Figure 7:
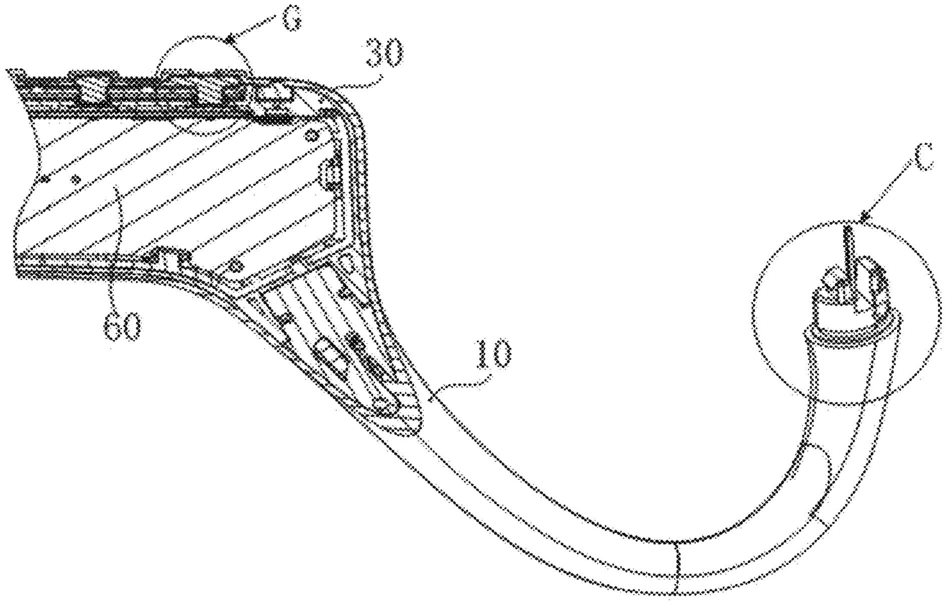
FIG. 7 is a schematic diagram illustrating a cross-sectional view of a partial structure of an MP3 player according to some embodiments of the present disclosure.
Figure 8:
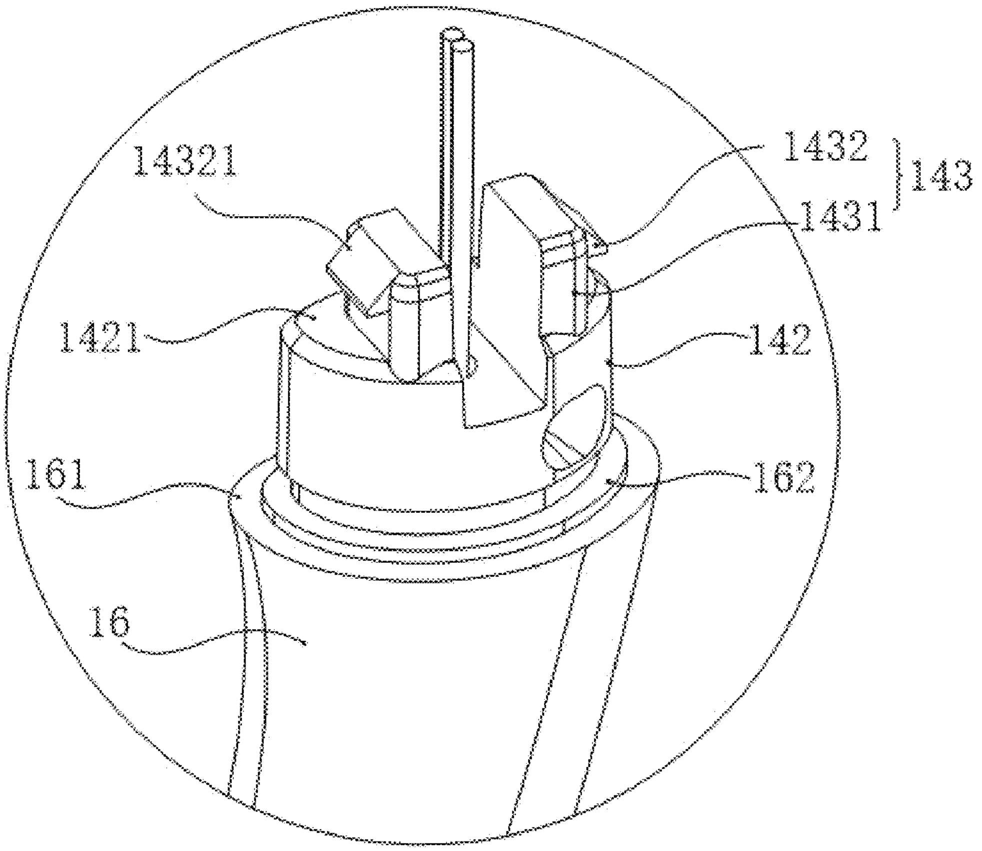
FIG. 8 is a schematic diagram illustrating a partial enlarged view of part C in FIG. 7.

FIG. 7 is a schematic diagram illustrating a cross-sectional view of a partial structure of an MP3 player according to some embodiments of the present disclosure. FIG. 8 is a schematic diagram illustrating a partial enlarged view of part C in FIG. 7. Referring to FIG. 2, FIG. 7, and FIG. 8, in some embodiments, the protective sleeve 16 may include an annular abutting surface 161 on the outer end surface 21 of the annular table 1422 facing the outer end surface of the core housing 20. The annular abutting surface 161 may be the end surface of the protective sleeve 16 facing the core housing 20.

In some embodiments, the protective sleeve 16 may further include an annular protruding table 162 locating inside the annular abutting surface 161 and protruding from the annular abutting surface 161. Specifically, the annular protruding table 162 may be formed on the side of the annular abutting surface 161 facing the plug end 14, and may protrude toward the core housing 20 relative to the annular abutting surface 161. Further, the annular protruding table 162 may be directly formed on the periphery of the annular table 1422 and cover the annular table 1422.

Referring to FIG. 2, FIG. 6, and FIG. 8, in some embodiments, the core housing 20 may include a connecting slope 24 configured to connect the outer end surface 21 of the core housing 20 and the inner side wall of the socket 22. The connecting slope 24 may be a transitional surface between the outer end surface 21 of the core housing 20 and the inner side wall of the socket 22. The connecting slope 24 may be not on the same plane as the outer end surface 21 of the core housing 20 and the inner side wall of the socket 22. In some embodiments, the connecting slope 24 may be a flat surface, a curved surface or other shapes according to actual needs, which is not limited herein.

In some embodiments, when the core housing 20 and the plug end 14 are plugged and fixed, the annular abutting surface 161 and the annular protruding table 162 may elastically abut against the outer end surface of the core housing 20 and the connecting slope 24, respectively. It should be noted that since the outer end surface 21 of the core housing 20 and the connecting slope 24 are not on the same plane, the elastic abutment between the protective sleeve 16 and the core housing 20 may be not on the same plane. Thus, it is difficult for external liquid to enter the core housing 20 from the junction of the protective sleeve 16 and the core housing 20, and further enter the earphone core 50 thereby improving the waterproof performance of the MP3 player, protecting the inner structure of the MP3 player, and extending the service life of the MP3 player.

Referring to FIG. 2, FIG. 4, and FIG. 6, in some embodiments, the insertion unit 142 may include an annular groove 1423 on the side of the annular table 1422 facing the outer end surface 21 of the core housing 2, and the annular groove 1423 may be adjacent to the annular table 1422. The annular protruding table 162 may be formed in the annular groove 1423. In this embodiment, the annular groove 1423 may form a side of the annular table 1422 facing the core housing 20. In an exemplary application scenario, the annular table 1422 may be a side wall surface of the annular groove 1423 facing the core housing 20. In such cases, the annular protruding table 162 may be formed in the annular groove 1423 along the side wall surface.

Figure 9:
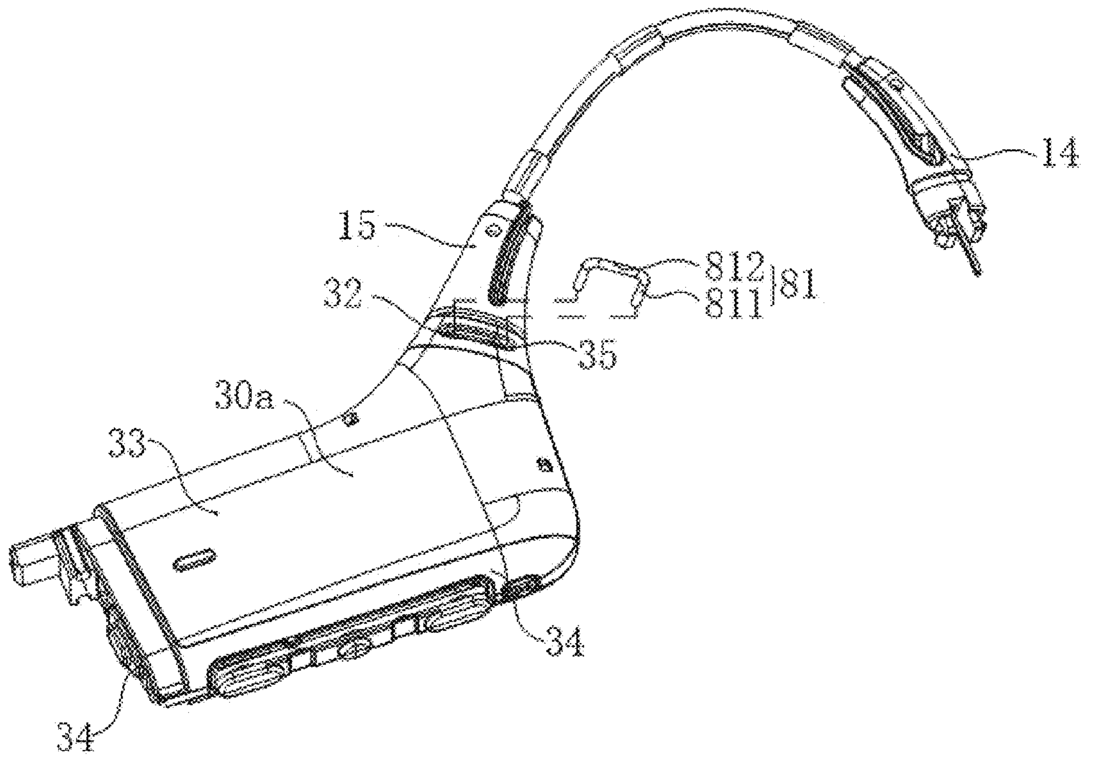
FIG. 9 is a schematic diagram illustrating an exploded view of partial structures of an exemplary circuit housing and an exemplary ear hook according to some embodiments of the present disclosure.
Figure 10:
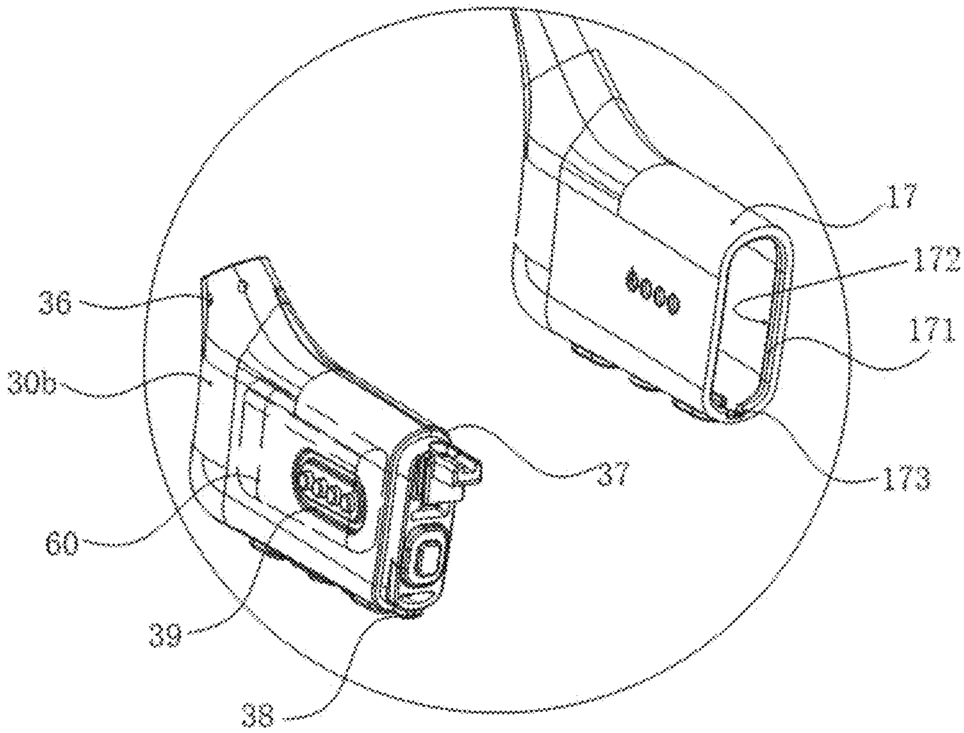
FIG. 10 is a schematic diagram illustrating a partial enlarged view of part E in FIG. 2.

FIG. 9 is a schematic diagram illustrating an exploded view of partial structures of an exemplary circuit housing and an exemplary ear hook of an exemplary MP3 player according to some embodiments of the present disclosure. FIG. 10 is a schematic diagram illustrating a cross-sectional view of a partial structure of an MP3 player according to some embodiments of the present disclosure.

Referring to FIG. 2, FIG. 3, FIG. 9, and FIG. 10, in some embodiments, the circuit housing 30 and the plug end 15 may be plugged and fixed such that the circuit housing 30 may be fixed on an end of the ear hook 10 away from the core housing 20. When worn by the user, the circuit housing 30 including the battery 70 and the circuit housing 30 including the control circuit 60 may correspond to the left and right ear of the user, respectively. A connection manner between the circuit housing 30 and the corresponding plug end 15 and that between the control circuit 60 and the corresponding plug end 15 may be different. In some embodiments, the circuit housing 30 may be connected to the plug end 15 in a plug manner, a snapping manner, or the like, or any combination thereof. In this embodiment, the ear hook 10 and the circuit housing 30 may be formed separately, and assembled together, instead of integrally forming the ear hook 10 and the circuit housing 30. In this case, the ear hook 10 and the circuit housing 30 may be molded separately with corresponding molds instead of using a relatively large mold to integrally form the ear hook 10 and the circuit housing 30, which may reduce the size of the mold, the difficulty of the manufacture of the mold, and the molding process. In addition, since the ear hook 10 and the circuit housing 30 are processed using different molds, when the shape or structure of the ear hook 10 or the circuit housing 30 needs to be adjusted in the manufacturing process, the mold corresponding to the structure may be adjusted instead of adjusting the mold of another one thereby reducing the production cost.

In some embodiments, the circuit housing 30 may include a socket 31. A shape of an inner surface of the socket 31 may match that of at least part of the outer end surface of the plug end 15, and the plug end 15 may be at least partially inserted into the socket 31. In some embodiments, two slots 152 may be disposed on each of opposite sides of the plug end 15, and the two slots 152 may be disposed perpendicular to the inserted direction of the plug end 15 with respect to the socket 31, respectively. Specifically, the two slots 152 may be symmetric and spaced apart on opposite sides of the plug end 15, and may be connected to the sidewall of the plug end 15 in the vertical direction of the inserted direction of the plug end 15.

In some embodiments, the circuit housing 30 may be flat. For example, a shape of a cross-section of the circuit housing 30 at the socket 31 may be elliptical or other shapes that may be flattened. In this embodiment, the two opposite side walls of the circuit housing 30 with a relatively large area may be main side walls 33, and two opposite side walls with a relatively small area connecting the two main side walls 33 may be auxiliary side walls 34. In some embodiments, the first side wall 30*a* of the circuit housing 30 may include one of the main side walls 33 of the circuit housing 30 or the auxiliary side wall 34 of the circuit housing 30, which may be set according to actual needs. In some embodiments, the circuit housing 30 may be flat. For example, a shape of a cross-section of the circuit housing 30 at the socket 31 may be elliptical or other shapes that may be flattened.

In some embodiments, the MP3 player may include a fixing member 81. The fixing member 81 may include two parallel pins 811 and a connecting portion 812 configured to connect the pins 811. Specifically, the connecting portion 812 may be vertically connected to ends of the two pins 811 at the same side, thereby forming the U-shaped fixing member 81. In some embodiments, a first side wall 30*a* of the circuit housing 30 may include two through holes 32 corresponding to the positions of the two slots 152, and the two through holes 32 may penetrate the first side wall 30*a*. Ends of the two pins 811 away from the connecting portion 812 may be inserted into the slot 152 from the outside of the circuit housing 30 through the through holes 32, and the connecting portion 812 may be blocked from the outside of the circuit housing 30, thereby plugging and fixing the circuit housing 30 and the plug end 15.

In some embodiments, the first side wall 30*a* of the circuit housing 30 may include a strip groove 35 configured to connect the two through holes 32. When the fixing member 81 is used for plugging and fixing the circuit housing 30 and the plug end 15, a portion or the entire of the connecting portion 812 may be sunk in the strip groove 35. In such cases, the MP3 player may have a relatively uniform structure, and a groove corresponding to the connecting portion 812 may not be disposed on a housing sheath 17 sleeved on the periphery of the circuit casing 30, thereby simplifying the mold of the housing sheath 17. On the other hand, the space occupied by the MP3 player as a whole may be reduced to a certain extent.

In some embodiments, after a portion or the entire of the connecting portion 812 is sunk in the strip groove 35, a sealant may be applied in the strip groove 35. In such cases, the fixing member 81 may be fixed on the circuit housing 30, thereby improving the stability of the connection between the plug end 15 and the socket 31. In addition, after the connecting portion 812 is sunk in the strip groove 35, the strip groove 35 may be filled with the sealant, and a surface of the strip groove 35 may be consistent with the first side wall 30*a* of the circuit housing 30, thereby improving the smooth and consistence of the strip groove 35 and surrounding structures.

Referring to FIG. 2, FIG. 3, and FIG. 9, in some embodiments, the second side wall 30*b* of the circuit housing 30 opposite to the first side wall 30*a* of the circuit housing 30 may include through hole(s) 36 opposite to the through hole(s) 32, and the pin 811 may pass through the slot 152 and insert into the through hole(s) 36. Specifically, the first side wall 30*a* of the circuit housing 30 and the second side wall 30*b* of the circuit housing 30 may be the main side walls 33 or the auxiliary side walls 34 of the circuit housing 30. In this embodiment, the first side wall 30*a* and the second side wall 30*b* of the circuit housing 30 may be two opposite main side walls 33 of the circuit housing 30. Two through holes 32 and two through holes 36 may be disposed on the side wall of the circuit housing 30 with a relatively larger area, respectively. A relatively large interval may be disposed between two pins 811 of the fixing member 81 to improve the span of the fixing member 81 and improve the stability of the connection between the plug end 15 and the socket 31.

In this embodiment, a pin 811 may be inserted into the slot 152 through the through hole 32, and further inserted into the through hole 36 through the slot 152. That is, the pin 811 may penetrate and connect two opposite main side walls 33 of the circuit housing 30 and the plug end 15, thereby improving the plugging stability between the plug end 15 and the circuit housing 30.

Further, as described in the foregoing embodiments, when the protective sleeve 16 is formed, the protective sleeve 16 may be integrally formed with a housing sheath 17 disposed close to the plug end 15. The housing sheath 17 and the circuit housing 30 may be formed separately, and the shape of the inner side wall of the housing sheath 17 may match the outer side wall of the circuit housing 30. After the housing sheath 17 and the circuit housing 30 are separately formed, the housing sheath 17 may wrap around the periphery of the circuit housing 30 in a sleeved manner. It should be noted out that the environmental temperature during the molding of the housing sheath 17 may be relatively high, and the high temperature may cause damage to the control circuit 60 or the battery 70 contained in the circuit housing 30. The circuit housing 30 and the housing sheath 17 may be molded separately and assembled together to avoid the damage to the control circuit 60 or the battery 70 caused by the high temperature during the molding of the housing sheath 17, thereby reducing the damage to the control circuit 60 or the battery 70 brought by the molding. Further, the housing sheath 17 may have a bag-like structure with an open end, and the circuit housing 30 may enter into the housing sheath 17 through the open end of the housing sheath 17.

In this embodiment, after the housing sheath 17 is integrally formed with the protective sleeve 16 to form a whole structure, the whole structure may be removed from the mold by rolling the housing sheath 17 from the open end. When performing a visual inspection, a silk-screening, or other surface treatment for the housing sheath 17, the housing sheath 17 may be put on a preset structure through the opening for operation, and after the operation is completed, the housing sheath 17 may be rolled up and removed from the preset structure. After performing the operation, the housing sheath 17 may be coved on the periphery of the circuit casing 30 through the opening. In the above-mentioned operation, the removal of the housing sheath 17 from the mold is not limited to the above-mentioned rolling up method, and it may include inflated method, or the like, which is not limited herein.

Specifically, the opening of the housing sheath 17 may be disposed on an end of the housing sheath 17 away from the protective sleeve 16, and the circuit housing 30 may enter into housing sheath 17 from the end of the housing sheath 17 away from the protective sleeve 16 and covered by the housing sheath 17.

Figure 11:
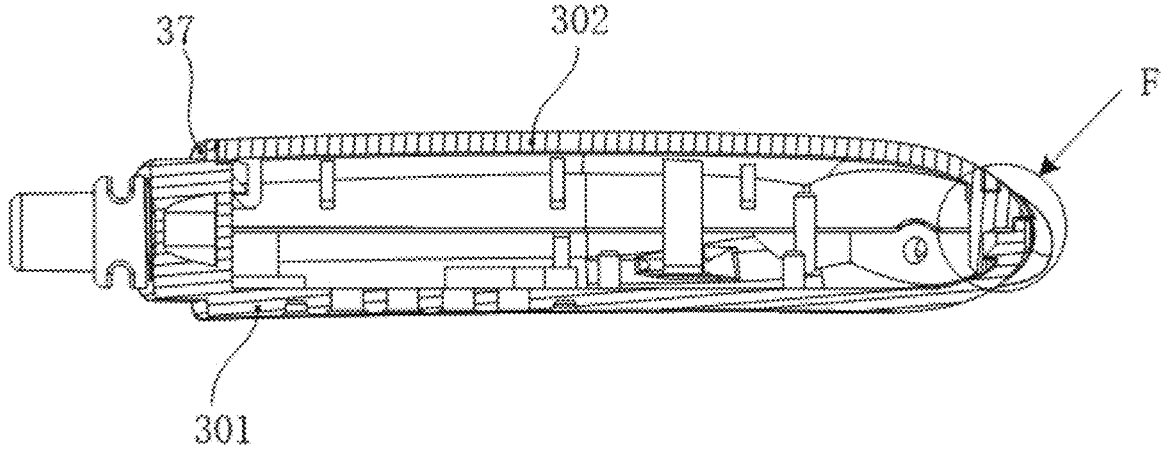
FIG. 11 is a schematic diagram illustrating a cross-sectional view of a circuit housing of an MP3 player according to some embodiments of the present disclosure.

FIG. 11 is a schematic diagram illustrating a partial enlarged view of part E in FIG. 2. Referring to FIG. 1 and FIG. 11, in some embodiments, the open end of the housing sheath 17 may include an annular flange 171 protruding inward. Further, the end of the circuit housing 30 away from the ear hook 10 may have a stepped structure, so as to form an annular table 37 (also referred to as “first annular table”). The annular flange 171 may abut on the annular table 37 when the housing sheath 17 covers the periphery of the circuit housing 30. In some embodiments, the annular flange 171 may be formed by the inner wall surface of the open end of the housing sheath 17 protruding to a certain thickness toward the inside of the housing sheath 17. The annular flange 171 may include a flange surface 172 facing the ear hook 10. The annular table 37 may be opposite to the flange surface 172 and toward a direction of the circuit housing 30 away from the ear hook 10. A height of the flange surface 172 of the annular flange 171 may be not greater than a height of the annular table 37, and the inner wall surface of the housing sheath 17 may abut the side wall of the circuit housing 30 and the housing sheath 17 may tightly cover the periphery of the circuit housing 30 when the flange surface 172 of the annular flange 171 abuts the annular table 37. In some embodiments, a sealant may be applied to a joint region between the annular flange 171 and the annular table 37. Specifically, when the housing sheath 17 is covered, the sealant may be coated on the annular table 37 to seal the housing sheath 17 and the circuit housing 30.

In some embodiments, the circuit housing 30 may include a positioning block 38. The positioning block 38 may be disposed on the annular table 37 and extend along a direction of the circuit housing 30 away from the ear hook 10. Specifically, the positioning block 38 may be disposed on the auxiliary sidewall 34 of the circuit housing 30, and a thickness of the positioning block 38 protruding on the auxiliary sidewall 34 may be consistent with the height of the annular table 37. The count of positioning blocks 38 may be set according to needs. In some embodiments, the annular flange 171 of the housing sheath 17 may include a positioning groove 173 corresponding to the positioning block 38, and the positioning groove 173 may cover at least a portion of the positioning block 38 when the housing sheath 17 covers the periphery of the circuit housing 30. In such cases, when the housing sheath 17 is installed, the housing sheath 17 may be positioned according to positions of the positioning block 38 and the positioning groove 173, thereby improving accuracy and efficiency of the installation of the housing sheath 17. In some embodiments, the positioning block 38 may be omitted according to actual requirements.

Figure 12:
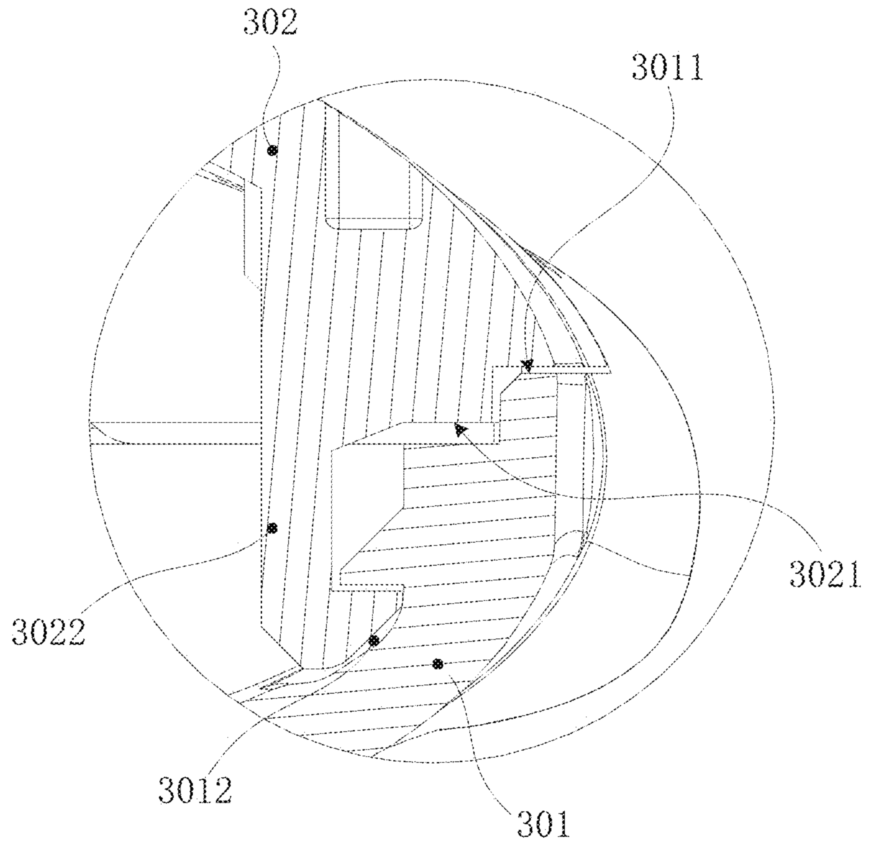
FIG. 12 is a schematic diagram illustrating a partial enlarged view of part F in FIG. 11.

FIG. 11 is a schematic diagram illustrating an exemplary core housing of an exemplary MP3 player according to some embodiments of the present disclosure. FIG. 12 is a schematic diagram illustrating a partial enlarged view of part F in FIG. 11.

Referring to FIG. 2 and FIG. 11, in some embodiments, the circuit housing 30 may include a first sub-housing 301 and a second sub-housing 302 that may be fastened to each other. Specifically, the two sub-housings may be symmetrically buckled along a center line of the circuit housing 30, or in other manners according to actual needs. In addition, a fastening manner of the two sub-housings of the circuit housing 30 for accommodating the control circuit 60 and a fastening manner of the two sub-housings of the circuit housing 30 for accommodating the battery 70 may be the same or different.

In some embodiments, the annular table 37 of the circuit housing 30 may be formed on the first sub-housing 301, and the two sub-housings may be joined on the side of the annular table 37 facing the ear hook 10, and the housing sheath 17 may cover a joint seam of the two sub-housings. An internal space of the circuit housing 30 may be sealed to a certain extent, thereby improving the waterproof performance of the MP3 player.

In some embodiments, the annular table 37 of the circuit housing 30 may be formed by the two sub-housings, and at least a portion of each of the two sub-housings may be combined on a side of the annular table 37 away from the ear hook 10. In this case, the housing sheath 17 may not cover the joint seam of the two sub-housings on the side of the annular table 37 away from the ear hook 10. In this application scenario, the joint seam may be further covered in other manners.

Referring to FIG. 2 and FIG. 12, in some embodiments, the joint surfaces of the two sub-housings abutting each other may have stepped shapes matching each other. Specifically, an end surface of the first sub-housing 301 facing the second sub-housing 302 may include a stepped first step surface 3011, and an end surface of the second sub-housing 302 facing the first sub-housing 301 may include a stepped second step surface 3021. The shape and size of the first stepped surface 3011 and the second stepped surface 3021 may be the same, so that they can fit and abut each other. The joining surfaces of the two sub-housings of the circuit housing 30 abutting each other are stepped and not on the same plane, thereby preventing the liquid outside the circuit housing 30 from entering the circuit housing from the periphery of the circuit housing 30, improving the waterproof performance of the MP3 player, and protecting the control circuit 60 or the battery 70 inside the circuit housing 30.

In some embodiments, a mounting hook 3022 may be disposed on the second stepped surface 3021 of the second sub-housing 302, and the mounting hook 3022 may face the first sub-housing 30*a*. Correspondingly, the first sub-housing 301 may include a mounting groove 3012 matching the mounting hook 3022. When the first sub-housing 301 and the second sub-housing 302 are installed, the mounting hook 3022 may cross the outer side wall of the mounting groove 3012 under an action of an external force and enter the mounting groove 3012. A hook portion of the mounting hook 3022 may be hooked to the inner side wall of the hook groove 3012, thereby realizing the buckling of the first sub-housing 301 and the second sub-housing 302.

Figure 13:
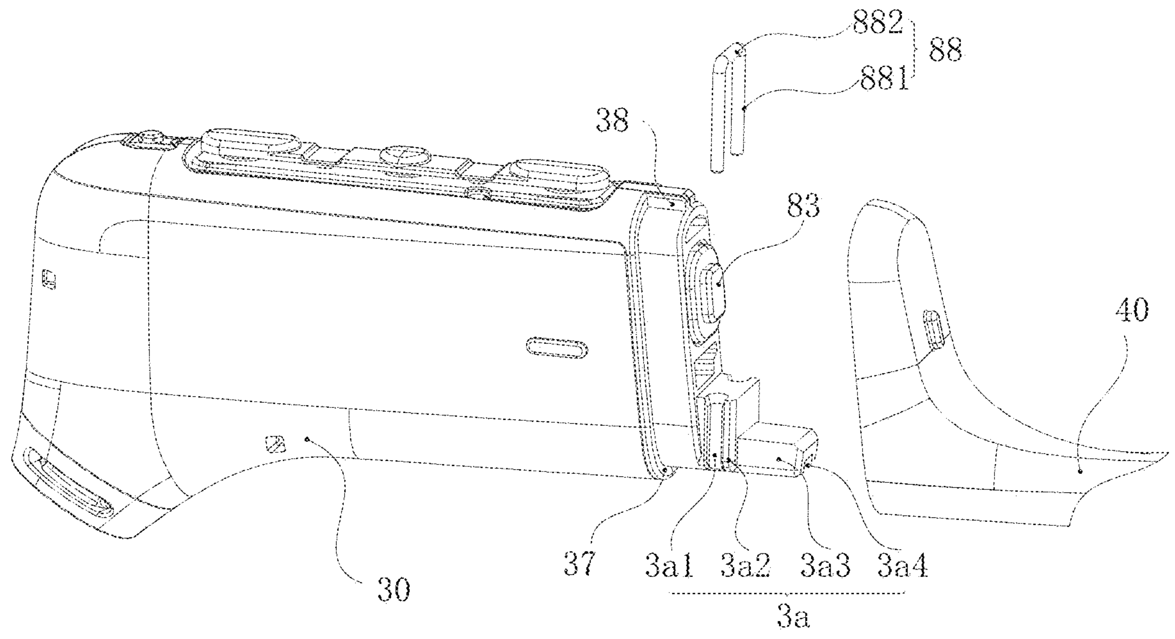
FIG. 13 is a schematic diagram illustrating an exploded view of partial structures of an exemplary circuit housing and an exemplary rear hook of an MP3 according to some embodiments of the present disclosure.
Figure 14:
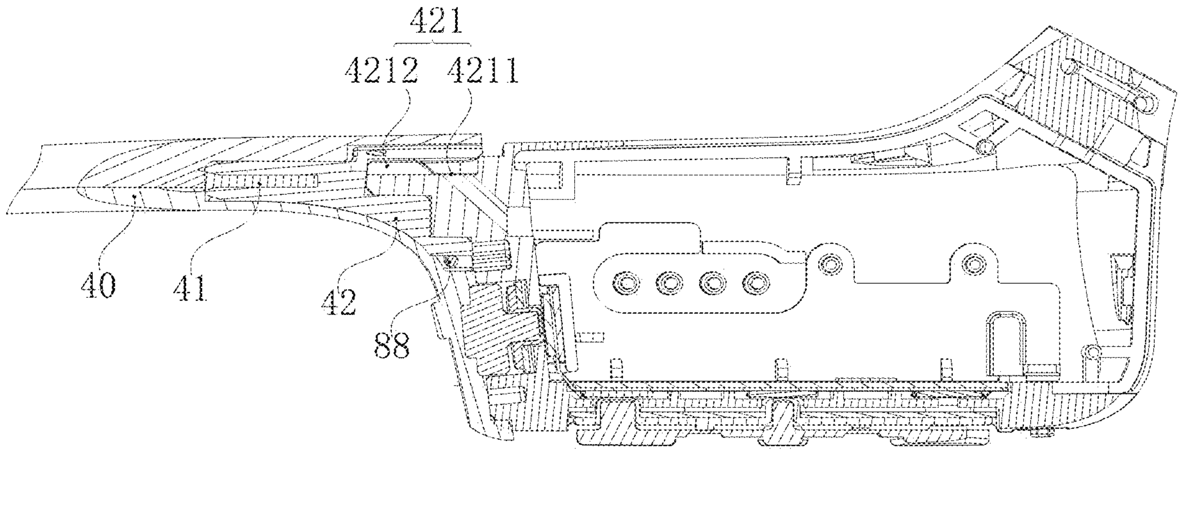
FIG. 14 is a schematic diagram illustrating a cross-sectional view of partial structures of an exemplary circuit housing and an exemplary rear hook of an MP3 according to some embodiments of the present disclosure.
Figure 15:
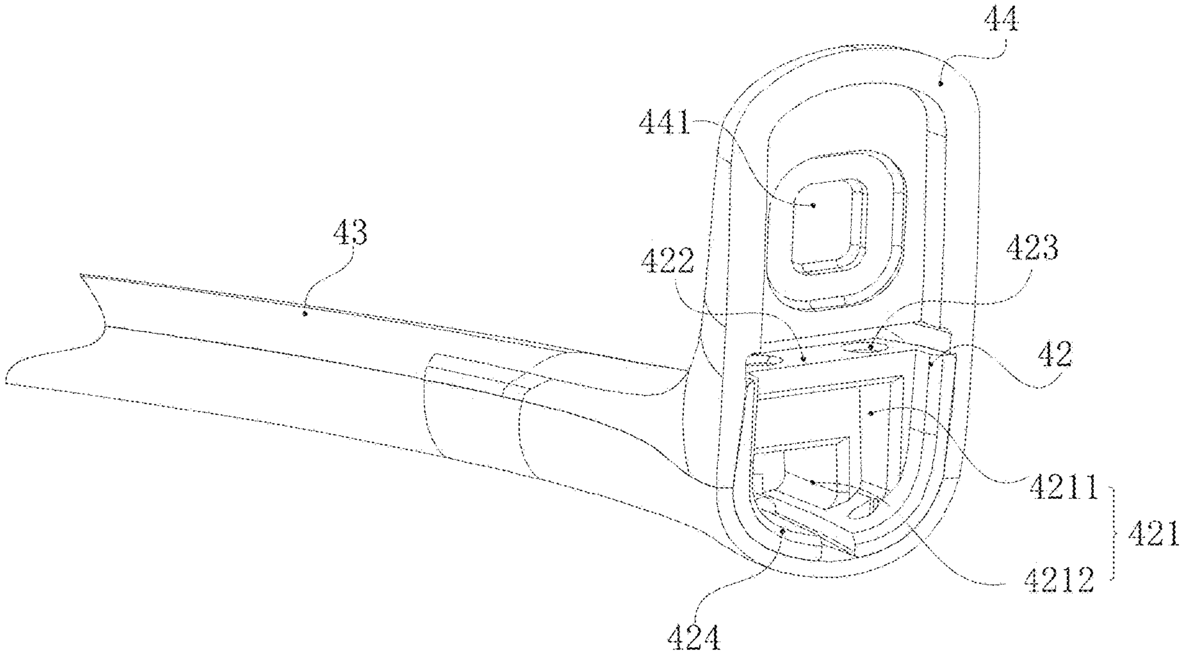
FIG. 15 is a schematic diagram illustrating a partial structure of a rear hook of an MP3 player according to some embodiments of the present disclosure.

FIG. 13 is a schematic diagram illustrating an exploded view of partial structures of an exemplary circuit housing and an exemplary rear hook of an exemplary MP3 player according to some embodiments of the present disclosure. FIG. 14 is a schematic diagram illustrating partial structures of an exemplary circuit housing and an exemplary rear hook of an exemplary MP3 player according to some embodiments of the present disclosure. FIG. 15 is a schematic diagram illustrating partial structures of an exemplary rear hook of an exemplary MP3 player according to some embodiments of the present disclosure.

Referring to FIG. 2, FIG. 13, FIG. 14, and FIG. 15, in some embodiments, the circuit housing 30 may include a plug end 3*a* at an end of the circuit housing 30 away from the ear hook 10, and the rear hook 40 may include plug ends 42 disposed at two ends of an elastic metal wire 41. The plug end 3*a* and the plug end(s) 42 may be plugged and fixed to each other.

In some embodiments, since the MP3 player includes two earphone cores 50 (i.e., a right earphone core and a left earphone core), the core housing 20 may correspondingly include a right core housing and a right core housing, and the circuit housing 30 may correspondingly include a right circuit housing and a left circuit housing. The rear hook 40 may be connected to the two circuit housings, respectively. The core housing 20, the ear hook 10, and the circuit housing 30 on both sides may be connected in a plug manner, and hung on the back of the user's head when the user wears a speaker device including the MP3 player. The plug ends 42 may be formed at two ends of the elastic metal wire 41 by injection molding. Specifically, the plug ends 42 may include plastic or other materials.

In some embodiments, the plug end 42 may include a socket 421, and the plug end 3*a* may be at least partially inserted into the socket 421. In this embodiment, the plug end 3*a* may be disposed on a side of the annular table 37 away from the ear hook 10. The connection manner between the plug end 3*a* and the socket 421 and the connection manner between the plug end 15 and the second socket 31 may be the same or different.

In some embodiments, opposite sides of the plug end 3*a* may respectively include slots 3*a*1 perpendicular to the insertion direction of the plug end 3*a* with respect to the socket 421. The two slots 3*a*1 may be spaced and symmetrically disposed on two sides of the plug end 3*a*. Further, each of the two slots 3*a*1 may be communicated with a corresponding side wall of the plug end 3*a* in a direction perpendicular to the insertion direction.

In some embodiments, a first side wall 422 of the plug end 42 may include a through hole 423 corresponding to positions of the two slots 3*a*1. In some embodiments, the plug end 42 may include a side wall configured to define a surrounding arrangement of the socket 421, and the first side wall 422 of the plug end 42 may be inserted between the plug end 3*a* and the plug end 42. The first side wall 422 of the plug end 42 may intersect with an extending direction of the slot 3*a*1 when the plug 3*a* is plugged with the plug 42.

The MP3 player may include a fixing member 88. The fixing member 88 may include two parallel pins 881 and a connecting portion 882 configured to connect the pins 881. In this embodiment, the connecting portion 812 may be vertically connected to ends of the two pins 881 at a same side, thereby forming a U-shaped fixing member 88, a shape of which may be the same as or similar to that of the fixing member 81. It should be noted that the shape of the fixing member 88 may be similar to that of the fixing member 81, size parameters of the fixing member 88 may be different to that of the fixing member 81 according to the surrounding structure. In this embodiment, a length of the pin 881 may be greater than that of the pin 811, and a length of the connecting portion 812 may be less than that of the connecting portion 882, which is not limited herein. In some embodiments, the pin 881 may be inserted into the slot 3*a*1 through the through hole 423 from the outside of the plug end 42, and the connecting portion 882 may be blocked from the outside of the plug end 3*a*, thereby realizing the connection between the plug end 42 and the plug end 3*a*.

In such case, the fixing member 88 of the MP3 player may include two pins 881 disposed in parallel and the connecting portion 882 for connecting the pins 881, so that the fixing member 88 may connect and fix the plug end 3*a* and the plug end 42 over a certain span, thereby improving the stability and reliability of the fixing between the circuit housing 30 and the rear hook 40. Moreover, the fixing member 88 may have a simple structure which may be convenient to insert and remove, so that the connection between the plug end 3*a* and the plug end 42 may be detachable, thereby improving the assembly convenience of the MP3 player. In some embodiments, the second side wall 424 of the plug end 42 opposite to the first side wall 422 of the plug end 42 may include one or more through holes 425 opposite to the through hole 423, and the pin 881 may pass through the slot 3*a*1 and insert into the through hole 425.

In this embodiment, the pin 881 may pass through the through hole 423 and insert into the slot 3*a*1, and further pass through the slot 3*a*1 and insert into the through hole 425. That is, the pin 881 may connect the opposite side walls and the plug end of the plug end 42 of the rear hook 40 together, thereby improving the connection stability between the circuit housing 30 and the rear hook 40.

In some embodiments, the plug end 3*a* may be further divided into a first plug section 3*a*2 and a second plug section 3*a*3 along the insertion direction of the plug end 3*a* relative to the socket 421. The plug end 3*a* may be disposed on the side of the end of the circuit housing 30 near the auxiliary side wall 34. The auxiliary side wall 34 may be another auxiliary sidewall 34 opposite to the auxiliary side wall 34 where the positioning block 38 is located.

In some embodiments, the first plug section 3*a*2 and the second plug section 3*a*3 may have a stepped shape along the insertion direction of the plug end 3*a* relative to the socket 421 on the side close to the positioning block 38. In a cross-sectional direction perpendicular to the insertion direction, the cross-section of the first plug section 3*a*2 may be larger than the cross-section of the second plug section 3*a*3.

Correspondingly, the socket 421 may be further divided into a first hole section 4211 and a second hole section 4212 whose shapes match the first plug section 3*a*2 and the second plug section 3*a*3 along the insertion direction of the socket end 3*a* relative to the socket 421. The plug end 3*a* may be inserted into the socket 421. The first plug section 3*a*2 and the second plug section 3*a*3 may be inserted into the first hole section 4211 and the second hole section 4212, respectively.

In some embodiments, the slot 3*a*1 may be disposed on the first plug section 3*a*2. In some embodiments, the slot 3*a*1 may be extended along the direction from the plug end 3*a* to the positioning block 38. The direction in which the two auxiliary side walls 34 of the circuit housing 30 may be opposite to each other. The two side walls of the first plug section 3*a*2 perpendicular to the main side wall 33 of the circuit housing 30 may be penetrated. The two side walls of the first plug section 3*a*2 parallel to the main side wall 33 of the circuit housing 30 may be further penetrated in the vertical insertion direction.

The through hole 423 disposed on the plug end 42 may correspond to the side of the slot 3*a*1 facing the positioning block 38. The through hole 425 may correspond to the side of the slot 3*a*1 away from the positioning block 38.

In some embodiments, top sides of the first plug section 3*a*2 and the second plug section 3*a*3 may be coplanar with each other. The top side of the first plug section 3*a*2 and the second plug section 3*a*3 may refer to the side of the first plug section 3*a*2 and the second plug section 3*a*3 facing the top side of the head when the user normally wears the MP3 player. The top side may be a side opposite to the step formed by the first plug section 3*a*2 and the second plug section 3*a*3.

In some embodiments, the top sides of the first plug section 3*a*2 and the second plug section 3*a*3 may be coplanar and formed a wiring slot 3*a*4 configured to accommodate a wire. The wiring slot 3*a*4 may extend along the insertion direction of the plug end 3*a* and the socket hole 421. The wiring slot 3*a*4 may be configured to accommodate the wires connecting the control circuit 60 and the battery 70 through the rear hook 40. In this embodiment, the plug end 3*a* may be inserted into the socket 421. The slot 3*a*1 may be inserted from the side of the first plug section 3*a*2 facing the positioning block 38. Specifically, in this embodiment, the plug end 3*a* may be disposed on a side of the circuit housing 30 facing the rear hook 40 away from the positioning block 38. Therefore, there may be a certain space on the side of the plug end 3*a* facing the positioning block 38. When the circuit housing 30 and the rear hook 40 are plugged in, the fixing component 88 may be removed from the bottom side of the first plug section 3*a*2. The side of the first plug section 3*a*2 facing the positioning block 38 may be inserted into the slot 3*a*1 through the through-hole 423 and then into the through hole 425, thereby achieving the fixing of the circuit housing 30 and the rear hook 40. In this way, the fixing component 88 may be completely hidden in the internal space formed by the circuit housing 30 and the rear hook 40 without being exposed, thereby eliminating the need to occupy additional space.

In some embodiments, the rear hook 40 may further include a second protective sleeve 43 injection-molded on the periphery of the elastic metal wire 41 and the plug end 42 and an end protection cover 44 integrally formed with the second protective sleeve 43. The material of the second protective sleeve 43 and the end protective cover 44 may be the same as the material of the protective sleeve 16 and the housing sheath 17. The material of the protective sleeve 16 and the housing sheath 17 may include soft material with a certain elasticity, such as the soft silicone, the rubber, or the like, or any combination thereof.

The end protection cover 44 may be formed at two ends of the elastic metal wire 41. The end protection cover 44 may be integrally formed with the plug end 42 located at both ends of the elastic metal wire 41 on the periphery of the plug end 42. It should be noted that the housing sheath 17 is only wrapped by the end of the circuit housing 30 facing the ear hook 10 to the annular table 37 of the circuit housing 30. Therefore, the portion of the annular countertop 37 of the circuit housing 30 facing the rear hook 40 may be exposed from the periphery of the housing sheath 17. Further, in this embodiment, the shape of the inner sidewall formed by the end protection cover 44 and the plug end 42 may match the shape of the exposed end of the circuit housing 30 to cover the periphery of the end of the exposed the circuit housing 30. The end surface of the end protection cover 44 facing the circuit housing 30 and the end face of the housing sheath 17 facing the rear hook 40 may elastically abut, thereby providing the sealing.

It should be noted that the above illustration of the MP3 player is only a specific example and should not be regarded as the only feasible implementation. Obviously, for those skilled in the art, after understanding the basic principles of the MP3 player, various amendments and changes in forms and details to the specific methods and steps of implementing the MP3 player may be made without departing from this principle, but these amendments and changes are still within the scope of the above description. For example, the shape of the socket 22 may be a circular ring, and the shape of the socket 22 may also be an irregular circular ring (the inner wall of the socket 22 may be toothed). Such deformations may be all within the protection scope of the present disclosure.

Under normal circumstances, the sound quality of the MP3 player may be affected by various factors, such as the physical properties of the components of the speaker device, the vibration transmission relationship among the components, the vibration transmission relationship between the speaker device and the outside world, and the efficiency of the vibration transmission system in transmitting vibration, or the like. The components of the speaker device may include components (such as but not limited to earphone cores) that generate vibrations, components (such as but not limited to ear hooks) that fix the speaker device, and components (such as but not limited to panels on the core housing, vibration transmission layer, etc.) that transmit vibrations. The vibration transmission relationship among the components and the vibration transmission relationship between the loudspeaker and the outside are determined by the contact mode (such as but not limited to clamping force, contact area, contact shape, etc.) between the speaker device and the user.

Figure 16:
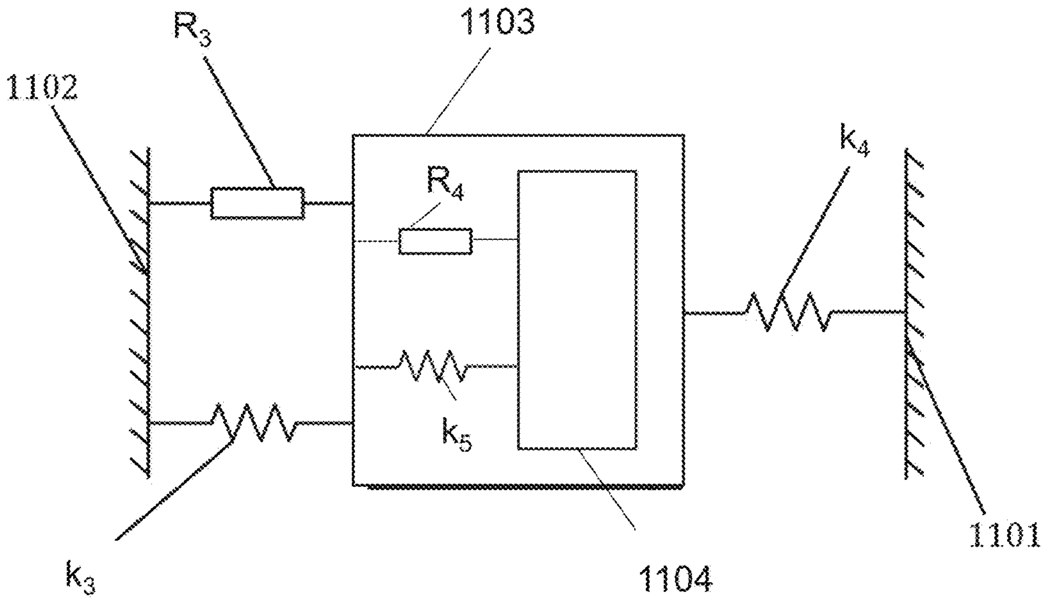
FIG. 16 is a schematic diagram illustrating an equivalent model of a vibration generation and transmission system of an exemplary MP3 player according to some embodiments of the present disclosure.

For illustration purposes, the following description may further illustrate the relationship between sound quality and each component of the speaker device based on a bone conductive MP3 player. It should be understood that without breaking the principle, the embodiments illustrated below may also be applied to an air conductive speaker device. FIG. 16 is a schematic diagram illustrating an equivalent model of a vibration generation and transmission system of an exemplary MP3 player according to some embodiments of the present disclosure. As shown in FIG. 16, the vibration generation and transmission system may include a fixed end 1101, a sensing terminal 1102, a vibration unit 1103, and an earphone core 1104. The fixed end 1101 may be connected to the vibration unit 1103 through the transfer relationship K1 ($k_4$ in FIG. 16). The sensing terminal 1102 may be connected to the vibration unit 1103 through the transfer relationship K2 ($k_3$ in FIG. 16). The vibration unit 1103 may be connected to the earphone core 1104 through the transfer relationship K3 ($k_4$ and $k_5$ In FIG. 16).

The vibration unit mentioned herein is the core housing, and the transfer relations K1, K2, and K3 are the illustrations of the functional relations among the corresponding components in the MP3 player equivalent system (more detailed descriptions may be illustrated below). The vibration equation of the equivalent system may be represented by:

$$m_3x_3''R_3c_3'-R_4x_4'+(k_3+k_4)x_3+k_5(x_3-x_4)=f_3, \tag{1}$$

$$m_4x_4''R_4x_4''k_5(x_3-x_4)=f_4, \tag{2}$$

where $m_3$ represents the equivalent mass of the vibration unit 1103; $m_4$ represents the equivalent mass of the earphone core 1104; $x_3$ represents the equivalent displacement of the vibration unit 1103; $x_4$ represents the equivalent displacement of the earphone core 1104; $k_3$ represents the equivalent elastic coefficient between the sensing terminal 1102 and the vibration unit 1103; $k_4$ represents the equivalent elastic coefficient between the fixed end 1101 and the vibration unit 1103; $k_5$ represents the equivalent elastic coefficient between the earphone core 1104 and the vibration unit 1103; $R_3$ represents the equivalent damping between the sensing terminal 1102 and the vibration unit 1103; $R_4$ represents the equivalent damping between the earphone core 1104 and the vibration unit 1103; and $f_3$ and $f_4$ represent the interaction forces between the vibration unit 1103 and the earphone core 1104, respectively. The equivalent amplitude $A_3$ of the vibration unit 1103 in the system may be represented by:

$$A_3 = -\frac{m_4\omega^2}{\left(m_3\omega^2 + j\omega R_3 - (k_3 + k_4 + k_5)\right)\left(m_4\omega^2 + j\omega R_4 - k_5\right) - k_5(k_5 - j\omega R_4)} \cdot f_0, \tag{3}$$

where $f_0$ represents a unit driving force; and co denotes the vibration frequency. Therefore, the factors that may affect the frequency response of the bone conductive MP3 player may include the vibration generation portions (e.g., the vibration unit, the earphone core, the housing, and the interconnection ways thereof, such as $m_3$, $m_4$, $k_5$, $R_4$, etc., in Equation (3)), and vibration transmission portions (e.g., the way of contacting the skin, the property of the ear hook, such as $k_3$, $k_4$, $R_3$, etc., in Equation (3)). The frequency response and the sound quality of the bone conductive MP3 player may be changed by changing the structure of the various components of the bone conductive MP3 player and the parameters of the connections between the various components. For example, changing the magnitude of the clamping force is equivalent to changing the $k_4$, changing the bonding way of glue is equivalent to changing the $R_4$ and $k_5$, and changing the hardness, elasticity, and damping of the materials is equivalent to changing the $k_3$ and $R_3$.

In a specific embodiment, the fixed end 1101 may be a relatively fixed point or a relatively fixed area of the bone conductive MP3 player during the vibration process. The point or area may be regarded as the fixed end of the bone conductive MP3 player during the vibration process. The fixed end may be composed of specific components, or may be a position determined according to the structure of the bone conductive MP3 player. For example, the bone conductive MP3 player may be hung, glued, or adsorbed near the human ear by a specific device, and the structure and shape of the bone conductive MP3 player may also be designed to make the bone conductive component stick to the human skin.

Sensing terminal 1102 may include an auditory system for the human body to receive sound signals. The vibration unit 1103 may be a part of the bone conductive MP3 player used to protect, support, and connect the earphone core. The vibration unit 1103 may include a part directly or indirectly touched by the user, such as a vibration transmission layer or panel that transmits vibration to the user, as well as the housing that protects and supports other vibration generating components, or the like. The earphone core 1104 may include a component for generating sound vibration, which may be one or more combinations of the transducers discussed above.

The transmission relationship K1 may connect the fixed end 1101 and the vibration unit 1103, which indicates the vibration transmission relationship between the vibration generation components of the bone conductive MP3 player and the fixed end. K1 may be determined based on the shape and structure of the bone conductive MP3 player. For example, the bone conductive MP3 player may be fixed to the head of the human in the form of a U-shaped earphone rack/earphone strap, and may also be installed on devices such as a helmet, a fire mask, or other special-purpose masks, glasses, etc. The different shapes and structures of the bone conductive MP3 player may affect the vibration transmission relationship K1. Further, the structure of the loudspeaker may also include physical properties such as the material and quantity of different components of the bone conductive MP3 player. The transmission relationship K2 may connect the sensing terminal 402 and the vibration unit 1103.

K2 may be determined based on the composition of the transmission system. The transmission system may include transmitting sound vibration to the auditory system through the user's tissue (also referred to as human tissue). For example, when the sound is transmitted to the auditory system through the skin, the subcutaneous tissue, bones, etc., the physical properties of different human tissues and their interconnections may affect K2. Further, the vibration unit 1103 may be in contact with the human tissue. In different embodiments, the contact surface on the vibration unit may be a side of the vibration transmission layer or the panel. The surface shape, size of the contact surface, and the interaction force of the contact surface with the human tissue may affect the transmission relationship K2.

The transmission relationship K3 between the vibration unit 1103 and the earphone core 1104 may be determined by internal connection properties of the vibration generation components of the bone conductive MP3 player. The connection mode (e.g., rigid or elastic connection mode) of the earphone core and the vibration unit, or the relative position of the connector between the earphone core and the vibration unit may change the transmission efficiency of the earphone core to transmit vibration to the vibration unit, especially the transmission efficiency of the panel, which affects the transmission relationship K3.

During the use of the bone conductive MP3 player, the generation and transmission process of the sound may affect the sound quality felt by the human (or the user). For example, the fixed end 1101, the sensing terminal 1102, the vibration unit 1103, the earphone core, and the transmission relationships K1, K2, and K3, etc., may affect the sound quality of the bone conductive MP3 player. It should be noted that K1, K2, and K3 are only a representation of the connection ways of different components or systems during the vibration transmission process, which may include, but not limited to physical connection ways, force transmission ways, sound transmission efficiency, etc.

The above illustration of the equivalent system of the bone conductive MP3 player is only a specific example and should not be regarded as the only feasible implementation. Obviously, for those skilled in the art, after understanding the basic principles of the bone conductive MP3 player, various amendments and changes in forms and details of the specific methods and steps that affect the vibration transmission of the bone conductive MP3 player may be made without departing from this principle, but these amendments and changes are still within the scope of the above description. For example, K1, K2, and K3 described above may be a simple vibration or mechanical transmission way, or may include a complex non-linear transmission system. The transmission relationship may include transmission through direct connection of various components (or parts), or may include transmission through a non-contact way.

Figure 17:
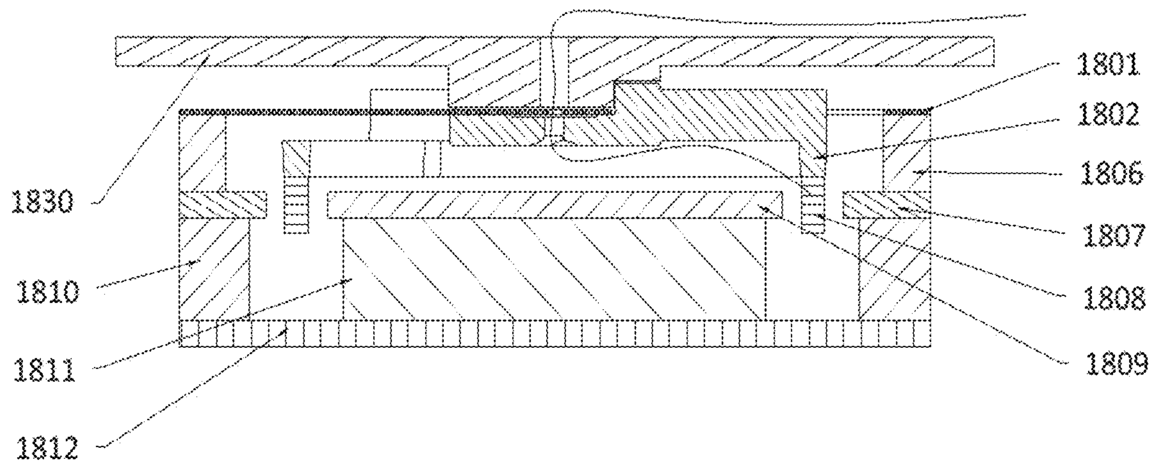
FIG. 17 is a structure diagram illustrating a composite vibration device of an MP3 player according to some embodiments of the present disclosure.
Figure 18:
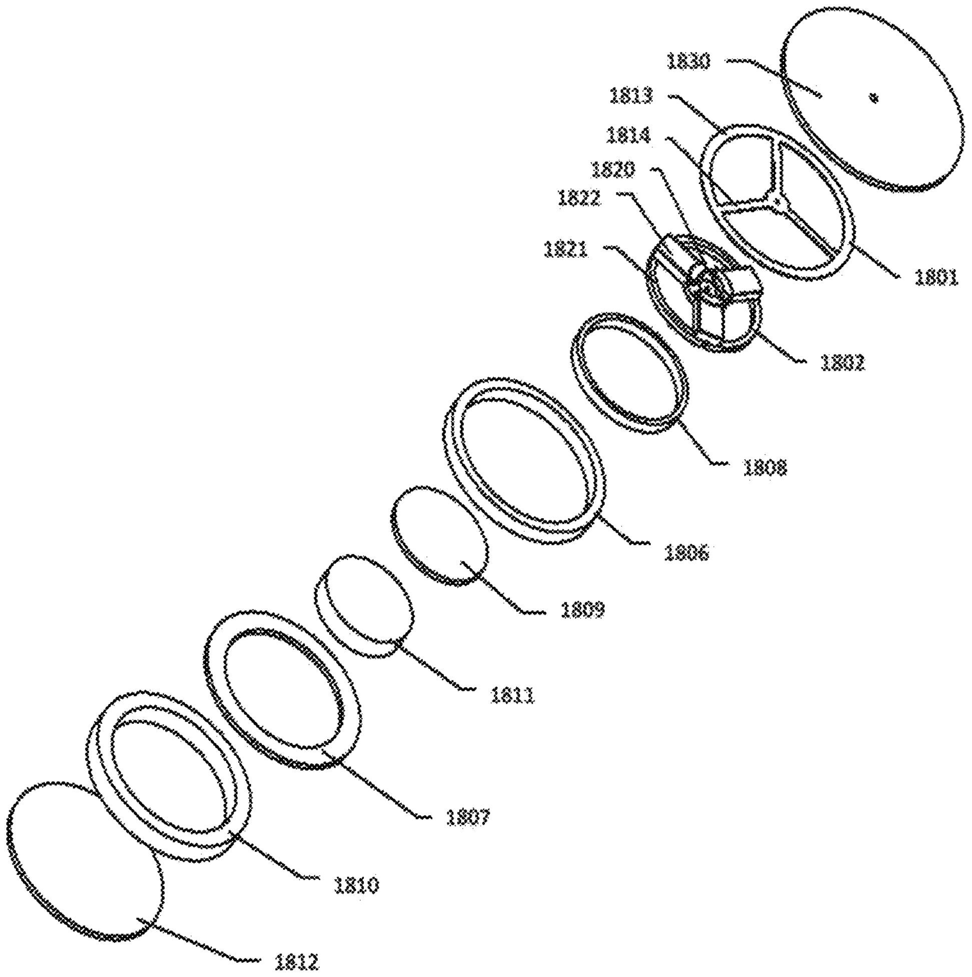
FIG. 18 is a structure diagram illustrating a composite vibration device of an exemplary MP3 player according to some embodiments of the present disclosure.
Figure 19:
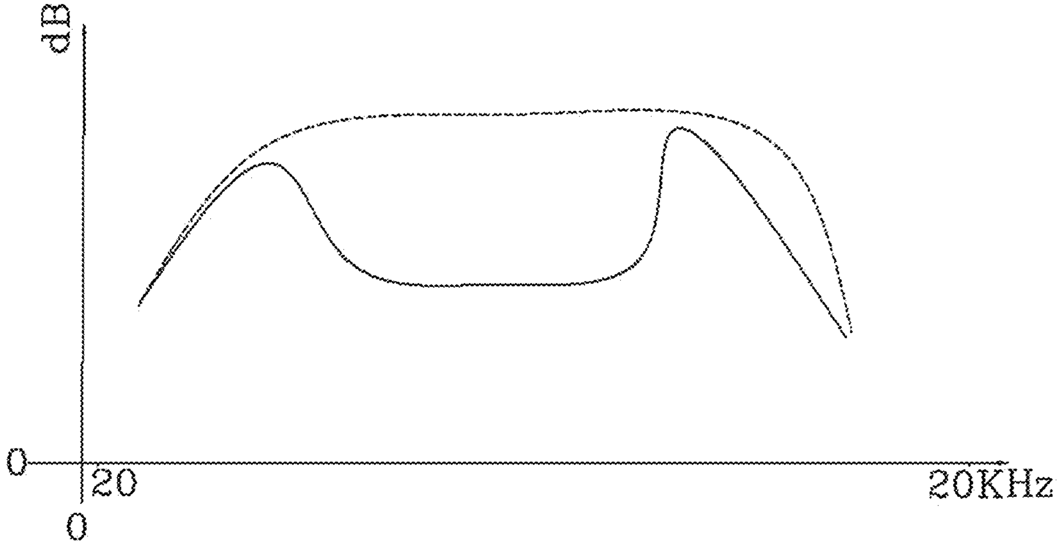
FIG. 19 is a schematic diagram illustrating exemplary frequency response curves of an exemplary MP3 player according to some embodiments of the present disclosure.

FIG. 17 is a structure diagram illustrating a composite vibration component of an exemplary MP3 player according to some embodiments of the present disclosure. FIG. 18 is a structure diagram illustrating an exemplary MP3 player and a composite vibration component thereof according to some embodiments of the present disclosure.

In some embodiments, the MP3 player may include the composite vibration device. In some embodiments, the composite vibration component may be part of an earphone core. In some embodiments, the composite vibration component in FIG. 17 may be the vibration component that provides sound inside the core housing 20 illustrated in FIG. 2. Specifically, the composite vibration component in the embodiment of the present disclosure may be equivalent to a specific embodiment of the transfer relationship K3 between the vibration unit 1103 and the earphone core 1104 in FIG. 16. Embodiments of the composite vibration component on the MP3 player are shown in FIG. 17 and FIG. 18, the composite vibration component may be composed of a vibration conductive plate 1801 and a vibration plate 1802. The vibration conductive plate 1801 may be disposed as a first annular body 1813. Three first support rods 1814 that are converged toward a center may be disposed in the first annular body 1813. The position of the converged center may be fixed to a center of the vibration plate 1802. The center of the vibration plate 1802 may be a groove 1820 that matches the converged center and the first support rods. The vibration plate 1802 may be disposed with a second annular body 1821 having a radius different from that of the vibration conductive plate 1801, and three second support rods 1822 having different thicknesses from the first support rods 1814. The first support rods 1814 and the second support rods 1822 may be staggered, and may have a 60° angle.

The first and second support rods may be straight rods or other shapes that meet specific requirements. The count of the support rods may be more than two, and symmetrical or asymmetrical arrangement may be applied to meet the requirements of economic and practical effects. The vibration conductive plate 1801 may have a thin thickness and can increase elastic force. The vibration conductive plate 1801 may be stuck in the center of the groove 1820 of the vibration plate 1802. A voice coil 1808 may be attached to a lower side of the second annular body 1821 of the vibration plate 1802. The composite vibration component may include a bottom plate 1812 on which an annular magnet 1810 is disposed. An inner magnet 1811 may concentrically be disposed in the annular magnet 1810. An inner magnetic plate 1809 may be disposed on the top of the inner magnet 1811, and an annular magnetic plate 1807 may be disposed on the annular magnet 1810. A washer 1806 may be fixedly disposed above the annular magnetic plate 1807. The first annular body 1813 of the vibration conductive plate 1801 may be fixedly connected to the washer 1806. The composite vibration component may be connected to outside component(s) through a panel 1830. The panel 1830 may be fixedly connected to the position of the converged center of the vibration transmission plate 1801, and may be fixed to the center of the vibration transmission plate 1801 and the vibration plate 1802. Using the composite vibration component composed of the vibration plate and the vibration conductive plate, a frequency response curve as shown in FIG. 18 can be obtained, and two resonance peaks may be generated. By adjusting parameters such as the size and material of the two components (e.g., the vibration conductive plate and the vibration plate) may make the resonance peaks appear in different positions. For example, a low-frequency resonance peak appears at a position at a lower frequency, and/or a high-frequency resonance peak appears at a position at a higher frequency. In some embodiments, the stiffness coefficient of the vibration plate may be greater than the stiffness coefficient of the vibration conductive plate. The vibration plate may generate the high-frequency resonance peak of the two resonance peaks, and the vibration conductive plate may generate the low-frequency resonance peak of the two resonance peaks. The resonance peaks may be or may not be within the frequency range of sound perceivable by human ears. In some embodiments, the resonance peaks may be not within the frequency range of sound perceivable by human ears. In some embodiments, one resonance peak may be within the frequency range of sound perceivable by human ears, and another resonance peak may be not within the frequency range of sound perceivable by human ears. In some embodiments, both the resonance peaks may be within the frequency range of sound perceivable by human ears. In some embodiments, both the resonance peaks may be within the frequency range of sound perceivable by human ears, and their frequencies may be 80 Hz-18000 Hz. In some embodiments, both the resonance peaks may be within the frequency range of sound perceivable by human ears, and their frequencies may be 200 Hz-15000 Hz. In some embodiments, both the resonance peaks may be within the frequency range perceivable by human ears, and their frequencies may be 500 Hz-12000 Hz. In some embodiments, both the resonance peaks may be within the frequency range perceivable by human ears, and their frequencies may be 800 Hz-11000 Hz. The frequencies of the resonance peaks may have a certain gap. For example, the frequency difference between the two resonance peaks may be at least 500 Hz. In some embodiments, the frequency difference between the two resonance peaks may be at least 1000 Hz. In some embodiments, the frequency difference between the two resonance peaks may be at least 2000 Hz. In some embodiments, the frequency difference between the two resonance peaks may be at least 5000 Hz. In order to achieve better results, the both resonance peaks may be within the frequency range of sound perceivable by human ears, and the frequency difference between the two resonance peaks may be at least 500 Hz. In some embodiments, the both resonance peaks may be within the frequency range of sound perceivable by human ears, and the frequency difference between the two resonance peaks may be at least 1000 Hz. In some embodiments, the both resonance peaks may be within the frequency range perceivable by human ears, and the frequency difference between the two resonance peaks may be at least 2000 Hz. In some embodiments, the two resonance peaks may both be within the frequency range of sound perceivable by human ears, and the frequency difference between the two resonance peaks may be at least 3000 Hz. In some embodiments, the resonance peaks may both be within the frequency range of sound perceivable by human ears, and the frequency difference between the two resonance peaks may be at least 4000 Hz. One of the two resonance peaks may be within the frequency range of sound perceivable by human ears and the other may not be within the frequency range of sound perceivable by human ears, and the frequency difference between the two resonance peaks may be at least 500 Hz. In some embodiments, one resonance peak may be within the frequency range of sound perceivable by human ears and the other may not be within the frequency range of sound perceivable by human ears, and the frequency difference between the two resonance peaks may be at least 1000 Hz. In some embodiments, one resonance peak may be within the frequency range of sound perceivable by human ears and the other may not be within the frequency range of sound perceivable by human ears, and the frequency difference between the two resonance peaks may be at least 2000 Hz. In some embodiments, one resonance peak may be within the frequency range of sound perceivable by human ears and the other may not be within the frequency range of sound perceivable by human ears, and the frequency difference between the two resonance peaks may be at least 3000 Hz. In some embodiments, one resonance peak may be within the frequency range of sound perceivable by human ears and the other may not be within the frequency range of sound perceivable by human ears, and the frequency difference between the two resonance peaks may be at least 4000 Hz. The two resonance peaks may both be 5 Hz-30000 Hz, and the frequency difference between the two resonance peaks may be at least 400 Hz. In some embodiments, the two resonance peaks may both be 5 Hz-30000 Hz, and the frequency difference between the two resonance peaks may be at least 1000 Hz. In some embodiments, the two resonance peaks may both be 5 Hz-30000 Hz, and the frequency difference between the two resonance peaks may be at least 2000 Hz. In some embodiments, the two resonance peaks may both be 5 Hz-30000 Hz, and the frequency difference between the two resonance peaks may be at least 3000 Hz. In some embodiments, the two resonance peaks may be 5 Hz and 30000 Hz, and the frequency difference between the two resonance peaks may be at least 4000 Hz. The two resonance peaks may both be 20 Hz-20000 Hz, and the frequency difference between the two resonance peaks may be at least 400 Hz. In some embodiments, the two resonance peaks may both be 20 Hz-20000 Hz, and the frequency difference between the two resonance peaks may be at least 1000 Hz. In some embodiments, the two resonance peaks may be 20 Hz-20000 Hz, and the frequency difference between the two resonance peaks may be at least 2000 Hz. In some embodiments, the two resonance peaks may both be 20 Hz-20000 Hz, and the frequency difference between the two resonance peaks may be at least 3000 Hz. In some embodiments, the two resonance peaks may both be 20 Hz and 20,000 Hz, and the frequency difference between the two resonance peaks may be at least 4000 Hz. The two resonance peaks may be 100 Hz-18000 Hz, and the frequency difference between the two resonance peaks may be at least 400 Hz. In some embodiments, the two resonance peaks may be 100 Hz and 18000 Hz, and the frequency difference between the two resonance peaks may be at least 1000 Hz. In some embodiments, the two resonance peaks may be 100 Hz and 18000 Hz, and the frequency difference between the two resonance peaks may be at least 2000 Hz. In some embodiments, the two resonance peaks may be 100 Hz and 18000 Hz, and the frequency difference between the two resonance peaks may be at least 3000 Hz. In some embodiments, the two resonance peaks may be 100 Hz and 18000 Hz, and the frequency difference between the two resonance peaks may be at least 4000 Hz. The two resonance peaks may be 200 Hz-12000 Hz, and the frequency difference between the two resonance peaks may be at least 400 Hz. In some embodiments, the two resonance peaks may be between 200 Hz and 12000 Hz, and the frequency difference between the two resonance peaks may be at least 1000 Hz. In some embodiments, the two resonance peaks may be 200 Hz and 12000 Hz, and the frequency difference between the two resonance peaks may be at least 2000 Hz. In some embodiments, the two resonance peaks may be 200 Hz and 12000 Hz, and the frequency difference between the two resonance peaks may be at least 3000 Hz. In some embodiments, the two resonance peaks may be 200 Hz and 12000 Hz, and the frequency difference between the two resonance peaks may be at least 4000 Hz. The two resonance peaks may be 500 Hz-10000 Hz, and the frequency difference between the two resonance peaks may be at least 400 Hz. In some embodiments, the two resonance peaks may be 500 Hz and 10000 Hz, and the frequency difference between the two resonance peaks may be at least 1000 Hz. In some embodiments, resonance peaks may be 500 Hz and 10000 Hz, and the frequency difference between the two resonance peaks may be at least 2000 Hz. In some embodiments, resonance peaks may be between 500 Hz and 10000 Hz, and the frequency difference between the two resonance peaks may be at least 3000 Hz. In some embodiments, the two resonance peaks may be between 500 Hz and 10000 Hz, and the frequency difference between the two resonance peaks may be at least 4000 Hz. In this way, the resonance response ranges of the speaker device may be widened, and the sound quality satisfying certain conditions may be obtained. It should be noted that, in actual use, a plurality of vibration conductive plates and vibration plates may be provided to form a multilayer vibration structure that corresponds to different frequency response ranges, which may realize high-quality vibration in the full range and frequency, or make the frequency response curve meet the requirements in some specific frequency ranges. For example, in a bone conduction hearing aid, in order to meet normal hearing requirements, an earphone core composed of one or more vibration plates and vibration conductive plates with resonance frequencies in the range of 100 Hz-10000 Hz may be selected. The description of the composite vibration component composed of the vibration plate and the vibration conductive plate may be found in, e.g., Chinese Patent Application No. 201110438083.9 entitled "Bone conduction speaker and composite vibration device thereof" filed on Dec. 23, 2011, the contents of which are hereby incorporated by reference.

Figure 20:
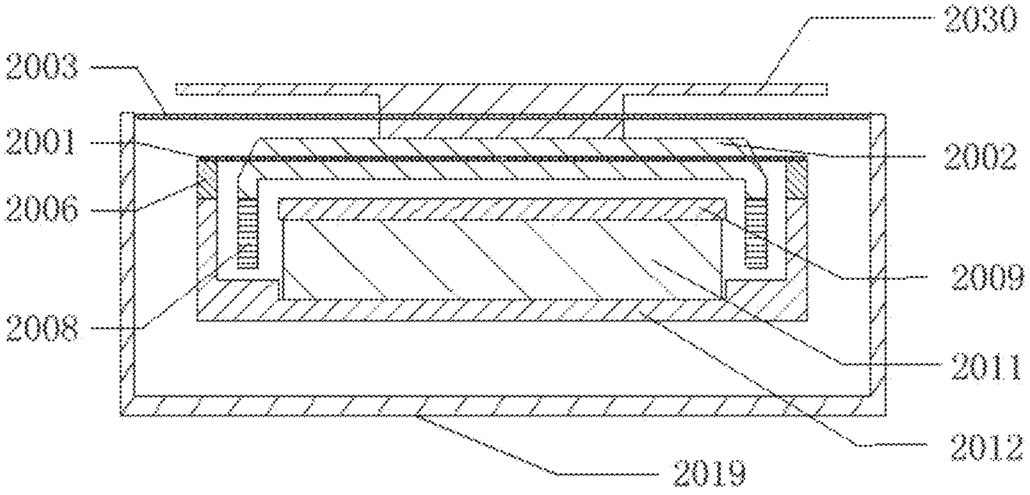
FIG. 20 is a structure diagram illustrating an exemplary MP3 player and a composite vibration device of the MP3 player according to some embodiments of the present disclosure.

FIG. 20 is a structure diagram illustrating an exemplary MP3 player and a composite vibration component of the MP3 player according to some embodiments of the present disclosure. As shown in FIG. 20, the composite vibration component may include a vibration plate 2002, a first vibration conductive plate 2003, and a second vibration conductive plate 2001. The first vibration conductive plate 2003 may fix the vibration plate 2002 and the second vibration conductive plate 2001 on a core housing 2019. The composite vibration component composed of the vibration plate 2002, the first vibration conductive plate 2003, and the second vibration conductive plate 2001 may produce at least two resonance peaks. A flatter frequency response curve may be generated within an audible range of the auditory system, thereby improving the sound quality of a speaker device.

Figure 21:
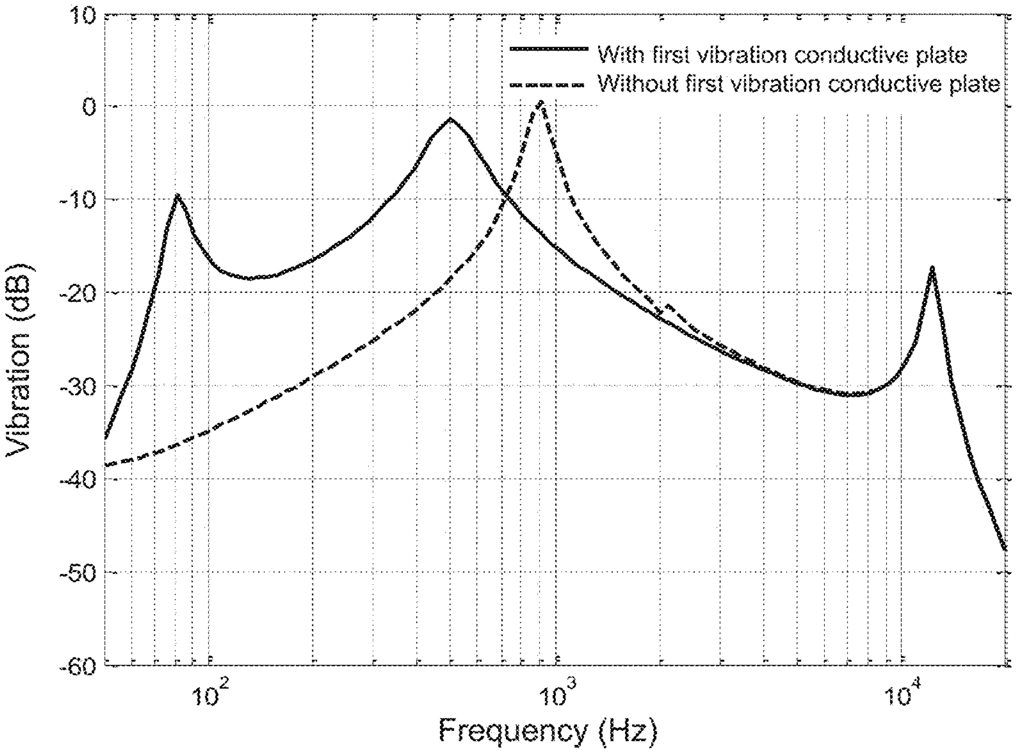
FIG. 21 is a structure diagram illustrating exemplary vibration response curves of an MP3 player according to some embodiments of the present disclosure.

Count of resonance peaks generated by the triple composite vibration system of the first vibration conductive plate 2003 may be more than the count of resonance peaks generated by the composite vibration system without the first vibration conductive plate 2003. In some embodiments, the triple composite vibration system may produce at least three resonance peaks. In some embodiments, at least one resonance peak may not be within the frequency range of sound perceivable by human ears. In some embodiments, all the resonance peaks may be within the frequency range perceivable by human ears. In some embodiments, all the resonance peaks may be within the frequency range perceivable by human ears, and their frequencies may not be greater than 18000 Hz. In some embodiments, all the resonance peaks may be within the frequency range of sound perceivable by human ears, and their frequencies may be 100 Hz-15000 Hz. In some embodiments, all the resonance peaks may be within the frequency range of sound perceivable by human ears, and their frequencies may be 200 Hz-12000 Hz. In some embodiments, all the resonance peaks may be within the frequency range of sound perceivable by human ears, and their frequencies may be 500 Hz and 11000 Hz. The frequencies of the resonance peaks may have a certain gap. For example, the frequency difference between at least two resonance peaks may be at least 200 Hz. In some embodiments, the frequency difference between at least two resonance peaks may be at least 500 Hz. In some embodiments, the frequency difference between at least two resonance peaks may be at least 1000 Hz. In some embodiments, the frequency difference between at least two resonance peaks may be at least 2000 Hz. In some embodiments, the frequency difference between at least two resonance peaks may be at least 5000 Hz. In order to achieve better results, all the resonance peaks may be within the frequency range perceivable by human ears, and the frequency difference between at least two resonance peaks may be at least 500 Hz. In some embodiments, all the resonance peaks may be within the frequency range perceivable by human ears, and the frequency difference between at least two resonance peaks may be at least 1000 Hz. In some embodiments, all the resonance peaks may be within the frequency range perceivable by human ears, and the frequency difference between at least two resonance peaks may be at least 1000 Hz. In some embodiments, all the resonance peaks may be within the frequency range perceivable by human ears, and the frequency difference between at least two resonance peaks may be at least 2000 Hz. In some embodiments, all the resonance peaks may be within the frequency range perceivable by human ears, and the frequency difference between at least two resonance peaks may be at least 3000 Hz. In some embodiments, all the resonance peaks may be within the frequency range perceivable by human ears, and the frequency difference between at least two resonance peaks may be at least 4000 Hz. Two of the resonance peaks may be within the frequency range perceivable by human ears, and the other may not be within the frequency range perceivable by human ears, and the frequency difference between at least two resonance peaks may be at least 500 Hz. In some embodiments, the two resonance peaks may be within the frequency range perceivable by human ears, the other resonance peak may not be within the frequency range of sound perceivable by human ears, and the peak frequency of at least two resonance peaks may differ by at least 1000 Hz. In some embodiments, the two resonance peaks may be within the frequency range perceivable by human ears, the other resonance peak may not be within the frequency range of sound perceivable by human ears, and the peak frequency of at least two resonance peaks may differ by at least 1000 Hz. In some embodiments, the two resonance peaks may be within the frequency range perceivable by human ears, and the other may not be within the frequency range of sound perceivable by human ears, and the frequency difference between at least two resonance peaks may be at least 3000 Hz. In some embodiments, the two resonance peaks may be within the frequency range perceivable by human ears, and the other may not be within the frequency range of sound perceivable by human ears, and the frequency difference between at least two resonance peaks may be at least 4000 Hz. One of the resonance peaks may be within the frequency range of sound perceivable by human ears, the other two resonance peaks may not be within the frequency range of sound perceivable by human ears, and the frequency difference between at least two resonance peaks may be at least 500 Hz. In some embodiments, one of the resonance peaks may be within the frequency range of sound perceivable by human ears, the other two resonance peaks may not be within the frequency range of sound perceivable by human ears, and the frequency difference between at least two resonance peaks may be at least 1000 Hz. In some embodiments, one of the resonance peaks may be within the frequency range of sound perceivable by human ears, the other two resonance peaks may not be within the frequency range of sound perceivable by human ears, and the frequency difference between at least two resonance peaks may be at least 2000 Hz. In some embodiments, one of the resonance peaks may be within the frequency range of sound perceivable by human ears, the other two resonance peaks may not be within the frequency range of sound perceivable by human ears, and the frequency difference between at least two resonance peaks may be at least 3000 Hz. In some embodiments, one of the resonance peaks may be within the frequency range of sound perceivable by human ears, the other two resonance peaks may not be within the frequency range of sound perceivable by human ears, and the frequency difference between at least two resonance peaks may be at least 4000 Hz. All the resonance peaks may be within the frequency range of 5 Hz-30000 Hz, and the frequency difference between at least two resonance peaks may be at least 400 Hz. In some embodiments, all the resonance peaks may be within the frequency range of 5 Hz-30000 Hz, and the frequency difference between at least two resonance peaks may be at least 1000 Hz. In some embodiments, all the resonance peaks may be within the frequency range of 5 Hz-30000 Hz, and the frequency difference between at least two resonance peaks may be at least 2000 Hz. In some embodiments, all the resonance peaks may be within the frequency range of 5 Hz-30000 Hz, and the frequency difference between at least two resonance peaks may be at least 3000 Hz. In some embodiments, all the resonance peaks may be within the frequency range of 5 Hz-30000 Hz, and the frequency difference between at least two resonance peaks may be at least 4000 Hz. All the resonance peaks may be within the frequency range of 20 Hz-20000 Hz, and the frequency difference between at least two resonance peaks may be at least 400 Hz. In some embodiments, all the resonance peaks may be within the frequency range of 20 Hz-20000 Hz, and the frequency difference between at least two resonance peaks may be at least 1000 Hz. In some embodiments, all the resonance peaks may be within the frequency range of 20 Hz-20000 Hz, and the frequency difference between at least two resonance peaks may be at least 2000 Hz. In some embodiments, all the resonance peaks may be within the frequency range of 20 Hz-20000 Hz, and the frequency difference between at least two resonance peaks may be at least 3000 Hz. In some embodiments, all the resonance peaks may be within the frequency range of 20 Hz-20000 Hz, and the frequency difference between at least two resonance peaks may be at least 4000 Hz. All the resonance peaks may be within the frequency range of 100 Hz-18000 Hz, and the frequency difference between at least two resonance peaks may be at least 400 Hz. In some embodiments, all the resonance peaks may be within the frequency range of 100 Hz-18000 Hz, and the frequency difference between at least two resonance peaks may be at least 1000 Hz. In some embodiments, all the resonance peaks may be within the frequency range of 100 Hz-18000 Hz, and the frequency difference between at least two resonance peaks may be at least 2000 Hz. In some embodiments, all the resonance peaks may be within the frequency range of 100 Hz-18000 Hz, and the frequency difference between at least two resonance peaks may be at least 3000 Hz. In some embodiments, all the resonance peaks may be within the frequency range of 100 Hz-18000 Hz, and the frequency difference between at least two resonance peaks may be at least 4000 Hz. All the resonance peaks may be within the frequency range of 200 Hz-12000 Hz, and the frequency difference between at least two resonance peaks may be at least 400 Hz. In some embodiments, all the resonance peaks may be within the frequency range of 200 Hz-12000 Hz, and the frequency difference between at least two resonance peaks may be at least 1000 Hz. In some embodiments, all the resonance peaks may be within the frequency range of 200 Hz-12000 Hz, and the frequency difference between at least two resonance peaks may be at least 2000 Hz. In some embodiments, all the resonance peaks may be within the frequency range of 200 Hz-12000 Hz, and the frequency difference between at least two resonance peaks may be at least 3000 Hz. In some embodiments, all the resonance peaks may be within the frequency range of 200 Hz-12000 Hz, and the frequency difference between at least two resonance peaks may be at least 4000 Hz. All the resonance peaks may be within the frequency range of 500 Hz-10000 Hz, and the frequency difference between at least two resonance peaks may be at least 400 Hz. In some embodiments, all the resonance peaks may be within the frequency range of 500 Hz-10000 Hz, and the frequency difference between at least two resonance peaks may be at least 1000 Hz. In some embodiments, all the resonance peaks may be within the frequency range of 500 Hz-10000 Hz, and the frequency difference between at least two resonance peaks may be at least 2000 Hz. In some embodiments, all the resonance peaks may be within the frequency range of 500 Hz-10000 Hz, and the frequency difference between at least two resonance peaks may be at least 3000 Hz. In some embodiments, all the resonance peaks may be within the frequency range of 500 Hz-10000 Hz, and the frequency difference between at least two resonance peaks may be at least 4000 Hz. In one embodiment, by using a triple composite vibration system composed of a vibration plate, a first vibration conductive plate, and a second vibration conductive plate, a vibration response curve as shown in FIG. 21 may be obtained, which generates three distinct resonance peaks, and further greatly improves the sensitivity of the speaker device in the low frequency range (about 600 Hz) and improves the sound quality.

By changing parameters such as the size and material of the first vibration conductive plate, the position of the resonance peak may be moved to obtain a more ideal frequency response. In some embodiments, the first vibration conductive plate may include an elastic plate. The elasticity may be determined by various aspects such as the material, thickness, and structure of the first vibration conductive plate. The material of the first vibration conductive plate may include, but not limited to, steel (such as but not limited to stainless steel, carbon steel, etc.), light alloy (such as but not limited to aluminum alloy, beryllium copper, magnesium alloy, titanium alloy, etc.), and plastic (such as but not limited to high molecular polyethylene, blown nylon, engineering plastics, etc.), or other single or composite materials capable of achieving the same performance. The composite materials may include, but not limited to, reinforcement materials such as glass fiber, carbon fiber, boron fiber, graphite fiber, graphene fiber, silicon carbide fiber, or aramid fiber; compounds of organic and/or inorganic materials such as glass fiber reinforced unsaturated polyester, various types of glass steel composed of epoxy resin or phenolic resin. The thickness of the first vibration conductive plate may be not less than 0.005 mm. In some embodiments, the thickness may be 0.005 mm-3 mm. In some embodiments, the thickness may be 0.01 mm-2 mm. In some embodiments, the thickness may be 0.01 mm-1 mm. In some embodiments, the thickness may be 0.02 mm-0.5 mm. The structure of the first vibration conductive plate may be disposed as a ring shape. In some embodiments, the first vibration conductive plate may include at least one ring. In some embodiments, the first vibration conductive plate may include at least two rings, such as a concentric ring, a non-concentric ring. The rings may be connected by at least two support rods that radiate from the outer ring to the center of the inner ring. In some embodiments, the first vibration conductive plate may include at least one elliptical ring. In some embodiments, the first vibration conductive plate may include at least two elliptical rings. Different elliptical rings may have different radii of curvature. In some embodiments, the first vibration conductive plate may include at least one square ring. The structure of the first vibration conductive plate may be disposed as a sheet shape. In some embodiments, a hollow pattern may be disposed on the first vibration conduction plate, and the area of the hollow pattern may not be less than the area without the hollow pattern. The materials, thickness, and structure described above may be combined into different vibration conductive plates. For example, a ring-shaped vibration conductive plate may have different thickness distributions. In some embodiments, the thickness of the support rod(s) may be equal to the thickness of the ring(s). In some embodiments, the thickness of the support rod(s) may be greater than the thickness of the ring(s). In some embodiments, the thickness of the inner ring may be greater than the thickness of the outer ring.

Figure 22:
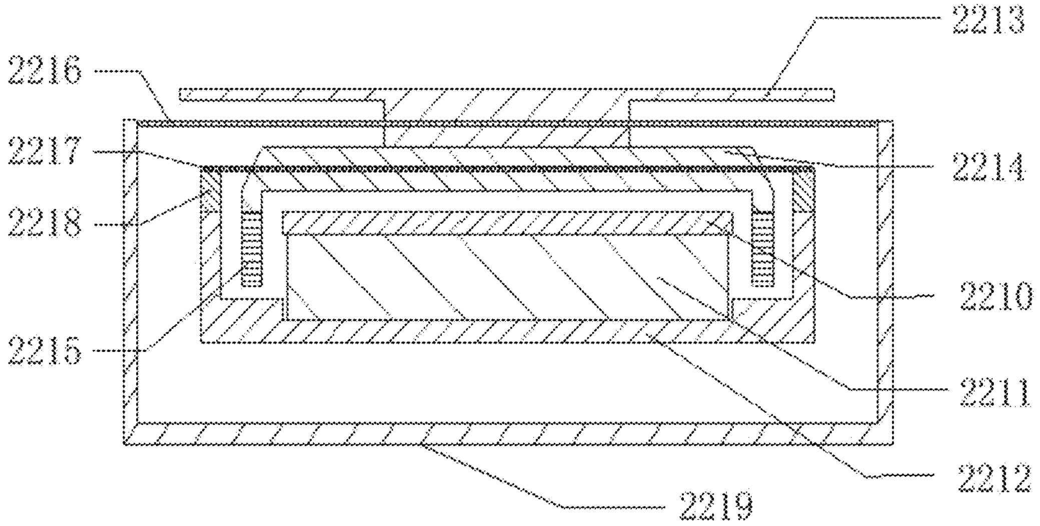
FIG. 22 is a structure diagram illustrating a vibration generating component of an exemplary MP3 player according to some embodiments of the present disclosure.

Contents disclosed in the present disclosure also discloses specific embodiments about the vibration plate, the first vibration conductive plate, and the second vibration conductive plate for the content set forth above. FIG. 22 is a structure diagram illustrating a vibration generating component of an exemplary MP3 player according to some embodiments of the present disclosure. As shown in FIG. 22, the earphone core may include a magnetic circuit assembly composed of a magnetic conduction plate 2210, a magnet 2211, and a magnetic conductive material 2212, a vibration plate 2214, a coil 2215, a first vibration conductive plate 2216, and a second vibration conductive plate 2217. The panel 2213 (i.e., a side of the core housing close to a user) may protrude from the housing 2219 and be bonded with the vibrating board 2214 by glue. The first vibration conductive plate 2216 may connect and fix the earphone core to the housing 2219 to form a suspension structure.

Figure 23:
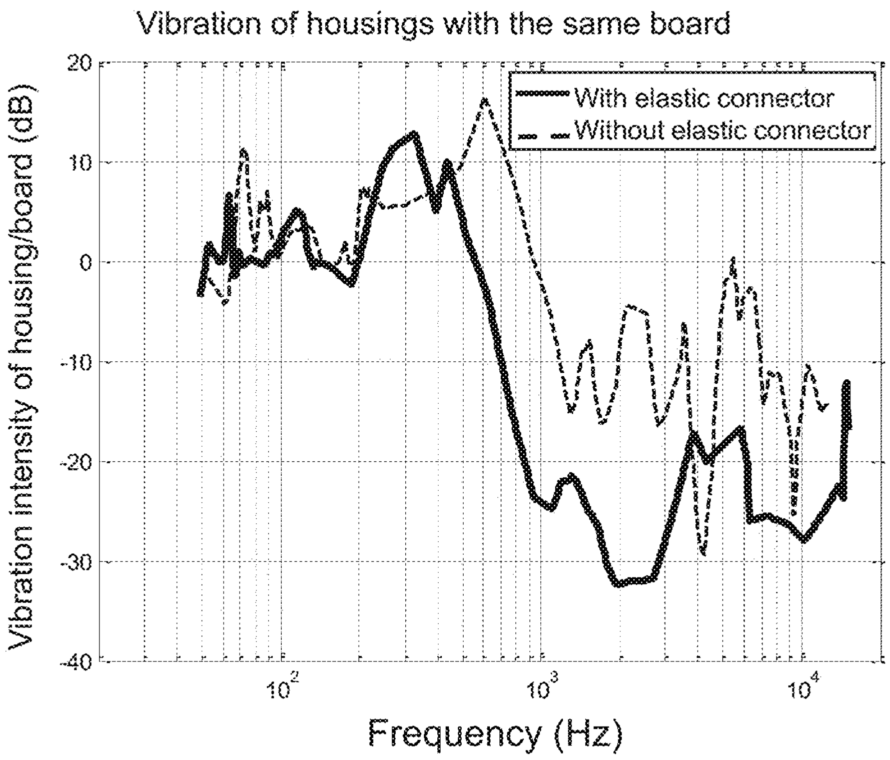
FIG. 23 is a schematic diagram illustrating vibration response curves of a vibration generating component of an exemplary MP3 player according to some embodiments of the present disclosure.
Figure 24:
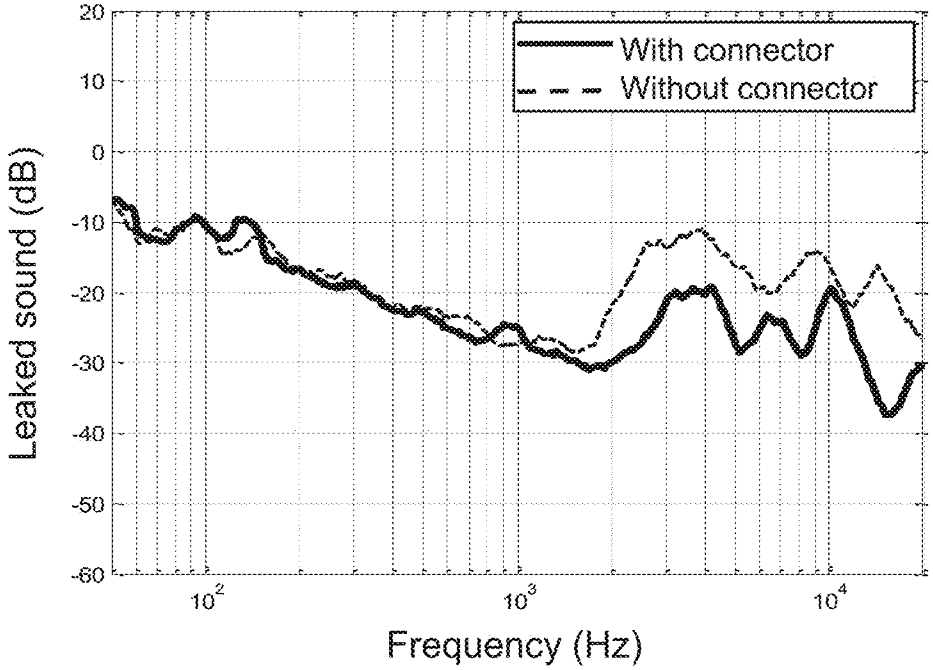
FIG. 24 is a schematic diagram illustrating vibration response curves of a vibration generating component of an exemplary MP3 player according to some embodiments of the present disclosure.

During the working of a bone conductive MP3 player, a triple vibration system composed of the vibration plate 2214, the first vibration conductive plate 2216, and the second vibration conductive plate 2217 may produce a flatter frequency response curve, thereby improving the sound quality of the bone conductive MP3 player. The first vibration conductive plate 2216 may elastically connect the earphone core to the housing 2219, which may reduce the vibration transmitted by the earphone core to the housing, thereby effectively reducing a leaked sound caused by the vibration of the housing, and reducing the influence of the vibration of the housing on the sound quality of the bone conductive MP3 player. FIG. 23 is a schematic diagram illustrating vibration response curves of a vibration generating component of an exemplary MP3 player according to some embodiments of the present disclosure. As used herein, a thick line shows the frequency response of the vibration generating component when the first vibration conductive plate 2216 is used, and a thin line shows the frequency response of the vibration generating component when the first vibration conductive plate 2216 is not used. It may be seen that the vibration of the housing of the bone conductive MP3 player without the first vibration conductive plate 2216 is significantly greater than the vibration of the housing of the bone conductive MP3 player with the first vibration conductive plate 2216 in a frequency range above 500 Hz. FIG. 24 is a schematic diagram illustrating a comparison of a leaked sound in a case of including the first vibration conductive plate 2216 and in a case of excluding the first vibration conductive plate 2216 according to some embodiments of the present disclosure. The leaked sound of the speaker device having the first vibration conductive plate 2216 in the intermediate frequency (e.g., about 1000 Hz) is less than the leaked sound of the speaker device without the first vibration conductive plate 2216 in the corresponding frequency range. In some embodiments, when the first vibration conductive plate is used between the panel and the housing, the vibration of the housing may be effectively reduced, thereby reducing the leaked sound. In some embodiments, the first vibration conductive plate may be a material including stainless steel, beryllium copper, plastic, polycarbonate materials, etc. The thickness of the first vibration conductive plate may be in the range of 0.01 mm-1 mm.

It should be noted that the above description of the bone conduction MP3 player is only a specific example and should not be considered as the only feasible implementation. Obviously, for those skilled in the art, after understanding the basic principles of bone conduction MP3 player, it is possible to make various modifications and alterations to the form and details of the specific methods and steps for implementing the bone conduction MP3 player without departing from this principle, but these modifications and alterations are still within the scope described above. For example, the first vibration conductive plate may not be limited to including one or two rings described above, and may include two or more rings. As another example, the shapes of a plurality of elements of the first vibration conductive plate may be the same or different (a ring and/or a square ring). Since this type of deformation is within the scope of the present application.

Referring to FIG. 16, the transfer relationship K2 between the sensing terminal 1102 and the vibration unit 1103 may also affect the frequency response of the bone conductive MP3 player. The sound heard by the human ear depends on the energy received by the cochlea. The energy is affected by different physical quantities during the transmission process, and may be represented by the following equation (4):

$$P=\iint_S \alpha\cdot(\alpha,R)\cdot L\cdot ds, \tag{4}$$

where P may be proportional to the energy received by the cochlea, S represents the contact area between the contact surface and the face, a represents a coefficient of dimensional conversion, f (a, R) represents the impact of the acceleration a at a point on the contact surface and the closeness R between the contact surface and the skin on the energy transmission, and L represents the transmission impedance of mechanical wave at any contact point, that is, L represents the transmission impedance per unit area.

It may be seen from Equation (4) that the sound transmission may be affected by the transmission impedance L, and the vibration transmission efficiency of the bone conductive MP3 player may be related to L. The frequency response curve of the bone conductive MP3 player may be the superposition of the frequency response curve of each point on the contact surface. The factors that change the impedance may include the size, shape, roughness, force size, force distribution, etc. of the energy transmission area. For example, the sound transmission effect may be changed by changing the structure and shape of the vibration unit, and the sound quality of the bone conductive MP3 player may be changed. Merely by way of example, changing the corresponding physical characteristics of the contact surface of the vibrating unit may achieve the effect of changing the sound transmission.

Figure 25:
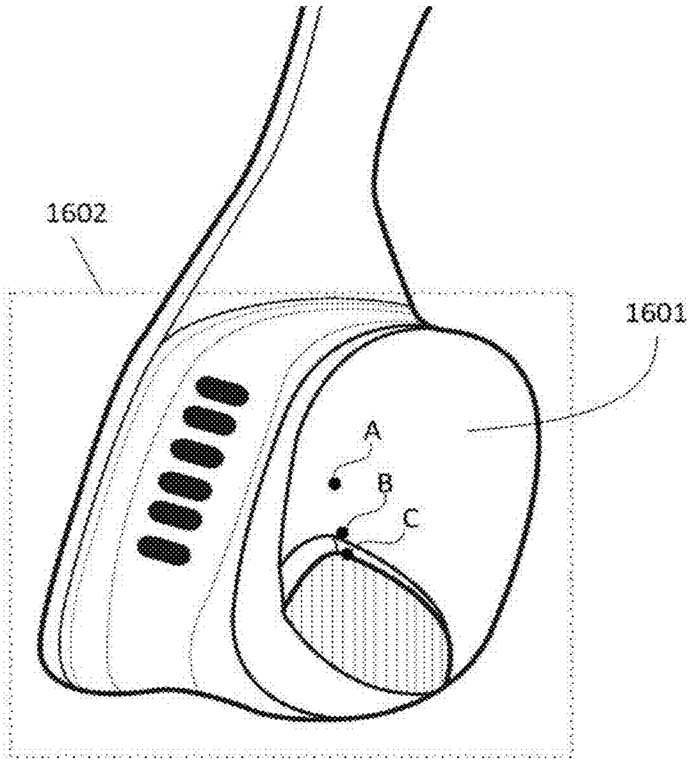
FIG. 25 is a schematic diagram illustrating a contact surface of a vibration unit of an exemplary MP3 player according to some embodiments of the present disclosure.

FIG. 25 is a schematic diagram illustrating a contact surface of a vibration unit of an exemplary MP3 player according to some embodiments of the present disclosure. In some embodiments, the contact surface of the vibration unit in FIG. 25 may be equivalent to the outer wall of the core housing 20 in FIG. 2 that is in contact with the human body. The embodiment may be a concrete embodiment of the transfer relationship K2 between the sensing terminal 1102 and the vibration unit 1103. As shown in FIG. 25, a surface of the contact surface may be disposed with a gradient structure. The gradient structure may refer to a region with a high variable surface. The gradient structure may include a convex/concave or stepped structure located outside the contact surface (i.e., a side that contacts to the user) or a convex/concave or stepped structure located inside the contact surface (i.e., a side facing away from the user). It should be noted that the contact surface of the vibration unit may contact any position of the head (e.g., the top of the head, forehead, a cheek, a horn, an auricle, a back of auricle, etc.) of the user. As shown in FIG. 25, the contact surface 1601 (outside the contact surface) may have a convex or concave portion (not shown in FIG. 25). During the work of the bone conductive MP3 player, the convex or concave portion may be in contact with the user, and change the pressure when different positions on the contact surface 1601 contact the face. The convex portion may be in closer contact with the face of the human. The skin and subcutaneous tissue in contact with the convex portion may be subjected to more pressure than that in contact with other parts. Accordingly, the skin and subcutaneous tissue in contact with the concave portion may be subjected to less pressure than that in contact with other parts. For example, there are three points A, B, and Con the contact surface 1601 in FIG. 25, which are respectively located on the non-convex portion, the edge of the convex portion, and the convex portion of the contact surface 1601. When in contact with the skin, the clamping force on the skin at the three points A, B, and C is $F_C>F_A>F_B$. In some embodiments, the clamping force of point B may be 0, that is, point B may not be in contact with the skin. The skin and subcutaneous tissue may show different impedances and responses to sound under different pressures. The impedance ratio may be small at the part with a high pressure, which has a high-pass filtering characteristic for sound waves. The impedance ratio may be large at the part with a low pressure, which has a low-pass filtering characteristic. The impedances L of each part of the contact surface 1601 may be different. According to Equation (4), different parts may have different responses to the frequency of sound transmission. The effect of sound transmission through the entire contact surface may be equivalent to the sum of sound transmission at each part of the contact surface. When the sound is transmitted to the brain, a smooth frequency response curve may be formed, which avoids the occurrence of excessively high resonance peaks at low frequency or high frequency, thereby obtaining an ideal frequency response within the entire sound frequency bandwidth. Similarly, the material and thickness of the contact surface 1601 may affect sound transmission, which further affects the sound quality. For example, when the material of the contact surface is soft, the effect of sound transmission in the low frequency range may be better than that in the high frequency range. When the material of the contact surface is hard, the effect of sound transmission in the high frequency range may be better than that in the low frequency range.

Figure 26:
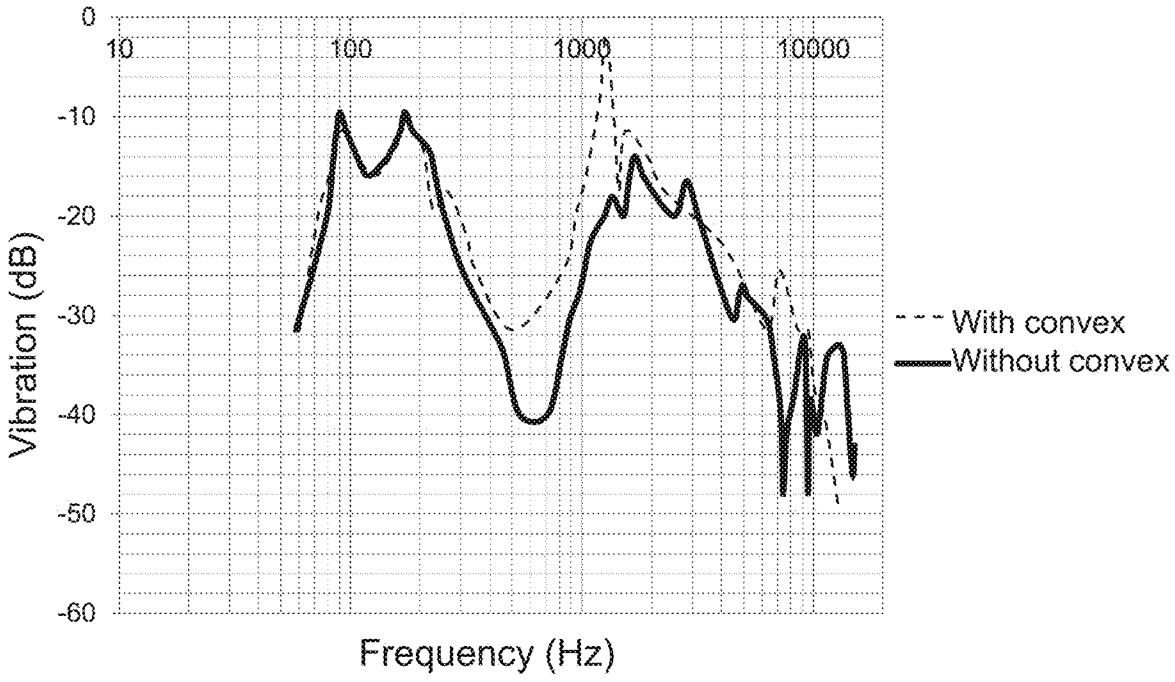
FIG. 26 is a schematic diagram illustrating frequency response curves of an exemplary MP3 player with different contact surfaces.

FIG. 26 is a schematic diagram illustrating frequency response curves of an exemplary MP3 player with different contact surfaces. The dashed line corresponds to the frequency response curve of a loudspeaker with a convex structure on the contact surface, and the solid line corresponds to the frequency response curve of a loudspeaker with no convex structure on the contact surface. In the mid-low frequency range (e.g., in the frequency range of 300 Hz-1000 Hz), the vibration of speaker device without the convex structure may be significantly weakened compared with the vibration of speaker device having the convex structure, forming a "deep pit" on the frequency response curve, which appears to be a non-ideal frequency response, so as to affect the sound quality of the MP3 player.

The illustration of FIG. 26 described above is only an explanation of specific examples. For those skilled in the field, after understanding the basic principles that affect the frequency response of the MP3 player, various amendments and changes may be made to the structure and components of the MP3 player, so as to obtain different effects of frequency response.

It should be noted that, for those skilled in the art, the shape and structure of the contact surface 1601 are not limited to the above description, and may meet other specific requirements. For example, the convex or concave portion on the contact surface may be distributed on the edge of the contact surface, or be distributed in the middle of the contact surface. The contact surface may include one or more convex or concave portions. The convex and concave portions may be distributed on the contact surface at the same time. The material of the convex or concave portions on the contact surface may be other materials different from the material of the contact surface. The material of the convex or concave portions may be flexible material, rigid material, or more suitable material for generating a specific pressure gradient; or may be memory or non-memory material; or may be a single material or a composite material. The structural graphics of the convex or concave portion of the contact surface may include axisymmetric graphics, center-symmetric graphics, rotational symmetric graphics, asymmetric graphics, or the like. The structural graphics of the convex or concave portion of the contact surface may be one kind of graphics, or a combination of two or more kinds of graphics. The surface of the contact surface may have a degree of smoothness, roughness, and waviness. The position distribution of the convex or concave portion of the contact surface may include, but not limited to, axial symmetry distribution, center symmetry distribution, rotational symmetry distribution, asymmetric distribution, etc. The convex or concave portion of the contact surface may be on the edge of the contact surface, or be distributed inside the contact surface.

Figure 27:
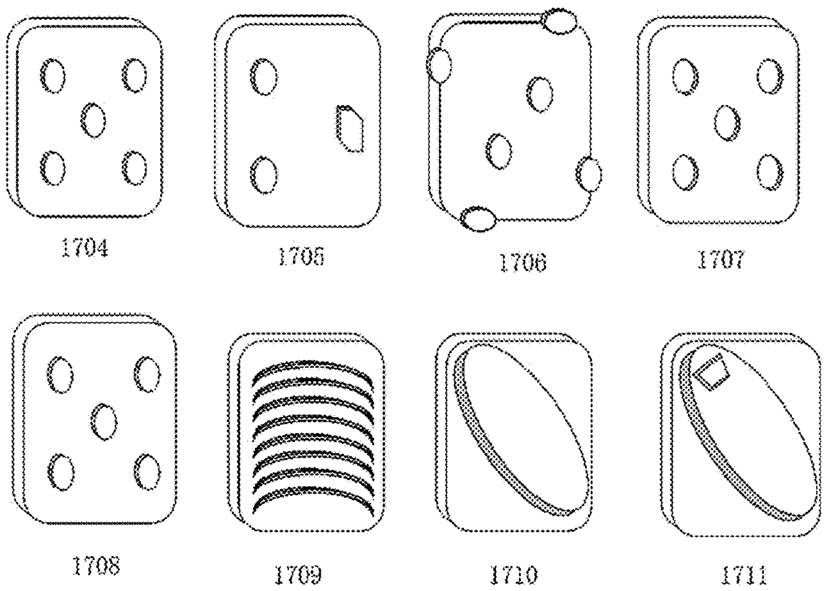
FIG. 27 is a schematic diagram illustrating contact surfaces of a vibration unit of an exemplary MP3 player according to some embodiments of the present disclosure.

FIG. 27 is a schematic diagram illustrating contact surfaces of a vibration unit of an exemplary MP3 player according to some embodiments of the present disclosure. As shown in FIG. 27, the figure shows various exemplary structures of the contact surface. Schematic diagram 1704 shown in FIG. 27 is an example illustrating a plurality of convexes (also referred to as convex portions) with similar shapes and structures on the contact surface. The convexes may include the same or similar materials as the other parts of the panel, or include different materials from the other parts of the panel. In particular, the convexes may be composed of a memory material and a vibration transmission layer material, and the proportion of the memory material may not be less than 10%. In some embodiments, the proportion of the memory material in the convexes may not be less than 50%. The area of a single convex may account for 1%-80% of the total area of the contact surface. In some embodiments, the area of the single convex may account for 5%-70% of the total area of the contact surface. In some embodiments, the area of the single convex may account for 8%-40% of the total area of the contact surface. The area of all convexes may account for 5%-80% of the total area of the contact surface. In some embodiments, the area of all convexes may account for 10%-60% of the total area of the contact surface. There may be at least one convex. In some embodiments, there may be one convex. In some embodiments, there may be two convexes. In some embodiments, there may be at least five convexes. The shape of the convex(es) may be a circle, an oval, a triangle, a rectangle, a trapezoid, an irregular polygon, or other similar graphics. The structure of the convexes (or the convex portions) may be symmetrical or asymmetrical. The position distribution of the convexes (or the convex portions) may be symmetrical or asymmetrical. The count of convexes (or the convex portions) may be one or more. The heights of the convexes (or the convex portions) may be or may not be the same. The heights and distribution of the convexes (or the convex portions) may constitute a certain gradient.

Schematic diagram 1705 shown in FIG. 27 is an example illustrating a structure of convexes (or convex portions) on the contact surface that includes two or more graphics. The count of convexes with different graphics may be one or more. Two or more shapes (or graphics) of the convexes may be any two or more combinations of a circle, an oval, a triangle, a rectangle, a trapezoid, an irregular polygon, or other similar graphics. The material, quantity, area, symmetry, etc. of the convexes may be similar to those in schematic diagram 1704.

Schematic diagram 1706 is an example illustrating a plurality of convexes (or convex portions) distributed at the edge and inside of the contact surface. The count of the convexes may not be limited to that shown in the figure. The ratio of the count of convexes located at the edge of the contact surface to the total count of convexes may be 1%-80%. In some embodiments, the ratio may be 5%-70%. In some embodiments, the ratio may be 10%-50%. In some embodiments, the ratio may be 30%-40%. The material, quantity, area, shape, symmetry, etc. of the convexes may be similar to those in schematic diagram 1704.

Schematic diagram 1707 is an example illustrating a structure of concave portions on the contact surface. The structure of the concave portions may be symmetrical or asymmetrical. The position distribution of the concave portions may be symmetrical or asymmetrical. The count of concave portions may be one or more. The shape of the concave portions may be the same or different. The concave portions may be hollow. The area of a single concave portion may account for 1%-80% of the total area of the contact surface. In some embodiments, the area of the single concave portion may account for 5%-70% of the total area of the contact surface. In some embodiments, the area of the single concave portion may account for 8%-40% of the total area of the contact surface. The area of all the concave portions may account for 5%-80% of the total area of the contact surface. In some embodiments, the area of all the concave portions may account for 10%-60% of the total area of the contact surface. There may be at least one concave portions. In some embodiments, there may be one concave portion. In some embodiments, there may be two concave portions. In some embodiments, there may be at least five concave portions. The shape of the concave portion(s) may include a circle, an oval, a triangle, a rectangle, a trapezoid, an irregular polygon, or other similar graphics.

Schematic diagram 1708 is an example where a contact surface has both convex portions and concave portions. The count of convex portions and/or concave portions may not be limited to one or more. The ratio of the count of concave portions to the count of convex portions may be 0.1-100, 1-80, 5-60, or 10-20. The material, the area, the shape, the symmetry, etc. of a single convex portion/concave portion may be similar to those in schematic diagram 1704.

Schematic diagram 1709 is an example of a contact surface with a certain count of ripples. The ripples may be generated by combining more than two convex portions/concave portions, or combining the convex portions and the concave portions. In some embodiments, the distance between adjacent convex portions/concave portions may be equal. In some embodiments, the distance between the convex portions/concave portions may be arranged equally.

Schematic diagram 1710 is an example of a contact surface having a convex (or convex portion) with a large area. The area of the convex may account for 30%-80% of the total area of the contact surface. In some embodiments, part of the edge of the convex may be substantially in contact with part of the edge of the contact surface.

Schematic diagram 1711 is an example of a contact surface having a first convex (or convex portion) with a larger area and a second convex with a smaller area on the first convex. The larger area of the convex may account for 30%-80% of the total area of the contact surface. The smaller area of the convex may account for 1%-30% of the total area of the contact surface. In some embodiments, the smaller area of the convex may account for 5%-20% of the total area of the contact surface. The smaller area may account for 5%-80% of the larger area. In some embodiments, the smaller area may account for 10%-30% of the larger area.

The above description of the structure of the contact surface of the MP3 player may just be a specific example and should not be considered as the only feasible implementation. Obviously, for those skilled in the art, after understanding the basic principle that the contact surface of the MP3 player may affect the sound quality of the MP3 player, it is possible to make various modifications and alterations in the specific form and details of implementing the contact surface of the bone conduction MP3 player without this principle, but these modifications and alterations are still within the scope described above. For example, the count of the convexes or concaves may not be limited to those shown in FIG. 27. The patterns of the convexes, concaves, or contact surfaces described above may also be modified to a certain extent, the modifications may still be within the scope of protection described above. Moreover, the contact surfaces of one or more vibration units in the MP3 player may use the same or different shapes and materials, the vibration effects transmitted on different contact surfaces may also vary according to the contact surfaces, thereby achieving different sound quality effects.

Figure 28:
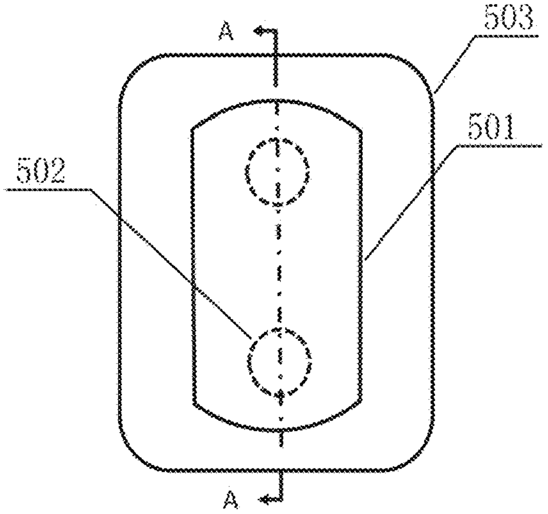
FIG. 28 is a schematic diagram illustrating a top view of a panel and a vibration conductive plate of an exemplary MP3 player according to some embodiments of the present disclosure.
Figure 29:
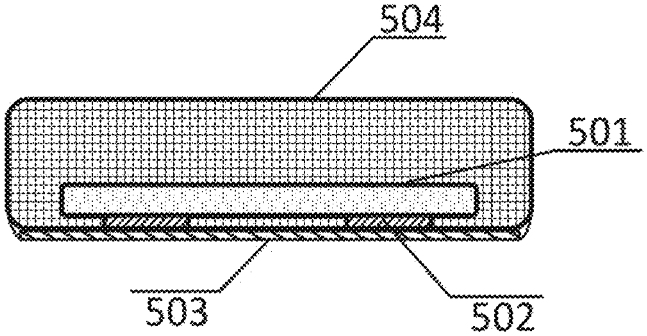
FIG. 29 is a schematic diagram illustrating a side view of a panel and a vibration conductive plate of an MP3 player according to some embodiments of the present disclosure.

FIG. 28 is a schematic diagram illustrating a front view of a panel and a vibration conductive layer according to some embodiments of the present disclosure. FIG. 29 is a schematic diagram illustrating a side view of a panel and a vibration conductive layer according to some embodiments of the present disclosure.

In some embodiments, a vibration transmission layer may be disposed at an outer surface of a side wall of the core housing 20 that contacts the human body. The vibration transmission layer may be a specific embodiment of changing the physical characteristics of the contact surface of the vibration unit to change the sound transmission effect. Different regions on the vibration transmission layer may have different transmission effects on vibration. For example, the vibration transmission layer may include a first contact surface region and a second contact surface region. In some embodiments, the first contact surface region may not be attached to the panel, and the second contact surface region may be attached to the panel. In some embodiments, when the vibration transmission layer is in contact with the user directly or indirectly, the clamping force on the first contact surface region may be less than the clamping force on the second contact surface region (the clamping force herein refers to the pressure between the contact surface of the vibration unit and the user). In some embodiments, the first contact surface region may not be in contact with the user directly, and the second contact surface region may be in contact with the user directly and may transmit vibration. The area of the first contact surface region may be different from the area of the second contact surface region. In some embodiments, the area of the first contact surface region may be less than the area of the second contact surface region. In some embodiments, the first contact surface region may include small holes to reduce the area of the first contact region. The outer surface of the vibration transmission layer (that is, the surface facing the user) may be flat or uneven. In some embodiments, the first contact surface region and the second contact surface region may not be on the same plane. In some embodiments, the second contact surface region may be higher than the first contact surface region. In some embodiments, the second contact surface region and the first contact surface region may constitute a stepped structure. In some embodiments, the first contact surface region may be in contact with the user, and the second contact surface region may not be in contact with the user. The materials of the first contact surface region and the second contact surface region may be the same or different. The materials of the first contact surface region and/or the second contact surface region may include the materials of the vibration transmission layer described above. above descriptions of the clamping force on the contact surface are some embodiments of the present the present disclosure. Those skilled in the art can modify the structure and manner described above according to actual needs, and these modifications are still within the protection scope of the present the present disclosure. For example, the vibration transmission layer may not be necessary, the panel may directly contact the user, and different contact surface areas may be disposed on the panel, and different contact surface areas may have similar characteristic to the first contact surface area and the second contact surface area described above. As another example, a third contact surface area may be disposed on the contact surface, and a structure may be different from structures on the first contact surface area and the second contact surface area may be disposed on the third contact surface area, and the structure can reduce housing vibration, suppress leakage sound, and improve the frequency response curve of the vibrating unit.

In some embodiments, the panel 501 and the vibration transmission layer 503 may be bonded by glue 502. Glued joints may be located at both ends of the panel 501. The panel 501 may be located in a housing formed by the vibration transmission layer 503 and the housing 504. In some embodiments, a projection of the panel 501 on the vibration transmission layer 503 may be a first contact surface region, and a region located around the first contact surface region may be a second contact surface region.

Figure 30:
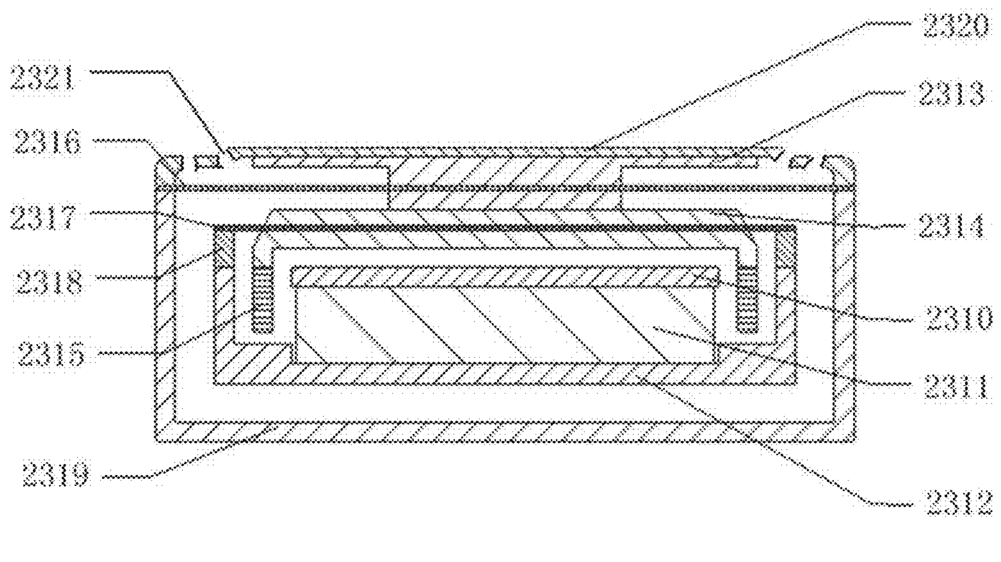
FIG. 30 is a structure diagram illustrating a vibration generating component of an exemplary MP3 player according to some embodiments of the present disclosure.

As a specific embodiment, as shown in FIG. 30, the earphone core may include a magnetic circuit assembly consisting of a magnetic conduction plate 2310, a magnet 2311, and a magnetic conductive body 2312. The earphone core may further include a vibration plate 2314, a coil 2315, a first vibration conductive plate 2316, a second vibration conductive plate 2317, and a washer 2318. The panel 2313 may protrude from the housing 2319 and be bonded to the vibration plate 2314 by glue. The first vibration transmission plate 2316 may fix the earphone core to the housing 2319 to form a suspension structure. A vibration transmission layer 2320 (e.g., silica gel) may be added to the panel 2313, and the vibration transmission layer 2320 may generate deformation to adapt to the shape of the skin. A portion of the vibration transmission layer 2320 that is in contact with the panel 2313 may be higher than a portion of the vibration transmission layer 2320 that is not in contact with the panel 2313, thereby forming a stepped structure. One or more small holes 2321 may be disposed on the portion where the vibration transmission layer 2320 does not contact the panel 2313 (a portion where the vibration transmission layer 2320 does not protrude in FIG. 30). The small holes on the vibration transmission layer may reduce the leaked sound. Specifically, the connection between the panel 2313 and the housing 2319 through the vibration transmission layer 2320 may be weakened, and the vibration transmitted from the panel 2313 to the housing 2319 through the vibration transmission layer 2320 may be reduced, thereby reducing the leaked sound generated by the vibration of the housing 2319. The area of the non-protruding portion of the vibration transmission layer 2320 may be reduced by disposing small holes 2321, which may drive less air and reduce the leaked sound caused by air vibration. When the small holes 2321 are disposed on the non-protruding part of the vibration transmission layer 2320, the air vibration in the housing may be guided out of the housing and counteract the air vibration caused by the housing 2319, thereby reducing the leaked sound. It should be noted that, since the small holes 2321 may guide the sound waves in the housing of the composite vibration component, and the guided sound waves may be superimposed with the sound waves from the leaked sound to reduce the leaked sound, the small holes may also be the sound guiding holes.

It should be noted that, in the embodiment, the panel may protrude from the housing of the bone conductive MP3 player. The first vibration conductive plate may be used to connect the panel and the housing of the MP3 player, and the coupling degree between the panel and the housing may be greatly reduced. The first vibration conductive plate may provide a certain deformation, so that the panel has a higher degree of freedom when the panel contacts the user, and may be better adapted to contact surfaces. The first vibration conductive plate may make the panel tilt at a certain angle relative to the housing. In some embodiments, the tilt angle may not exceed 5°.

Figure 31:
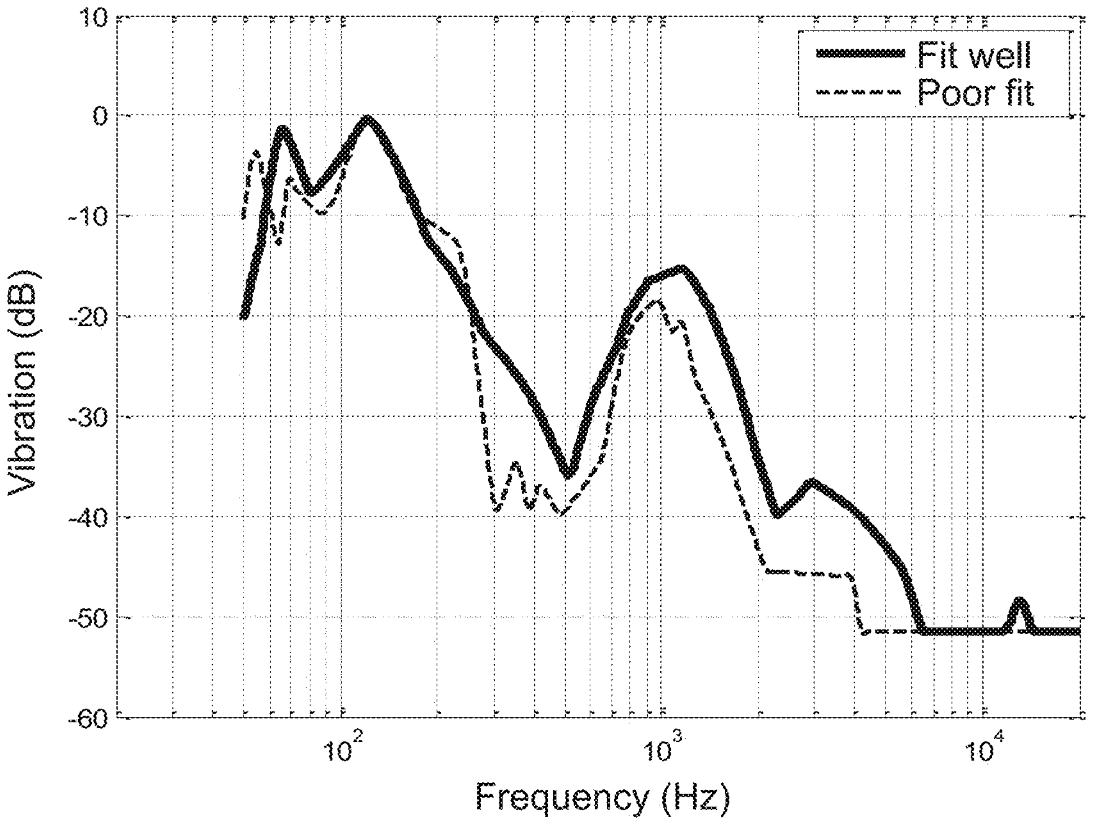
FIG. 31 is a schematic diagram illustrating vibration response curves of a vibration generating component of an exemplary MP3 player according to some embodiments of the present disclosure.

Further, the vibration efficiency of the MP3 player may vary with the contact state. Good contact state may have higher vibration transmission efficiency. As shown in FIG. 31, the thick line shows the vibration transmission efficiency in a good contact state, and the thin line shows the vibration transmission efficiency in a poor contact state. In some embodiments, better contact state may have higher vibration transmission efficiency.

Figure 32:
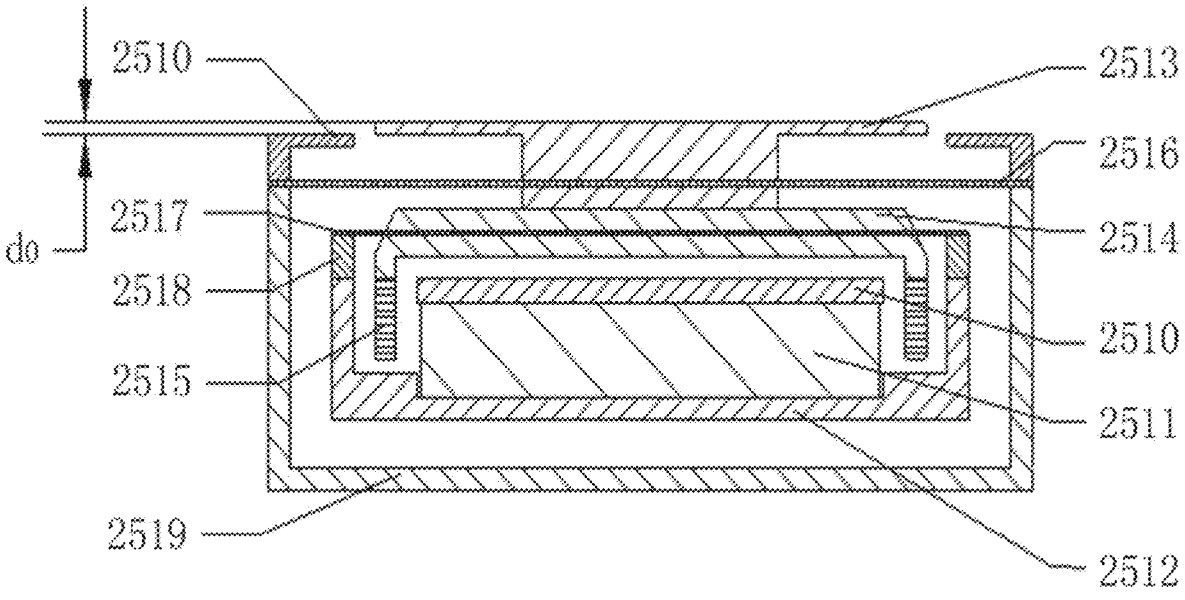
FIG. 32 is a structure diagram illustrating a vibration generating component of an exemplary MP3 player according to some embodiments of the present disclosure.

FIG. 32 is a structure diagram illustrating a vibration generating component of an exemplary MP3 player according to some embodiments of the present disclosure. As shown in FIG. 32, in this embodiment, the earphone core may include a magnetic circuit assembly composed of a magnetic conduction plate 2510, a magnet 2511 and a magnetic conduction plate 2512, a vibration plate 2514, a coil 2515, a first vibration conductive plate 2516, a second vibration conductive plate 2517, and a washer 2518. The panel 2513 may protrude from the housing 2519, and may be bonded to the vibration plate 2514 by glue. The first vibration piece 2516 may fix the earphone core to the housing 2519 to form a suspension structure.

The difference between the embodiment and the embodiment in FIG. 54 is that an edge is added to the edge of the housing. During the contact between the housing and the skin, the edge may make the force distribution more uniform and increase the wearing comfort of the MP3 player. There is a height difference d0 between the surrounding edge 2510 and the panel 2513. The force of the skin on the panel 2513 may reduce the distanced between the panel 2513 and the surrounding edge 2510. When the pressure between the MP3 player and the user is greater than the force that the first vibration conductive plate 2516 suffers when the deformation of the first vibration conductive plate 2516 is d0, excessive clamping force will be transmitted to the skin through the surrounding edge 2510 without affecting the clamping force of the vibration part, which makes the clamping force more uniform, thereby improving the sound quality.

Under normal circumstances, the sound quality of the MP3 player is affected by various factors, such as the physical properties of the components of the MP3 player, the vibration transmission relationship among the components, the vibration transmission relationship between the MP3 player and the outside world, and the efficiency of the vibration transmission system in transmitting vibration, or the like. The components of the MP3 player may include components that generate vibrations (such as but not limited to transducers), components that fix the MP3 player (such as but not limited to hooks/earphone straps), and components that transmit vibrations (such as but not limited to panels, vibration transmission layer, etc.). The vibration transmission relationship among the components and the vibration transmission relationship between the MP3 player and the outside world are determined by the contact mode between the loudspeaker and the user (such as but not limited to clamping force, contact area, contact shape, etc.).

It should be noted that the above description of the speaker device is only a specific example and should not be considered as an only feasible implementation solution. Obviously, for those skilled in the art, after understanding the basic principles of the speaker device, it is possible to make various modifications and alterations in the specific form and details of implementing the speaker device without departing from this principle, but these modifications and alterations are still within the scope described above. For example, the vibration transmission layer may not be limited to one layer shown in FIG. 30, but may also include multiple layers, and the specific count of layers may be determined according to actual conditions, which may not be specifically limited herein. As another example, the gradient structure formed between the vibration transmission layer and the panel may not be limited to one structure in FIG. 30, when there are a plurality of vibration transmission layers, a gradient structure may be formed between each vibration transmission layers and the panel and between each vibration transmission layers. All such variations are within the protection scope of the present disclosure.

Figure 33:
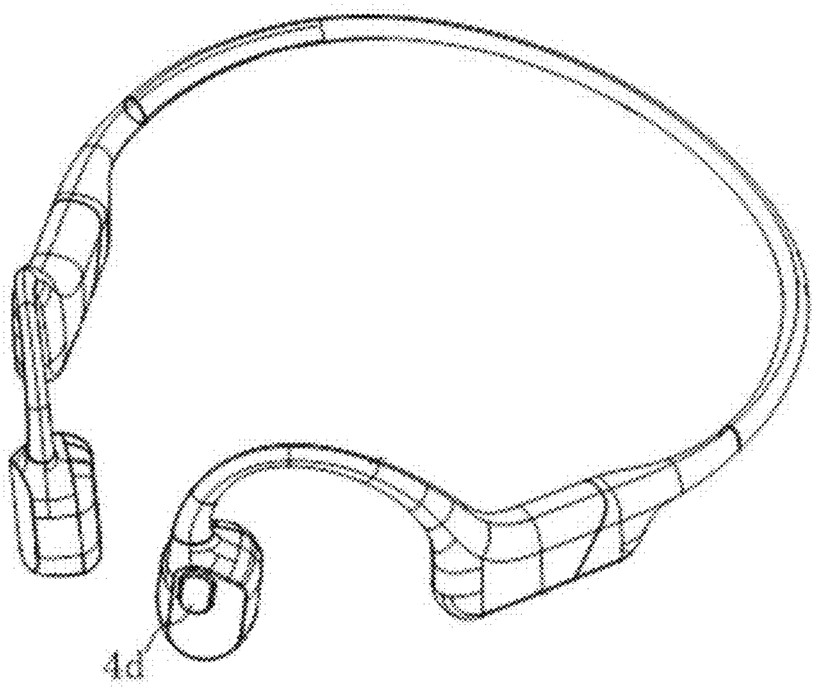
FIG. 33 is a structural diagram illustrating a key module of an exemplary MP3 player according to some embodiments of the present disclosure.

FIG. 33 is a structural diagram illustrating a button module of an exemplary MP3 player according to some embodiments of the present disclosure. As shown in FIG. 33, in some embodiments, the MP3 player may further include a button module. In some embodiments, the button module may include a power switch button, a function shortcut button, and a menu shortcut button. In some embodiments, the function shortcut button may include a volume up button and a volume down button for adjusting the volume of the sound, a fast forward button and a fast backward button for adjusting the progress of the sound file, and a button configured to control the connection (e.g., a BLUETOOTH connection) of the MP3 player to an external device. In some embodiments, a type of the button module may include a physical button and a virtual button. For example, when the button module exists in the form of the physical button, the button may be disposed at an auxiliary side wall 34 and/or a first side wall 30*a* of the circuit housing 30. When the user wears the MP3 player in this embodiment, the auxiliary side wall 34 and the first side wall 30*a* may not be in contact with human skin, and may be exposed on the outside to facilitate the user's wearing and operation on each key. In some embodiments, an end surface of each button in the button module may be provided with an identification corresponding to a function thereof. In some embodiments, the identification may include a text (e.g., in Chinese, in English, etc.), a symbol (e.g., "+" indicating the volume up button, "–" indicating the volume down button, etc.). In some embodiments, the identification may be set at the button by means of laser printing, screen printing, pad printing, laser filling, thermal sublimation, hollow text, or the like. In some embodiments, the identification may be disposed on the surface of the circuit housing on the peripheral side of the button, which may be served as a logo. In some embodiments, the MP3 player may include a touch screen, and the control program installed in the MP3 player may generate one or more virtual buttons on the touch screen with interactive functions, and the virtual button(s) may be used to select a function, the volume, and a file of the MP3 player. In addition, the MP3 player may include a physical button, a physical screen, or the like, or any combination thereof.

In some embodiments, as shown in FIG. 33, the MP3 player may include at least one button module 4*d*, and the button module 4*d* may be used for human-computer interaction, for example, realizing an operation such as pause/start, recording, answering calls, or the like. It should be understood that the button module 4*d* shown in FIG. 33 is only for illustrative purposes. Those skilled in the art may adjust parameters such as the position, quantity, and shape of the button module on the basis of fully understanding the function of the button module. For example, the button module may also be disposed at other positions of the circuit housing or the MP3 player.

the button in the button module 4*d* may implement different interactive functions based on the user's operation instructions. For example, clicking the button module 4*d* once may realize the pausing/starting (such as music, recording, etc.) function, clicking the button module 4*d* twice quickly may realize the answering the call function, clicking regularly (e.g., once every second and click twice in total) may realize the recording function. In some embodiments, the user's operation instructions may be operations such as clicking, sliding, scrolling, or the like, or a combination of operations. For example, sliding up and down on the surface of the button may realize the function of increasing/lowering the volume.

In other embodiments, there may be at least two button modules 4*d*, each of which may correspond to one of the two core housings on the left and right sides, respectively. The user may use the left and right hands to operate the at least two button modules 4*d* respectively to improve the user experience.

In an application scenario, in order to further improve the user's human-computer interaction experience, the functions of human-computer interaction may be assigned to the button modules 4*d* on the left and right sides. The user may operate the buttons in the corresponding button modules 4*d* according to different functions. For example, the recording function may be turned on by clicking once the button module 4*d* on the left, while the recording function may be turned off by clicking again the button module 4*d*, and the pause/play function may be realized by clicking twice quickly. The function of answering the call may be realized by clicking twice quickly on the button module 4*d* on the right side. When the button module 4*d* on the right side is clicked twice quickly, and a song is playing and there is no phone call access at this time, the next/previous music switching function may be realized.

In some embodiments, the functions corresponding to the button modules 4*d* on the left and right sides described above may be user-defined. For example, the user may assign the pause/play function performed by the button module 4*d* on the left side to the button module 4*d* on the right side by an application software, or assign the answering call function performed by the button module 4*d* on the right side to the button module 4*d* on the left side. In addition, the user may also set the operation instructions (such as the number of clicks, sliding gestures) implementing the corresponding functions by the application software. For example, the operation instruction corresponding to the answering a call function is set from one click to two clicks, and the operation instruction corresponding to the switching to the next/previous music function is set from two clicks to three clicks. User-defined operations may be determined based on user-operating habits, which avoids operating errors to a certain extent and improves user experience.

In some embodiments, the human-computer interaction function described above may not be unique but is set according to the functions commonly used by the user. For example, the button modules 4*d* may also implement functions such as rejecting calls and reading text messages by voice, or the like. Users may customize the functions and the corresponding operation instructions to meet different needs.

In some embodiments, the MP3 player may be connected to an external device by at least one button module. For example, the MP3 player may be connected to a mobile phone via a button (e.g., a button for controlling BLUETOOTH connection) in the button module for controlling wireless connection. Optionally, after the connection is established, the user may directly operate the MP3 player on the external device (e.g., a mobile phone) to implement one or more of the functions described above.

It should be noted that the above description of the MP3 player is merely a specific example and should not be considered as a merely feasible implementation solution. Obviously, for those skilled in the art, after understanding the basic principles of MP3 players, it is possible to make various modifications and alterations in the form and details of the specific methods and steps of implementing the MP3 player without departing from this principle, but these modifications and alterations are still within the scope described above. For example, the button may have a regular shape such as a rectangle, a circle, an oval, or a triangle, or have an irregular shape. As another example, the shape of each key may be the same or different. All such variations are within the protection scope of the present disclosure.

In some embodiments, the MP3 player may include an indicator light module (not shown in the figure) to display the state of the MP3 player. Specifically, the indicator light module may send out a light signal, and the state of the MP3 player may be known by observing the light signal. In some embodiments, an indicator light may illustrate the power state of the MP3 player. For illustration purposes, for example, when the indicator light is red, it may indicate that the MP3 player has insufficient power (for example, the MP3 player has less than 10% power). As another example, when the MP3 player is charged, the indicator light is yellow, and when the MP3 player is fully charged, the indicator light is green. In some alternative embodiments, for example, when the MP3 player is in a state of communicating with an external device, the indicator light may keep blinking or may be illustrated in other colors (e.g., blue). In some alternative embodiments, the indicator light may illustrate the state of data transmission between the MP3 player and the external device. For example, when a user uses a mobile terminal to transmit data to the MP3 player, the indicator light may switch colors based on a specific frequency. As another example, the indicator light may illustrate a fault state of the MP3 player. When the MP3 player is in the fault state, the indicator light is red and keeps blinking. In some embodiments, the indicator light module may further include one indicator light or a plurality of indicator lights. In some embodiments, when there is a plurality of indicator lights, the colors of the plurality of indicator lights may be the same or different.

It should be noted that the above description of the MP3 player is only a specific example and should not be considered as the only feasible implementation solution. Obviously, for those skilled in the art, after understanding the basic principles of MP3 players, it is possible to make various modifications and alterations in the form and details of the specific methods and steps of implementing the MP3 player without departing from this principle, but these modifications and alterations are still within the scope described above. For example, the count of indicator lights may not be limited to one, and a plurality of indicators may be selected according to specific needs. As another example, when the MP3 player is being charged, the indicator light may display other colors (such as orange) or keep blinking. All such variations are within the protection scope of the present disclosure.

Figure 34:
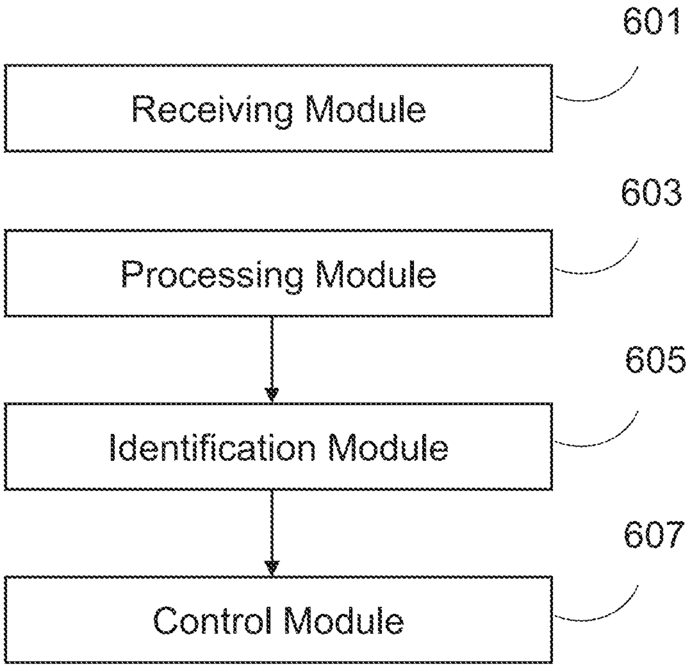
FIG. 34 is a block diagram illustrating an exemplary voice control system according to some embodiments of the present disclosure.

FIG. 34 is a block diagram illustrating an exemplary voice control system according to some embodiments of the present disclosure. The voice control system may be used as a part of an auxiliary button module or may be integrated into a speaker device as a separate module. In some embodiments, the voice control system may include a receiving module 601, a processing module 603, an identification module 605, and a control module 607.

In some embodiments, the receiving module 601 may be configured to receive a voice control instruction and send the voice control instruction to the processing module 603. In some embodiments, the receiving module 601 may include one or more microphones. In some embodiments, when the receiving module 601 receives the voice control instruction inputted by a user, (e.g., the receiving module 601 receives a voice control instruction of "start playing"), the receiving module 601 may then send the voice control instruction to the processing module 603.

In some embodiments, the processing module 603 may be in communication with the receiving module 601. The processing module 603 may generate an instruction signal according to the voice control instruction, and send the instruction signal to the identification module 605.

In some embodiments, when the processing module 603 receives the voice control instruction inputted by the user from the receiving module 601 through the communication connection, the processing module 603 may generate an instruction signal according to the voice control instruction.

In some embodiments, the identification module 605 may be in communication with the processing module 603 and the control module 607. The identification module 605 may identify whether the instruction signal matches a predetermined signal, and send a matching result to the control module 607.

In some embodiments, when the identification module 605 determines that the instruction signal matches the predetermined signal, the identification module 605 may send the matching result to the control module 607. The control module 607 may control the operations of the speaker device according to the instruction signal. For example, when the receiving module 601 receives a voice control instruction of "start playing", and the identification module 605 determines that the instruction signal corresponding to the voice control instruction matches the predetermined signal, the control module 607 may automatically perform the voice control instruction. The control module 607 may immediately automatically perform starting playing audio data. When the instruction signal does not match the predetermined signal, the control module 607 may not perform the control instruction.

In some embodiments, the voice control system may further include a storage module, which may be in communication with the receiving module 601, the processing module 603, and/or the identification module 605. The receiving module 601 may receive and send a predetermined voice control instruction to the processing module 603. The processing module 603 may generate a predetermined signal according to the predetermined voice control instruction, and send the predetermined signal to the storage module. When the identification module 605 needs to match the instruction signal received from the processing module 603 with the predetermined signal, the storage module may send the predetermined signal to the identification module 605 through the communication connection.

In some embodiments, the processing module 603 may further include removing environmental sound contained in the voice control instruction.

In some embodiments, the processing module 603 in the voice control system may further include performing denoising processing on the voice control instruction. The denoising processing may refer to removing the environmental sound contained in the voice control instruction. In some embodiments, when in a complex environment, the receiving module 601 may receive and send the voice control instruction to the processing module 603. Before the processing module 603 generates the corresponding instruction signal according to the voice control instruction, in order to prevent the environmental sound from interfering with the recognition process of the identification module 605, the voice control instruction may be denoised. For example, when the receiving module 601 receives a voice control instruction inputted by the user when the user is in an outdoor environment, the voice control instruction may include environmental sound such as vehicle driving on the road, whistle, etc. The processing module 602 may perform the denoising processing to reduce the influence of the environmental sound on the voice control instruction.

It should be noted that the above description of the voice control system is merely a specific example and should not be considered as merely a feasible implementation solution. Obviously, for those skilled in the art, after understanding the basic principles of the voice control system, it is possible to make various modifications and alterations in the form and details of the specific manner and steps of implementing the voice control system without departing from this principle, but these modifications and alterations are still within the scope described above. For example, the receiving module and the processing module may be independent modules, and may also be the same module. All such variations are within the protection scope of the present disclosure.

Figure 35:
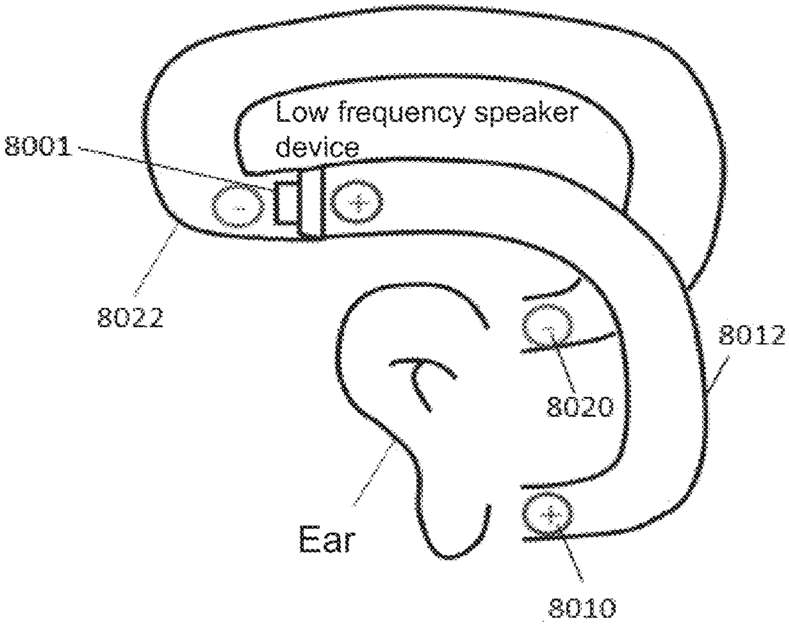
FIG. 35 is a schematic diagram illustrating transmitting sound through air conduction according to some embodiments of the present disclosure.

In some embodiments, the speaker device (e.g., the MP3 player) described above may also transmit the sound to the user through air conduction. When the air condition is used to transmit the sound, the speaker device may include one or more sound sources. The sound source may be located at a specific position of the user's head, for example, the top of the head, a forehead, a cheek, a temple, an auricle, the back of an auricle, etc., without blocking or covering an ear canal. FIG. 35 is a schematic diagram illustrating transmitting sound through air conduction according to some embodiments of the present disclosure.

As shown in FIG. 35, a sound source 3510 and a sound source 3520 may generate sound waves with opposite phases ("+" and "−" in the figure may indicate the opposite phases). For brevity, the sound sources mentioned herein may refer to sound outlets of the speaker that may output sounds. For example, the sound source 3510 and the sound source 3520 may be two sound outlets respectively located at specific positions of the speaker (e.g., the core housing 20 or the circuit housing 30).

In some embodiments, the sound source 3510 and the sound source 3520 may be generated by the same vibration device 3501. The vibration device 3501 may include a diaphragm (not shown in the figure). When the diaphragm is driven to vibrate by an electric signal, the front side of the diaphragm may drive air to vibrate. The sound source 3510 may form at the sound output through a sound guiding channel 3512. The back of the diaphragm may drive air to vibrate, and the sound source 3520 may be formed at the sound output hole through a sound guiding channel 3522. The sound guiding channel may refer to a sound transmission route from the diaphragm to the corresponding outlet. In some embodiments, the sound guiding channel may be a route surrounded by a specific structure (e.g., the core housing 20 or the circuit housing 30) on the speaker device. It should be noted that in some alternative embodiments, the sound source 3510 and the sound source 3520 may also be generated by different vibrating diaphragms of different vibration devices, respectively.

Among the sounds generated by the sound source 3510 and the sound source 3520, one portion of the sounds may be transmitted to the ear of the user to form the sound heard by the user. Another portion of the sound may be transmitted to the environment to form a leaked sound. Considering that the sound source 3510 and the sound source 3520 are relatively close to the ears of the user, for convenience of description, the sound transmitted to the ears of the user may be referred to as a near-field sound. The leaked sound transmitted to the environment may be referred to as a far-field sound. In some embodiments, the near-field/far-field sounds of different frequencies generated by the speaker device may be related to a distance between the sound source 3510 and the sound source 3520. Generally speaking, the near-field sound generated by the speaker device may increase as the distance between the two sound sources increases, while the generated far-field sound (the leaked sound) may increase as the frequency increases.

For the sounds of different frequencies, the distance between the sound source 3510 and the sound source 3520 may be designed, respectively, so that a low-frequency near-field sound (e.g., a sound with a frequency less than 800 Hz) generated by the speaker device may be as large as possible and a high-frequency far-field sound (e.g., a sound with a frequency greater than 2000 Hz) may be as small as possible. In order to implement the above purpose, the speaker device may include two or more sets of dual sound sources. Each set of the dual sound sources may include two sound sources similar to the sound source 3510 and the sound source 3520, and generate sounds with specific frequencies, respectively. Specifically, a first set of the dual sound sources may be used to generate relatively low frequency sounds. A second set of the dual sound sources may be used to generate relatively high frequency sounds. In order to obtain more low-frequency near-field sounds, the distance between two sound sources in the first set of the dual sound sources may be set with a larger value. Since the low-frequency signal has a relatively long wavelength, the relatively large distance between the two sound sources may not cause a large phase difference in the far-field, and not form excessive leaked sound in the far-field. In order to make the high-frequency far-field sound smaller, the distance between the two sound sources in the second set of the dual sound sources may be set with a smaller value. Since the high-frequency signal has a relatively short wavelength, the smaller distance between the two sound sources may avoid the generation of the large phase difference in the far-field, and thus the generation of the excessive leaked sounds may be avoided. The distance between the second set of the dual sound sources may be less than the distance between the first set of the dual sound sources.

The benefits of the present application may include, but not limited to: (1) Waterproof performance of a speaker device may be improved; (2) Sound quality of the speaker device may be improved; (3) Housing vibration may be reduced and leakage sound may be suppressed; (4) The speaker device may fit well with the user. It should be noted that different embodiments may have different beneficial effects. In different embodiments, the possible beneficial effects may be any of the above or the like, or any combination thereof, or may be any other beneficial effects that may be obtained.

The basic concepts have been described above. Obviously, for those skilled in the art, the disclosure of the invention is merely by way of example, and does not constitute a limitation on the present disclosure. Although not explicitly stated here, those skilled in the art may make various modifications, improvements and alterations to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

In addition, those skilled in the art may understand that various aspects of the present disclosure may be illustrated and described through several patentable categories or situations, including any new and useful processes, machines, products or combinations of materials or any new and useful improvements to them. Accordingly, all aspects of the present disclosure may be performed entirely by hardware, may be performed entirely by softwares (including firmware, resident softwares, microcode, etc.), or may be performed by a combination of hardware and softwares. The above hardware or software can be referred to as "modules", "unit", "components", or "system". In addition, aspects of the present disclosure may appear as a computer product located in one or more computer-readable media, the product including computer-readable program code.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially", etc. Unless otherwise stated, "about," "approximate," or "substantially" may indicate ±20% variation of the value it describes. Accordingly, in some embodiments, the numerical parameters set forth in the description and attached claims are approximations that may vary depending upon the desired properties sought to be obtained by a particular embodiment. In some embodiments, numerical data should take into account the specified significant digits and use an algorithm reserved for general digits. Notwithstanding that the numerical ranges and parameters configured to illustrate the broad scope of some embodiments of the present disclosure are approximations, the numerical values in specific examples may be as accurate as possible within a practical scope.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A speaker device, comprising:
a core housing configured to accommodate an earphone core;
a control circuit or a battery, the control circuit or the battery being configured to drive the earphone core to vibrate to produce sound;
an ear hook connected to the core housing, when a user wears the speaker device, the ear hook being configured to support the core housing at a position of the user's head without blocking the user's ear canal, wherein
the core housing includes a socket;
the ear hook includes an elastic metal wire and a plug end,
the plug end is disposed on an end of the elastic metal wire, and
the plug end is connected to the socket in a plug manner; and
wherein the speaker device further comprises a key module, and the key module is located on the core housing and is configured to control the speaker device.

2. The speaker device of claim 1, wherein
the ear hook includes a protective sleeve disposed on a periphery of the elastic metal wire.

3. The speaker device of claim 2, wherein the protective sleeve is injection molded around the periphery of the elastic metal wire.

4. The speaker device of claim 2, wherein the protective sleeve includes waterproof material.

5. The speaker device of claim 1, wherein
a stopping block is disposed on an inner side wall of the socket; and
the socket includes:
an insertion unit, at least a portion of the insertion unit being inserted into the socket and abutted against an outer surface of the stopping block; and
two elastic hooks disposed on a side of the insertion unit facing an inside of the core housing, the two elastic hooks getting close to each other under an action of an external force and the stopping block, and after passing the stopping block, the two elastic hooks elastically returning to be clamped on the inner surface of the stopping block to plug and fix the core housing and the plug end.

6. The speaker device of claim 5, wherein
at least a portion of the insertion unit is inserted into the socket, the other portion of the insertion unit not inserted into the socket has a stepped structure and form a second annular table, and the second annular table is disposed apart from an outer end surface of the core housing; and
the ear hook includes a protective sleeve disposed on a periphery of the elastic metal wire and the plug end, the protective sleeve extends to a side of the second annular table facing the outer end surface of the core housing, and the protective sleeve elastically abuts against the core housing when the core housing and the plug end are plugged and fixed.

7. The speaker device of claim 6, wherein
the protective sleeve includes an annular abutting surface and an annular protruding table, the annular abutting surface being formed on a side of the protective sleeve facing the outer end surface of the core housing, and the annular protruding table being formed in the annular abutting surface and protruding relative to the annular abutting surface;
the core housing includes a connecting slope configured to connect the outer end surface of the core housing and the inner side wall of the socket; and
the annular abutting surface and the annular protruding table elastically abut against the outer end surface of the core housing and the connecting slope, respectively, when the core housing is fixed to the plug end.

8. The speaker device of claim 1, wherein the earphone core at least includes a composite vibration device constituted by a vibration plate and a second vibration conductive plate, the composite vibration device generating two resonance peaks.

9. The speaker device of claim 8, wherein
the earphone core further includes at least one voice coil and at least one magnetic circuit assembly; and
the at least one voice coil is physically connected to the vibration plate, and the at least one magnetic circuit assembly is physically connected to the second vibration conductive plate.

10. The speaker device of claim 8, wherein a stiffness coefficient of the vibration plate is greater than a stiffness coefficient of the second vibration conductive plate.

11. The speaker device of claim 8, wherein the earphone core further includes a first vibration conductive plate, wherein
the first vibration conductive plate is physically connected to the composite vibration component;
the first vibration conductive plate is physically connected to the core housing; and
the first vibration conductive plate generates another resonance peak.

12. The speaker device of claim 8, wherein the two resonance peaks are within a frequency range perceivable by human ears.

13. The speaker device of claim 8, wherein
the core housing further includes at least one contact surface, at least a portion of the at least one contact surface being in direct or indirect contact with a user; and
the at least one contact surface has a gradient structure such that the pressure is unevenly distributed on the contact surface.

14. The speaker device of claim 13, wherein the gradient structure includes at least one convex portion or at least one concave portion.

15. The speaker device of claim 13, wherein the gradient structure is located at a center or an edge of the at least one contact surface.

16. The speaker device of claim 8, wherein
the core housing further includes at least one contact surface, at least a portion of the at least one contact surface being in direct or indirect contact with a user; and the at least one contact surface includes a first contact surface region and a second contact surface region, a protrusion degree of the second contact surface region being greater than a protrusion degree of the first contact surface region.

17. The speaker device of claim 16, wherein the at least one contact surface includes a sound guiding hole, the sound guiding hole guiding a sound wave inside the core housing to an outside of the core housing to superimpose with a leaked sound wave generated by the vibration of the core housing to reduce a sound leakage.

18. The speaker device of claim 16, wherein the first contact surface region and the second contact surface region are made of plastics including silica gel, rubber, or plastic.

19. The speaker device of claim 1, further comprising an indicator light, wherein the indicator light is located on the core housing and is configured to display a state of the speaker device.

* * * * *